United States Patent
Yasumura

(10) Patent No.: US 7,218,534 B2
(45) Date of Patent: May 15, 2007

(54) SWITCHING POWER SUPPLY CIRCUIT

(75) Inventor: Masayuki Yasumura, Kanagawa (JP)

(73) Assignee: Sony Corporation (JP)

( * ) Notice: Subject to any disclaimer, the term of this patent is extended or adjusted under 35 U.S.C. 154(b) by 402 days.

(21) Appl. No.: 10/952,425

(22) Filed: Sep. 28, 2004

(65) Prior Publication Data

US 2005/0068792 A1    Mar. 31, 2005

(30) Foreign Application Priority Data

| Sep. 30, 2003 | (JP) | ............................. P2003-340276 |
| Sep. 30, 2003 | (JP) | ............................. P2003-340277 |
| Oct. 20, 2003 | (JP) | ............................. P2003-359755 |
| Aug. 18, 2004 | (JP) | ............................. P2004-238620 |

(51) Int. Cl.
   *H02M 3/335*   (2006.01)
   *H02H 7/10*   (2006.01)

(52) U.S. Cl. ............................. 363/21.06; 363/21.02; 363/21.14

(58) Field of Classification Search .................. 363/16, 363/20, 21.01, 21.02, 21.04, 21.06, 21.08, 363/21.09, 21.14, 21.16, 21.17, 97, 131
See application file for complete search history.

(56) References Cited

U.S. PATENT DOCUMENTS

| 5,481,449 | A | * | 1/1996 | Kheraluwala et al. | ........ | 363/17 |
| 5,734,563 | A | * | 3/1998 | Shinada | ................... | 363/21.06 |
| 6,064,580 | A | * | 5/2000 | Watanabe et al. | ............. | 363/17 |
| 6,674,658 | B2 | * | 1/2004 | Mao et al. | ................... | 363/127 |
| 6,987,679 | B2 | * | 1/2006 | Gan et al. | ...................... | 363/89 |
| 7,095,629 | B2 | * | 8/2006 | Yasumura | ..................... | 363/16 |
| 7,102,898 | B2 | * | 9/2006 | Brkovic | ....................... | 363/19 |
| 2006/0114697 | A1 | * | 6/2006 | Yasumura | ..................... | 363/16 |

FOREIGN PATENT DOCUMENTS

JP    2003-111401    2/2003

* cited by examiner

*Primary Examiner*—Matthew V. Nguyen
(74) *Attorney, Agent, or Firm*—Lerner, David, Littenberg, Krumholz & Mentlik, LLP

(57) ABSTRACT

A switching power supply circuit is disclosed which can achieve a high power conversion efficiency and besides achieve reduction of the circuit scale and the cost by simplification in circuit configuration. The switching power supply circuit includes a synchronous rectification circuit of the winding voltage detection system on the secondary side of a resonance converter. The coupling coefficient of an insulating converter transformer or the induced voltage level per one turn of the secondary winding is set so that the magnetic flux density of the insulating converter transformer may be lower than a fixed level thereby to maintain the secondary side rectification current in a continuous mode even in a heavy load condition. An inductor is inserted in series in a path along which rectification current is to be supplied to a secondary side smoothing capacitor so that reverse current appearing on the rectification current is suppressed by counter electromotive force generated in the inductor to further reduce the reactive power. A dc superposition characteristic of the inductor is set so that abnormal oscillation in a very light load condition (for example, 12.5 W or less) is prevented.

11 Claims, 21 Drawing Sheets

F I G. 6
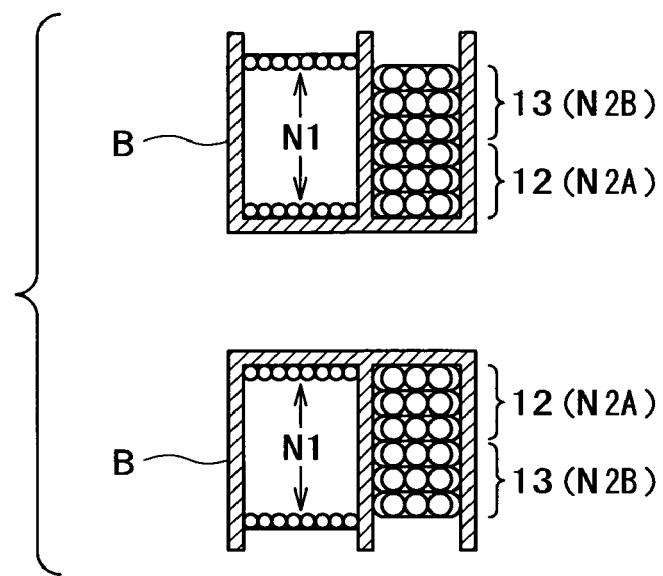
F I G. 7
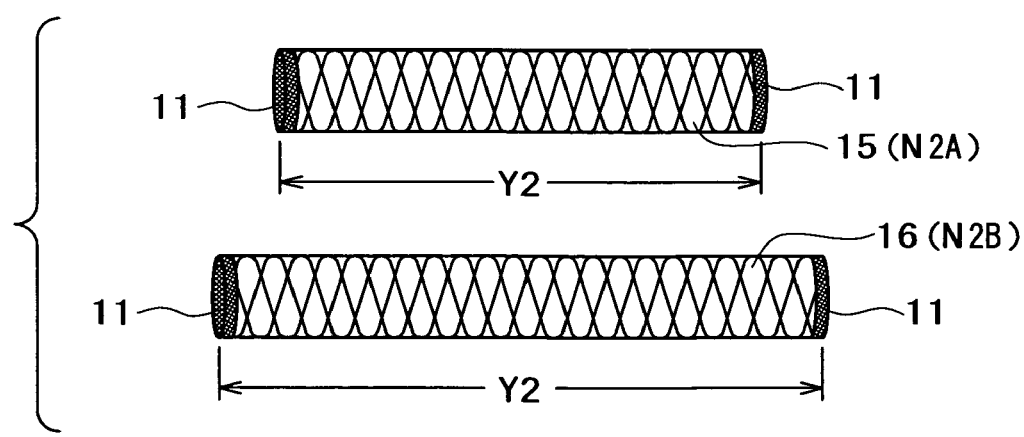

Ln

F I G. 2 4
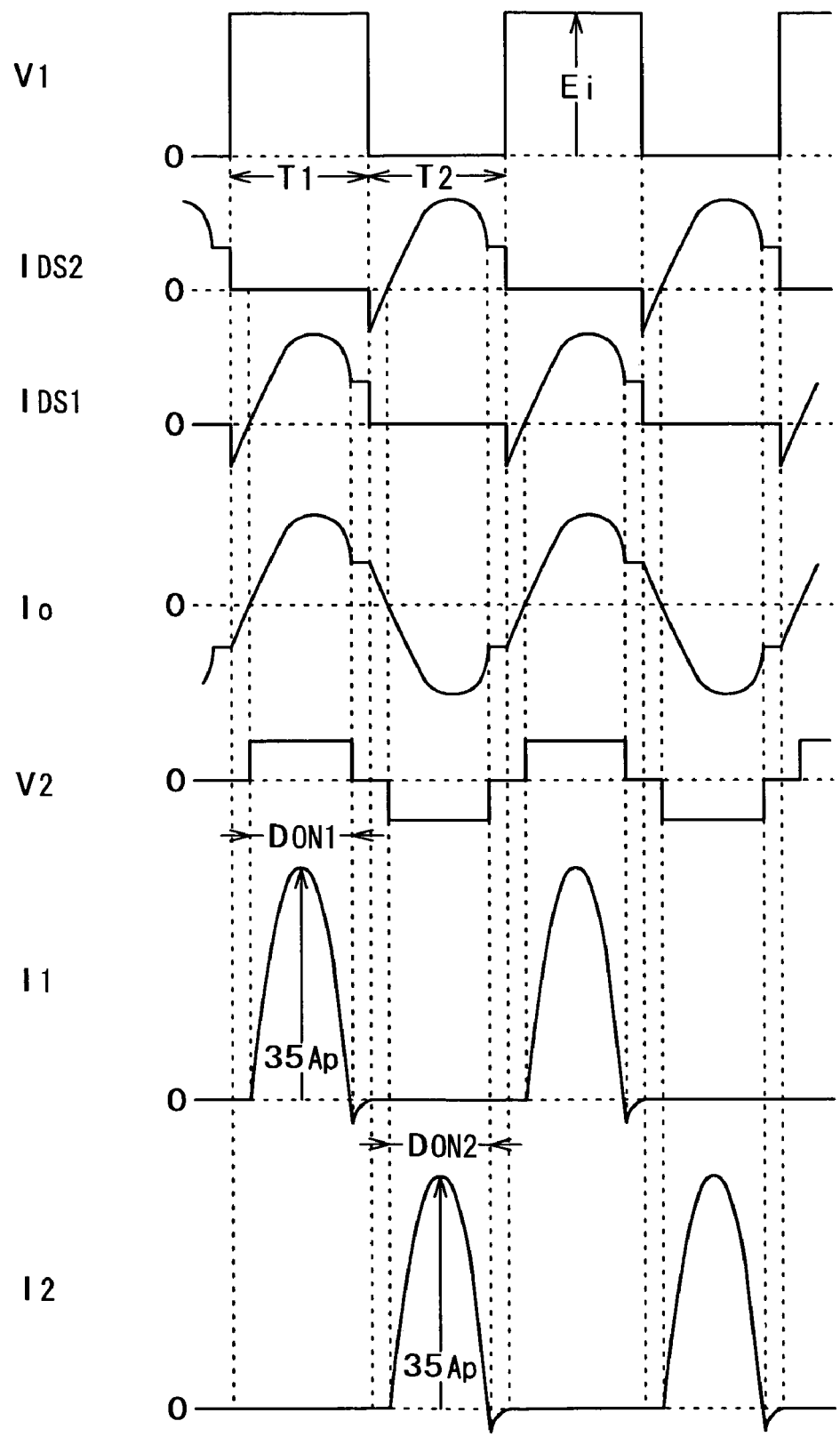

SWITCHING POWER SUPPLY CIRCUIT

BACKGROUND OF THE INVENTION

This invention relates to a switching power supply circuit incorporated as a power supply in various electronic apparatus.

Various switching power supply circuits are widely known including, for example, a switching power supply circuit of the flyback converter type or the forward converter type. The switching converters of the types mentioned are restricted in suppression of switching noise because the switching operation waveform is a rectangular waveform. Further, it is known that the switching converters are limited in improvement in the power conversion efficiency from their operation characteristics.

Therefore, various switching power supply circuits which use a resonance converter have been proposed and placed into practical use. The resonance converters are advantageous in that a high power conversion efficiency can be achieved readily and low noise can be achieved because the switching operation waveform thereof is a sine waveform. The resonance converters are advantageous also in that they can be composed of a comparatively small number of components.

FIG. 23 shows an example of a conventional switching power supply circuit which includes a resonance converter. The power supply circuit includes a combination of a current resonance converter of the separately excited type and a partial voltage resonance circuit.

Referring to FIG. 23, the power supply circuit shown includes a full-wave rectification smoothing circuit for an ac input voltage VAC. The full-wave rectification smoothing circuit includes a bridge rectification circuit (rectification circuit section) Di and a single smoothing capacitor Ci. A rectified smoothed voltage (dc input voltage) Ei is obtained across the smoothing capacitor Ci by a full-wave rectification operation of the bridge rectification circuit Di and the smoothing capacitor Ci. The rectified smoothed voltage Ei has a level equal to the ac input voltage VAC.

The current resonance converter which receives the dc input voltage to perform a switching operation includes two switching elements Q1, Q2 each in the form of a MOS-FET connected in half-bridge connection. Damper diodes DD1, DD2 each in the form of a body diode are connected in parallel in directions shown in FIG. 23 between the drains and the sources of the switching elements Q1, Q2, respectively.

A partial resonance capacitor Cp is connected in parallel between the drain and the source of the switching element Q2. The capacitance of the partial resonance capacitor Cp and the leakage inductance L1 of a primary winding N1 form a parallel resonance circuit (partial voltage resonance circuit). Thus, a partial voltage resonance operation wherein voltage resonance is exhibited only upon turning off of the switching elements Q1, Q2 is obtained.

In the power supply circuit, in order to drive the switching elements Q1, Q2 for switching, an oscillation and drive circuit 2 is provided which may be formed typically from an IC for universal use. The oscillation and drive circuit 2 includes an oscillation circuit and a drive circuit. The oscillation circuit and the drive circuit cooperatively generate a drive signal (gate voltage) of a required frequency to be applied to the gates of the switching elements Q1, Q2. Consequently, the switching elements Q1, Q2 perform a switching operation wherein they alternately switch on/off in a required switching frequency.

An insulating converter transformer PIT transmits a switching output of the switching elements Q1, Q2 to the secondary side. The primary winding N1 of the insulating converter transformer PIT is connected at one end thereof to a node (switching output point) between the source of the switching element Q1 and the drain of the switching element Q2 through a series connection of a primary side series resonance capacitor C1 so that the switching output is transmitted.

The primary winding N1 is connected at the other end thereof to the primary side ground.

The capacitance of the series resonance capacitor C1 and the leakage inductance L1 of the insulating converter transformer PIT including the primary winding N1 form a primary side series resonance circuit for achieving operation of the current resonance type as operation of the primary side switching converter.

Thus, the primary side switching converter described above provides operation of the current resonance type by the primary side series resonance circuit (L1-C1) and partial voltage resonance operation by the partial voltage resonance circuit (Cp//L1) described hereinabove.

In other words, the power supply circuit shown in FIG. 23 has a configuration which includes a combination of a resonance circuit for forming a primary side switching converter as that of the resonance type with another resonance circuit. In the present specification, a switching converter of the type just described is referred to as composite resonance converter.

Though not shown in the drawings, the insulating converter transformer PIT includes an EE type core which includes a combination of E type cores typically made of a ferrite material. A wiring receiving portion of the insulating converter transformer PIT is divided into winding receiving portions for the primary side and the secondary side, and the primary winding N1 and a secondary winding (N2A and N2B) described below are wound on a central magnetic leg of the EE type core.

The secondary winding of the insulating converter transformer PIT has a center tap and is therefore divided into two secondary windings N2A, N2B. An alternating voltage corresponding to a switching output transmitted to the primary winding N1 is excited in each of the secondary windings N2A, N2B.

The center tap between the secondary windings N2A, N2B is connected to the secondary side ground. A full-wave rectification circuit is connected to the secondary windings N2A, N2B and includes rectification diodes D01, D02 and a smoothing capacitor C0. Consequently, a secondary side dc output voltage E0 is obtained as a voltage across the smoothing capacitor C0. The secondary side dc output voltage E0 is supplied to a load not shown and is dividedly inputted also as a detection voltage for a control circuit 1 described below.

The control circuit 1 supplies a detection output corresponding to a level variation of the secondary side dc output voltage E0 to the oscillation and drive circuit 2. The oscillation and drive circuit 2 drives the switching elements Q1, Q2 with a switching frequency which varies in response to the detection output of the control circuit 1 inputted thereto. As the switching frequency of the switching elements Q1, Q2 is varied in this manner, the level of the secondary side dc output voltage is stabilized.

Operation waveforms of the power supply circuit having the circuit configuration described above with reference to FIG. 23 where the power supply circuit is configured so as to be ready for load conditions of low voltage and high current are shown in FIG. 24. The operation waveforms of FIG. 24 were obtained by performing a measurement under the conditions of the ac input voltage VAC=100 V and the load power Po=100 W. Further, as the conditions of low voltage and high current, the secondary side dc voltage Eo is Eo=5 V and the primary side series resonance current Io which is switching current of the primary side switching converter is Io=25 A.

In order to obtain a result of the experiment based on the operation waveforms shown in FIG. 24, part elements and so forth of the power supply circuit were selected under the following conditions.

First, the numbers of turns of the secondary windings N2A, N2B and the primary winding N1 were set so that the induced voltage level per one turn (1 T) of the secondary side winding might be 5 V/T, and particularly the secondary windings N2A, N2B and the primary winding N1 were set to N2A=N2B=1 T and N1=30 T, respectively.

Further, a gap of approximately 1.0 mm was formed in the central magnetic leg of the EE type core of the insulating converter transformer PIT so that a coupling coefficient of approximately 0.85 was obtained between the primary winding N1 and the secondary windings N2A, N2B.

Further, the primary side series resonance capacitor C1 and the partial voltage resonance capacitor Cp were set to C1=0.068 µF and Cp=330 µF, respectively, and a Schottky diode of 50 A/40 V was selected for the rectification diodes Do1, Do2.

In the waveform diagram of FIG. 24, the voltage V1 across the switching element Q2 corresponds to on/off states of the switching element Q2. In short, the waveform of the voltage V1 has a rectangular waveform which exhibits the 0 level within a period T2 within which the switching element Q2 is on and has a predetermined level clamped within another period T1 within which the switching element Q2 is off. Then, the switching current IDS2 which flows through the switching element Q2//damper diode DD2 exhibits a waveform which exhibits a negative polarity upon turning on of the switching element Q2 as the switching current IDS2 flows through the damper diode DD2 as seen within a period T2 but exhibits the 0 level upon turning off of the switching element Q2 as the switching current IDS2 flows from the drain to the source of the switching element Q2 because of the positive polarity within another period T1.

Meanwhile, the switching element Q1 performs a switching operation such that it switches on/off alternately relative to the switching element Q2. Therefore, the switching current IDS1 which flows through the switching element Q1// damper diode DD1 has a waveform having a phase shifted by 180° with respect to the switching current IDS2.

Thus, the primary side series resonance current Io which flows through the primary side series resonance circuit (C1-L1) connected between the switching output point of the switching elements Q1, Q2 and the primary side ground has a waveform formed by combining a sine wave component of the resonance current of the primary side series resonance circuit (C1-L1) and a sawtooth waveform component generated by exciting inductance of the primary winding N1. The waveform corresponds to a composite waveform of the switching current IDS1 and the switching current IDS2.

The load power Po=100 W which is a measurement condition then is a heavy load condition proximate to a maximum load as a load condition with which the power supply circuit shown in FIG. 23 is compatible. However, in a condition wherein the load is in a heavy load tendency in a compatible load power range, the rectification current on the secondary side exhibits a discontinuous mode.

Here, in a configuration wherein the switching frequency is variably controlled to stabilize the secondary side dc output voltage Eo in such a manner as described hereinabove, for example, where the load is in a light load tendency, such control as to raise the switching frequency is performed to achieve stabilization. In this state, the rectification circuit on the secondary side operates in a continuous mode wherein the period within which the secondary side rectification current flows through the secondary side smoothing capacitor continues and does not include a period within which the secondary side rectification current stops.

On the other hand, where the load enters a heavy load condition as described above and the level of the secondary side dc output voltage Eo enters a dropping tendency, control is performed so as to lower the switching frequency of the primary side. According to this control, a discontinuous mode is entered wherein the secondary side rectification current does not flow continuously through the secondary side smoothing capacitor to produce a current discontinuous period.

In particular, the secondary winding voltage V2 generated in the secondary winding N2A in such a heavy load condition as described above exhibits a waveform wherein the secondary winding voltage V2 is clamped at a predetermined absolute value level only within a period within which the primary side series resonance current Io flows in a sine wave as seen in FIG. 24, and within a period within which the sawtooth waveform component by the exciting inductance flows as the primary side series resonance current Io within the period, the secondary winding voltage V2 exhibits the 0 level. A waveform reversed from the secondary winding voltage V2 is generated in the secondary winding N2B.

Therefore, the rectification current I1 flowing through the rectification diode Do1 and the rectification current I2 flowing through the rectification diode Do2 flow only within the periods DON1, DON2 within which the primary side series resonance current Io flows in a sine wave, but do not flow within any other period. In other words, the rectification current on the secondary side flows discontinuously into the smoothing capacitor.

It is to be noted that the level of the secondary side dc output voltage Eo is inclined to vary also in response to the level of the commercial ac power supply AC (ac input voltage VAC) and variable control of the switching frequency responsive to the variation is performed, and therefore, also the variation of the commercial ac power supply AC may possibly make a cause of establishment of the discontinuous mode described above.

Further, since the voltage drop in the forward direction of the rectification diodes Do1, Do2 which are Schottky diodes is 0.6 volts and, in such operation of the secondary side as described above, the rectification currents I1, I2 exhibit a considerably high level of 35 Ap, the continuity loss by the rectification diodes appears conspicuously, resulting in increasing power loss.

According to a result of the actual measurement, the DC to DC power conversion efficiency when the dc input voltage (rectified smoothed voltage Ei)=100 V is approximately 82% to the utmost.

Thus, as a technique for reducing the continuity loss of rectification current on the secondary side, a synchronous rectification circuit is known wherein a MOS-FET having low on resistance is used for rectification. An example of a configuration of a synchronous rectification circuit of the type described which uses a winding voltage detection system is shown in FIG. 25.

It is to be noted that, in FIG. 25, a configuration only of the secondary side of an insulating converter transformer PIT is shown. The primary side has a configuration similar to that shown in FIG. 23. Further, as a constant voltage control system, a switching frequency control system is used wherein the switching frequency of the primary side switching converter is variably controlled in response to the level of the secondary side dc output voltage Eo.

Further, also the power supply circuit having the secondary side shown in FIG. 25 is ready for the conditions of low voltage and high current (VAC=100 V, load power Po=100 W, Eo=5 V and Io=25 A) similar to those in the case of FIG. 23.

Also in this instance, the secondary windings N2A, N2B of the secondary winding having numbers of turns each to each other are connected at one ends thereof to each other by a center tap, and the center tap output is connected to the positive terminal of the smoothing capacitor Co. The other end of the secondary winding N2A is connected to the secondary side ground (negative terminal side of the smoothing capacitor Co) through the drain-source of an N-channel MOS-FET Q3. Similarly, the other end of the secondary winding N2B is connected to the secondary side ground (negative terminal side of the smoothing capacitor Co) through the drain-source of an N-channel MOS-FET Q4. In short, in this instance, the MOS-FETs Q3, Q4 are inserted in series to the negative electrode side in the rectification current paths of the secondary windings N2A, N2B, respectively. It is to be noted that body diodes DD3, DD4 are connected to the drains—sources of the MOS-FETs Q3, Q4, respectively.

A drive circuit for driving the MOS-FET Q3 includes a gate resistor Rg1 connected between a node between the secondary winding N2B and the drain of the MOS-FET Q4 and the gate of the MOS-FET Q3, and a resistor R11 connected between the gate of the MOS-FET Q3 and the secondary side ground.

Similarly, a drive circuit for driving the MOS-FET Q4 includes a gate resistor Rg2 connected between a node between the secondary winding N2A and the drain of the MOS-FET Q3 and the gate of the MOS-FET Q4, and a resistor R12 connected between the gate of the MOS-FET Q4 and the secondary side ground.

If an on voltage is applied to the gate of a MOS-FET, then the drain-source becomes equivalent to a mere resistor, and therefore, current can flow in the opposite directions. If it is tried to cause the MOS-FET to function as a rectification element on the secondary side, then current must flow only in the direction in which the positive electrode of the smoothing capacitor Co is charged. If current flows in the reverse direction, then discharge current flows from the smoothing capacitor Co to the insulating converter transformer PIT side, and therefore, power cannot be transmitted efficiently to the load side. Further, the reverse current gives rise to generation of heat by the MOS-FET or to production of noise and also to switching loss on the primary side.

The drive circuit described above is provided for driving the MOS-FETs Q3, Q4 to switch so that current flows only in the direction in which the positive electrode terminal of the smoothing capacitor Co is charged based on detection of the voltage of the secondary winding.

A waveform diagram of FIG. 26 illustrates operation of the power supply circuit having the configuration of the secondary side shown in FIG. 25 (and the configuration of the primary side similar to that shown in FIG. 23) when the load power Po is Po=100 W. As described hereinabove, the load power Po=100 W in this instance is a substantially maximum load condition.

Referring to FIG. 26, the voltage V1 across the switching element Q2 and the corresponding secondary winding voltage V2 across the opposite ends of the secondary windings N2A–N2B exhibit timings similar to those of FIG. 24. It is to be noted that the secondary winding voltage V2 illustrated in FIG. 26 has the polarity where it is viewed from the node side between the secondary winding N2A and the gate resistor Rg2, and if it is viewed from the node side between the secondary winding N2B and the gate resistor Rg1, then the secondary winding voltage V2 has the opposite polarity.

The drive circuit for the MOS-FET Q4 operates such that, when the secondary winding voltage V2 of the polarity shown in FIG. 26 comes to a period within which it is to be clamped with a predetermined level of the negative polarity, the drive circuit applies an on voltage of a level which is set by the gate resistor Rg2 and the resistor R12 to the gate of the MOS-FET Q4.

Similarly, the drive circuit (gate resistor Rg1 and resistor R11) for the MOS-FET Q3 operates such that, when the secondary winding voltage (V2) of the polarity reverse to that shown in FIG. 26 comes to a period within which it is to be clamped with a predetermined level of the negative polarity, the drive circuit applies an on voltage to the gate of the MOS-FET Q3.

Consequently, the rectification currents I1, I2 of the positive polarity flow through the MOS-FETs Q3, Q4 within periods DON1, DON2 as seen in FIG. 26, respectively. The rectification currents I1, I2 flowing within a period within which the secondary winding voltage V2 illustrated in FIG. 26 is clamped in the positive/negative are approximately 35 Ap similarly as in the case of the circuit of FIG. 23 (rectification currents I1, I2 of the waveform diagram of FIG. 24). However, the MOS-FETs Q3, Q4 have low on resistance, and the continuity loss of rectification current by the MOS-FETs Q3, Q4 can be reduced significantly when compared with the rectification diodes Do1, Do2 each formed from a Schottky diode. Further, as can be recognized also from the fact that the drive circuit is composed only from resistance elements, the winding voltage detection method is advantageous also in that the drive circuit system is simple in configuration.

However, in such a heavy load (load power Po=100 W) condition as in the case of FIG. 26, also the secondary side rectification current of the power supply circuit exhibits a discontinuous mode. This is indicated by the fact that the periods DON1, DON2 in FIG. 26 are discontinuous.

In the discontinuous mode, even if the charging current as the rectification currents I1, I2 to the smoothing capacitor Co decreases to the 0 level, current flows in the same direction through the primary winding N1 of the insulating converter transformer PIT. In the case of the waveform diagram of FIG. 24, this is indicated by the fact that the exciting inductance component of the primary winding N1 in the primary side series resonance current Io flows with the same polarity as that at the immediately preceding timing. Consequently, since actually the polarities of voltages induced in the secondary windings N2A, N2B are not reversed, the MOS-FETs Q3, Q4 maintain an on state without being placed into a completely off state. As a result, the rectification currents I1, I2 flow as currents of the reverse direction within the other periods than the periods DON1, DON2. Although the rectification currents I1, I2 of the reverse direction within the other periods than the periods DON1, DON2 provide reactive power, since the levels of the rectification currents I1, I2 are approximately 8 Ap and comparatively high, also the reactive energy exhibits a corresponding high level.

In this manner, where the synchronous rectification circuit employs the winding voltage detection system, although the continuity loss of rectification current decreases, since reactive power is generated in such a manner as described above, it is generally difficult to achieve effective improvement of the power conversion efficiency.

A waveform diagram of FIG. 27 illustrates operation of the power supply circuit having the secondary side configuration shown in FIG. 25 under a light load condition.

In an actual form of the power supply circuit shown in FIG. 25, constant voltage control by switching frequency control is performed as described above in connection with the configuration of the power supply circuit shown in FIG. 23. However, if a light load condition is entered and the secondary side dc output voltage rises, then the switching frequency is raised to lower the secondary side dc output voltage. The power supply circuit thereby operates so as to achieve stabilization.

In such a light load condition as described above, the secondary winding voltage V2 reverses at a substantially same timing as that of the voltage V1 across the switching element Q2 illustrated in FIG. 27. In response to this, the rectification currents I1, I2 flow such that they continuously charge the smoothing capacitor Co without any rest period between the periods DON1, DON2. In other words, a continuous mode is obtained. At this time, such a period within which the rectification currents I1, I2 flow in the reverse direction as described as the operation in the heavy load condition with reference to FIG. 26 does not exist any more, and no corresponding reactive power is generated.

In this manner, also the power supply circuit of the configuration wherein the secondary side rectification circuit system is replaced by the synchronous rectification circuit according to the winding voltage detection method still has the problem of a drop of the power conversion efficiency upon the heavy load operation.

As a technique for eliminating the problem of generation of reactive power by rectification current in the reverse direction as seen from FIG. 26, a synchronous rectification circuit according to the rectification current detection system is known. The rectification current detection system is a technique wherein the MOS-FET is turned off before the rectification current charged into the smoothing capacitor Co decreases to the zero level.

An example of a configuration of a synchronous rectification circuit according to the rectification current detection system is shown in FIG. 28. It is to be noted that, in FIG. 28, a configuration which performs half-wave rectification is shown for simplified illustration and description.

In the rectification current detection system, a current transformer TR is provided for detecting current flowing through a secondary winding N2. A primary winding Na of the current transformer TR is connected to an end portion of the secondary winding N2 and the drain of the MOS-FET Q4. The source of the MOS-FET Q4 is connected to the negative electrode terminal of a smoothing capacitor Co.

A resistor Ra is connected in parallel to a secondary winding Nb of the current transformer TR. Further, diodes Da, Db are connected in parallel to the secondary winding Nb such that the forward voltage directions thereof may be opposite to each other to form a parallel connection circuit. A comparator 20 is connected to the parallel connection circuit. A reference voltage Vref is inputted to the negated input of the comparator 20. It is to be noted that an end portion of the parallel connection on the side to which the anode of the diode Da and the cathode of the diode Db are connected is connected to a node between the reference voltage Vref and the negated input of the comparator 20. On the other hand, the opposite end portion of the parallel connection circuit to which the cathode of the diode Da and the anode of the diode Db are connected is connected to the non-negated input of the comparator 20.

In this instance, the output of the comparator 20 is amplified by a buffer 21 and applied to the gate of the MOS-FET Q4.

Operation of the circuit having the configuration shown in FIG. 28 is illustrated in FIG. 29.

If a voltage induced in the secondary winding N2 becomes higher than a voltage (Eo) across the smoothing capacitor Co, then rectification current Id first begins to flow in the anode→cathode direction of the body diode of the MOS-FET Q4 so as to charge the smoothing capacitor Co. Since the rectification current Id flows to the primary winding Na of the current transformer TR, a voltage Vnb corresponding to the rectification current Id flowing through the primary winding Na is induced in the secondary winding Nb of the current transformer TR. The comparator 20 compares the voltage Vnb with the reference voltage Vref and outputs the H (high) level if the voltage Vnb is higher than the reference voltage Vref. The output of the H level is applied as an on voltage to the gate of the MOS-FET Q4 from the buffer 21 to turn on the MOS-FET Q4. Consequently, the rectification current Id flows in the drain→source direction of the MOS-FET Q4. In FIG. 29, it is shown that the rectification current Id flows with the positive polarity.

Then, when the level of the rectification current Id drops in response to lapse of time and the voltage Vnb becomes equal to or lower than the reference voltage Vref in response to the drop of the level of the rectification current Id, the comparator 20 reverses the output thereof. The reversed output is outputted through the buffer 21 to cause the gate of the MOS-FET Q4 to discharge thereby to turn off the MOS-FET Q4. It is to be noted that, at this point of time, the remaining rectification current Id flows in a short period of time through a body diode DD4.

As a result of such operation as described above, the MOS-FET Q4 is turned off at a timing before the rectification current Id decreases to the 0 level. Consequently, such a situation that reverse direction current flows through the MOS-FET within a period within which the rectification current is discontinuous as seen in FIG. 26 is eliminated, and no reactive power is generated. Consequently, the power conversion efficiency rises as much.

For example, the dc→dc power conversion efficiency where the synchronous rectification circuit according to the rectification current detection system of full-wave rectification and based on the configuration described hereinabove with reference to FIG. 28 was used as the configuration of the secondary side of the power supply circuit shown in FIG. 23 was measured under conditions similar to those described hereinabove with reference to FIG. 24 or 26. From the measurement, a result was obtained that the dc→dc conversion efficiency is improved to approximately 90%.

However, with the synchronous rectification circuit of the rectification current detection system described above, at least one current transformer corresponding to one MOS-FET and a comparatively complicated drive circuit system for driving the MOS-FET with an output of the current transformer are required as can be recognized also from FIG.

28. Consequently, the circuit configuration is complicated, and this gives rise to a disadvantage in that it causes drop of the production efficiency, increase of the cost, expansion of the size of a circuit board and so forth.

Particularly where the configuration of the switching converter on the primary side shown in FIG. 23 is used as a basic configuration and a synchronous rectification circuit of the rectification current detection system is provided on the secondary side, it is necessary to provide a full-wave rectification circuit on the secondary side. Accordingly, two sets of such a current transformer and a drive circuit system as described above are required individually corresponding to the MOS-FETs Q3, Q4, and this makes the problem described above further serious.

In this manner, between the winding voltage detection system and the rectification current detection system, the winding voltage detection system is less advantageous in terms of the power conversion efficiency because of reactive power, but is simple in the circuit configuration. In contrast, the rectification current detection system is more advantageous in terms of the power conversion efficiency because no reactive power is generated, but is complicated in the circuit configuration. In this manner, the two methods have the mutually tradeoff relationship.

Accordingly, it is demanded that a power supply circuit which includes a synchronous rectification circuit be configured so that increase of the loss by reactive power may be eliminated while the circuit configuration is as simple as possible.

SUMMARY OF THE INVENTION

It is an object of the present invention to provide a switching power supply circuit which is simple in circuit configuration and is free from increase of the loss by reactive power.

It is another object of the present invention to provide a switching power supply circuit which can achieve a high power conversion efficiency and besides achieve reduction of the circuit scale and reduction of the cost by simplification in circuit configuration.

In order to attain the object described above, according to the present invention, there is provided a switching power supply circuit, including a rectification smoothing section for rectifying and smoothing an ac input voltage to produce a dc input voltage, a switching section including a plurality of switching elements for switching the dc input voltage to intermittently output the dc input voltage, a drive section for driving the switching element for switching operation, an insulating converter transformer including a primary winding provided on a primary side and a secondary winding provided on a secondary side for transmitting the switching output of the switching section from the primary side to the secondary side, a primary side resonance capacitor connected to a predetermined location of the primary side and having a capacitance for cooperating with a leakage inductance component of the primary winding of the insulating converter transformer to form a primary side resonance circuit for causing the switching section to perform operation of the resonance type, a secondary side smoothing capacitor, a synchronous rectification circuit of a winding voltage detection system for rectifying an alternating voltage induced in the secondary winding of the insulating converter transformer and charging the secondary side smoothing capacitor with resulting rectification current to obtain a secondary side dc output voltage as a voltage across the secondary side smoothing capacitor, and a constant voltage control section for controlling a switching frequency of the switching section so that, when a level of the secondary side dc output voltage is low, the switching frequency is lowered, but when the level of the secondary side dc output voltage is high, the switching frequency is raised to perform constant voltage control of the secondary side dc output voltage, the insulating converter transformer having a magnetic flux density set lower than a predetermined level so that the secondary side rectification current flowing through the synchronous rectification circuit is maintained in a continuous mode even when the switching frequency drops lower than a predetermined level as a result of the control of the constant voltage control section, the synchronous rectification circuit including an inductor element having a cylindrical bead core and inserted in the rectification current path for charging the secondary side smoothing capacitor with the rectification current, the inductor element having a dc superposition characteristic set such that the secondary side rectification current is maintained in the continuous mode where a load to which the secondary side dc output voltage is connected is within a range within which the load decreases to no load.

In the switching power supply circuit, the primary side switching converter has a configuration as a resonance converter, and the secondary side includes a synchronous rectification circuit of the winding voltage detection system.

Then, the flux density of the insulating converter transformer is set lower than a predetermined level. Therefore, even when a heavy load condition is entered and the switching frequency drops lower than a predetermined level, the secondary side rectification current is maintained in the continuous mode. Where the secondary side rectification current is maintained in the continuous mode, reactive power which arises from appearance of reverse directional current on the rectification current within a discontinuous period of the secondary side rectification current, which matters with a synchronous rectification circuit of the winding voltage detection system, can be reduced.

Further, the inductor element is inserted in the secondary side rectification current path. The inductor element suppresses reverse directional current generated on the rectification current by counter electromotive force when the rectification current flows through the inductor element. In short, further reduction of the reactive power caused by reverse directional current generated on the rectification current can be anticipated.

Further, the inductor element has a dc superposition characteristic set such that the continuous mode is maintained within a range within which the load decreases to no load. Consequently, the continuous mode can be maintained also in very light load operation wherein the load current is proximate to the zero level. As a result, abnormal oscillation operation which occurs in a very light load condition is prevented.

With the switching power supply circuit, while it includes a synchronous rectification circuit of the winding voltage detection system, reactive force corresponding to a discontinuous period of the secondary side rectification current does not appear. Thus, the power conversion efficiency can be improved to a degree substantially equal to that, for example, where a synchronous rectification circuit of the rectification current detection system is used. Besides, since the circuit configuration itself of the synchronous rectification circuit is that of the winding voltage detection system, a simpler configuration than that of the rectification current detection system can be adopted.

In other words, the switching power supply circuit as a composite resonance converter including a synchronous rectification circuit can achieve both of an advantage that a high power conversion efficiency is obtained and another advantage that reduction of the circuit scale and reduction of the cost by simplification of the circuitry are achieved. The switching power supply circuit is advantageous particularly where it is used for conditions of a low voltage and high current.

Further, the inductor element inserted in the secondary side rectification current path can suppress reverse directional current appearing in the rectification current. Consequently, further reduction of the reactive power can be anticipated.

Further, since the dc superposition characteristic of the inductor element is set in such a manner as described above, the continuous mode is maintained even in a very light load condition. Consequently, stabilized operation can be achieved over a range from maximum load operation to no load operation.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 6 is a schematic view illustrating a wound state of the secondary winding of the insulating converter transformer shown in FIGS. 4 and 5;

FIGS. 7 and 8 are schematic views showing another example of a configuration of the secondary winding of the insulating converter transformer shown in FIG. 1;

FIG. 24 is a waveform diagram illustrating operation of the power supply circuit of FIG. 23 in a heavy load condition;

DESCRIPTION OF THE PREFERRED EMBODIMENTS

Figure 1:
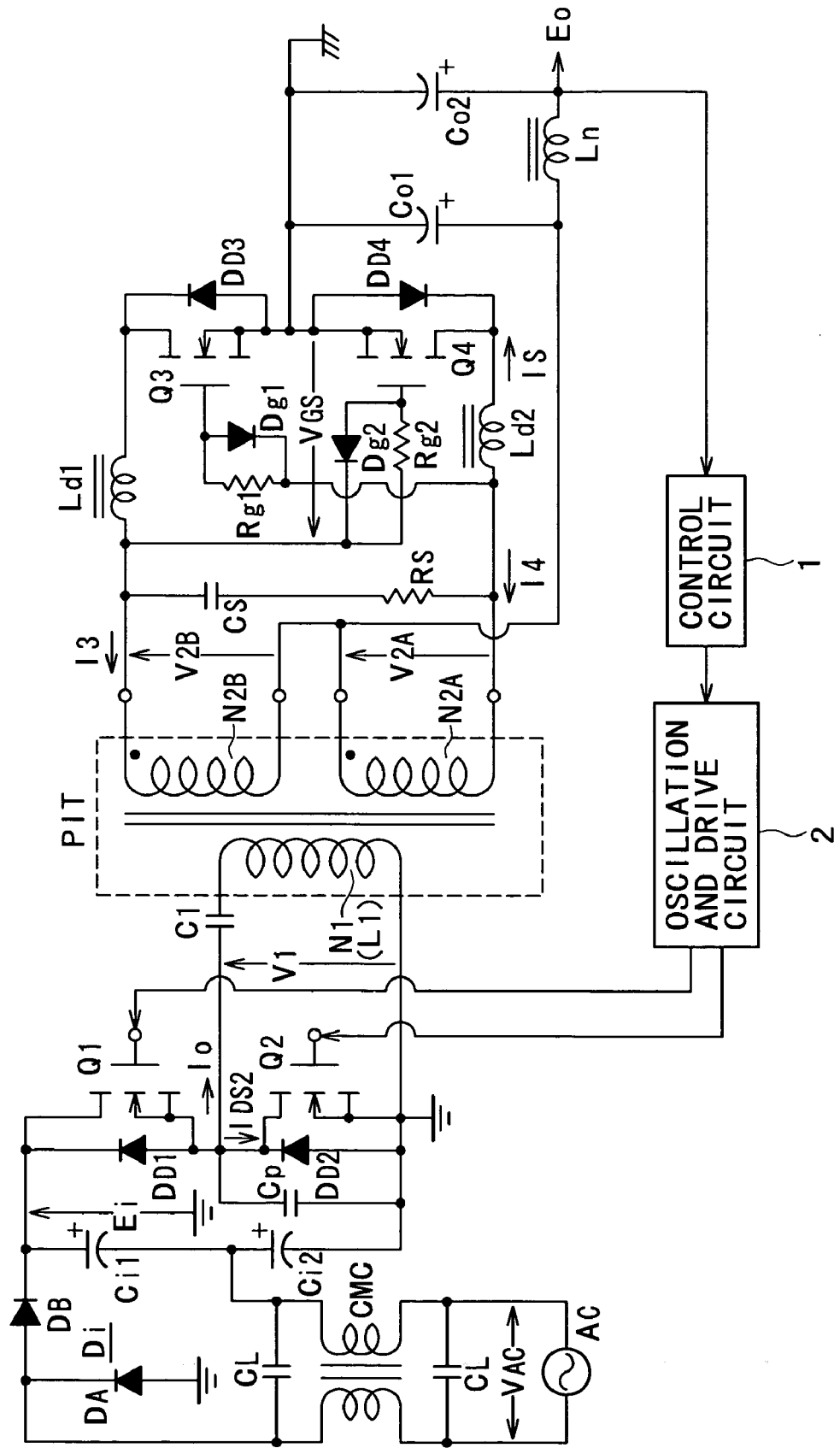
FIG. 1 is a circuit diagram showing a basic circuit configuration of a switching power supply circuit to which the present invention can be applied.

FIG. 1 shows a basic configuration of a switching power supply circuit to which the present invention can be applied and on which a first embodiment of the present invention hereinafter described is based. The power supply circuit is generally configured such that it includes, as a basic configuration of the primary side, a combination of a partial voltage resonance circuit with a current resonance converter according to a half bridge coupling system of the separately excited type.

In the power supply circuit shown in FIG. 1, a noise filter is formed from a pair of filter capacitors CL and a common mode choke coil CMC for a commercial ac power supply AC.

A voltage doubler rectification circuit is connected as a succeeding stage of the noise filter and includes a rectification circuit section Di formed from rectification diodes DA, DB and two smoothing capacitors Ci1, Ci2. The voltage doubler rectification circuit produces a level rectified smoothed voltage Ei (dc input voltage) corresponding to twice the ac input voltage VAC as a voltage between the opposite ends of the smoothing capacitors Ci1, Ci2.

In a condition wherein the load requires comparatively high current, also a high level of current is required for the circuit on the primary side switching converter side. This increases the switching loss and so forth and therefore deteriorates the power conversion efficiency. Therefore, the rectification circuit system for generating a dc input voltage is formed from a voltage doubler rectification circuit as described above so that the level of current to flow through the circuit of the primary side switching converter can be reduced to approximately ½ that where the rectified smoothed voltage Ei of a level equal to the ac input voltage VAC is supplied, for example, through ordinary full-wave rectification. Consequently, the switching loss by the primary side switching converter is reduced.

The current resonance converter for receiving the dc input voltage to perform switching actions includes a switching circuit formed from two switching elements Q1, Q2 each in the form of a MOS-FET connected in half bridge connection. Damper diodes DD1, DD2 are connected in parallel between the drains and the sources of the switching elements Q1, Q2, respectively. The anode and the cathode of the damper diode DD1 are connected to the source and the drain of the switching element Q1, respectively. Similarly, the anode and the cathode of the damper diode DD2 are connected to the source and the drain of the switching element Q2, respectively. The damper diodes DD1, DD2 are body diodes provided for the switching elements Q1, Q2, respectively.

A partial resonance capacitor Cp is connected in parallel between the drain and the source of the switching element Q2. The capacitance of the partial resonance capacitor Cp and the leakage inductance L1 of a primary winding N1 of a insulating converter transformer PIT form a parallel resonance circuit (partial voltage resonance circuit). Thus, partial voltage resonance operation wherein voltage resonance occurs only when the switching elements Q1, Q2 turn off is obtained.

In the power supply circuit, in order to drive the switching elements Q1, Q2 for switching, an oscillation and drive circuit 2 is provided. The oscillation and drive circuit 2 includes an oscillation circuit and a drive circuit and may be formed typically from an IC for universal use. The oscillation circuit and the drive circuit of the oscillation and drive circuit 2 cooperatively generate a drive signal (gate voltage) of a required frequency to be applied to the gates of the switching elements Q1, Q2. Consequently, the switching elements Q1, Q2 perform switching operation wherein they alternately switch on/off in a required switching frequency.

The insulating converter transformer PIT is provided to transmit a switching output of the switching elements Q1, Q2 to the secondary side.

The primary winding N1 of the insulating converter transformer PIT is connected at one end thereof to a node (switching output point) between the source of the switching element Q1 and the drain of the switching element Q2 through a series connection of a primary side parallel resonance capacitor C1 so that the switching output is transmitted.

The primary winding N1 is connected at the other end thereof to the primary side ground.

The insulating converter transformer PIT has a structure hereinafter described, and the primary winding N1 of the insulating converter transformer PIT has a required leakage inductance L1. The capacitance of the series resonance capacitor C1 and the leakage inductance L1 of the insulating converter transformer PIT form a primary side series resonance circuit for achieving operation of the current resonance type as operation of the primary side switching converter.

Thus, the primary side switching converter described above provides operation of the current resonance type according to the primary side series resonance circuit (L1-C1) and partial voltage resonance operation by the partial voltage resonance circuit (Cp//L1) described hereinabove.

In other words, the power supply circuit shown in FIG. 1 has a configuration of a composite resonance converter which includes a combination of a resonance circuit for forming a primary side switching converter as that of the resonance type with another resonance circuit.

An alternating voltage corresponding to a switching output transmitted to the primary winding N1 is excited in the secondary winding of the insulating converter transformer PIT.

In the circuit of FIG. 1, the secondary winding of the insulating converter transformer PIT includes a set of a secondary winding N2A and another secondary winding N2B across a center tap as seen in FIG. 1.

In this instance, a winding portion of the secondary winding which includes a winding starting end portion side is defined as the secondary winding N2A while the other winding portion which includes a winding ending end portion side is defined as the secondary winding N2B. Further, predetermined numbers of turns are wound individually on the secondary windings N2A and N2B.

A synchronous rectification circuit for full-wave rectification is provided as a rectifying element for the secondary windings N2A, N2B. The synchronous rectification circuit includes N-channel MOS-FETs Q3, Q4. A MOS-FET having, for example, a trench structure of a low voltage resisting property can be selected for the MOS-FETs Q3, Q4 so as to obtain low on resistance.

The center tap output (the winding ending end of the secondary winding N2A and the winding starting end of the secondary winding N2B) of the secondary winding of the insulating converter transformer PIT is connected to the positive electrode terminal of a smoothing capacitor Co1.

The winding ending end of the secondary winding is connected to the secondary side ground (negative electrode terminal side of the smoothing capacitor Co1) though an inductor Ld1 and the drain→source of a MOS-FET Q3.

Meanwhile, the winding starting end of the secondary winding is connected to the secondary side ground (negative electrode terminal side of the smoothing capacitor Co1) through another inductor Ld2 and the drain→source of a MOS-FET Q4.

It is to be noted that body diodes DD3, DD4 are connected to the drains and sources of the MOS-FETs Q3, Q4, respectively.

According to the connection form described above, the MOS-FET Q3 is inserted in series in the rectification current path including the secondary winding N2B. Meanwhile, the MOS-FET Q4 is inserted in series in the rectification current path including the secondary winding N2A.

Further, in the rectification current path including the secondary winding N2B, the inductor Ld1 is inserted in series between the winding ending end of the secondary winding N2B and the drain of the MOS-FET Q3. Similarly, in the rectification current path including the secondary winding N2A, the inductor Ld2 is inserted in series between the winding starting end of the secondary winding N2A and the drain of the MOS-FET Q4.

Further, in the synchronous rectification circuit shown in FIG. 1, a drive circuit for driving the MOS-FET Q3 is formed from a gate resistor Rg1 connected between the winding starting end of the secondary winding N2A and the gate of the MOS-FET Q3.

Similarly, a drive circuit for driving the MOS-FET Q4 is formed from a gate resistor Rg2 connected between the winding ending end of the secondary winding N2B and the gate of the MOS-FET Q4.

In short, the MOS-FET Q3 is rendered conducting when an alternating voltage excited in the secondary winding N2A is detected by the gate resistor Rg1. On the other hand, the MOS-FET Q4 is rendered conducting when an alternating voltage excited in the secondary winding N2B is detected by the gate resistor Rg2.

If an on voltage is applied to the gate of a MOS-FET, then the drain-source becomes equivalent to a mere resistor, and therefore, current can flow in the opposite directions. If it is tried to cause the MOS-FET to function as a rectification element on the secondary side, then current must flow only in the direction in which the positive electrode of a secondary side smoothing capacitor (here, the smoothing capacitor Co1 described above and a smoothing capacitor Co2 hereinafter described) is charged. If current flows in the reverse direction, then discharge current flows from the secondary side smoothing capacitor to the insulating converter transformer PIT side, and therefore, power cannot be transmitted efficiently to the load side. Further, the reverse current gives rise to generation of heat by the MOS-FET or to production of noise and also to switching loss on the primary side.

The drive circuits described above are provided for driving the MOS-FETs Q3, Q4 to switch so that current flows only in the direction in which the positive electrode terminal of the secondary side smoothing capacitor is charged based on detection of the voltage of the secondary winding. In short, the synchronous rectification circuit in this instance has a circuit configuration that the MOS-FETs Q3, Q4 are driven to on/off in synchronism with the rectification current using the winding voltage detection system.

It is to be noted that, in this instance, Schottky diodes Dg1, Dg2 are connected in parallel in directions indicated in FIG. 1 to the gate resistors Rg1, Rg2 which form the driving circuit systems for the MOS-FETs Q3, Q4, respectively. The Schottky diodes Dg1, Dg2 form paths for discharging accumulated charge of the gate input capacitors of the MOS-FETs Q3, Q4 upon turning off of them as hereinafter described, respectively. Thus, the MOS-FETs Q3, Q4 are turned off with certainty to achieve a good switching characteristic.

Further, as described hereinabove, in the power supply circuit shown in FIG. 1, the inductor Ld1 is interposed between the winding ending end of the secondary winding N2B and the drain of the MOS-FET Q3. Further, the inductor Ld2 is interposed between the winding starting end of the secondary winding N2A and the drain of the MOS-FET Q4.

In this instance, the inductors Ld1, Ld2 are set to a comparatively low inductance of, for example, approximately 0.6 μH.

In order to obtain such a low inductance as just mentioned, in the circuit of FIG. 1, a bead core formed cylindrically, for example, from an amorphous magnetic substance or a magnetic substance such as a ferrite material is used for the inductors Ld1, Ld2. Further, for example, a lead wire is inserted in such a cylindrical core to form an inductor element, and this inductor element is mounted on a printed circuit board.

Furthermore, in the circuit of FIG. 1, a snubber circuit formed from a series connection circuit of a capacitor CS and a resistor RS is provided in parallel to the secondary winding of the insulating converter transformer PIT in such a manner as shown in FIG. 1.

In this instance, the capacitor CS side of the snubber circuit is connected to the wiring ending end of the secondary winding (N2B). Meanwhile, the resistor RS side is connected to the winding starting end side of the secondary winding (N2A).

In short, according to the connection form described, the snubber circuit is provided in parallel also to the MOS-FETs Q3, Q4 connected in series.

The reason why the snubber circuit is connected in parallel to the series connection circuit of the MOS-FETs Q3, Q4 in this manner is that it is intended to suppress a spike voltage which appears between the drain and the source of each MOS-FET.

In particular, a spike voltage is usually generated between the drain and the source of each MOS-FET by electric capacity (coss) between the drain and the source upon turning off of the MOS-FET. Such a spike voltage as just described makes an obstacle to drop of the voltage withstanding level of each MOS-FET.

Therefore, the snubber circuit formed from the capacitor CS and the resistor RS is provided in parallel to the series connection circuit of the MOS-FETs Q3, Q4 in such a manner as described above to smooth a peak waveform of such a spike voltage as described above to achieve reduction of the voltage withstanding level between the drain and the source of each MOS-FET.

According to the synchronous rectification circuit having the circuit configuration described above, operation of charging the secondary side smoothing capacitor with rectification current obtained by full-wave rectification is obtained.

In particular, within one of two half periods of an alternating voltage excited in the secondary winding, current flowing through the secondary winding N2B charges the secondary side smoothing capacitor. On the other hand, within the other half period of the alternating voltage, current flowing through the secondary winding N2A charges the secondary side smoothing capacitor. From this, a full-wave rectification operation is obtained.

Such a secondary side dc output voltage Eo as seen in FIG. 1 is obtained as the voltage across the smoothing capacitor. The secondary side dc output voltage Eo is supplied to the load side not shown and is inputted also as a detection voltage to a control circuit 1 described below.

The control circuit 1 supplies a detection output corresponding to a level variation of the secondary side dc output voltage EO to the oscillation and drive circuit 2. The oscillation and drive circuit 2 drives the switching elements Q1, Q2 so that the switching frequency of them may vary in response to the detection output of the control circuit 1 inputted thereto. Since the switching frequency of the switching elements Q1, Q2 is varied in this manner, the power to be transmitted from the primary winding N1 of the insulating converter transformer PIT to the secondary windings N2A, N2B side is varied, and this acts to stabilize the level of the secondary side dc output voltage Eo.

For example, if the load is placed into a heavy load tendency and the secondary side dc output voltage Eo drops, then the switching frequency is controlled so as to become higher thereby to raise the secondary side dc output voltage Eo. On the other hand, if the load is placed into a light load tendency and the secondary side dc output voltage Eo rises, then the switching frequency is controlled so as to become lower thereby to lower the secondary side dc output voltage Eo.

It is to be noted that, since, as described hereinabove, the level of the secondary side dc output voltage Eo is placed into a tendency wherein it varies also in response to the level of the ac input voltage VAC (commercial ac power supply AC), such a constant voltage control operation as described above acts equally also in response to the level variation of the ac input voltage VAC.

Further, in the switching power supply circuit in this instance, a filter circuit formed from the smoothing capacitors Co1 and Co2 and a choke coil Ln is formed on the line of the secondary side dc output voltage Eo.

In the filter circuit, an end of the choke coil Ln is connected to the positive electrode terminal of the smoothing capacitor Co1 in such a manner as seen in FIG. 1. Further, the positive electrode terminal of the smoothing capacitor Co2 is connected to the other end of the choke coil Ln, and the negative electrode terminal of the smoothing capacitor Co2 is grounded to the secondary side ground.

According to the connection form described, a parallel connection circuit of the smoothing capacitor Co1 and the smoothing capacitor Co2 is formed, and the choke coil Ln is inserted between the positive electrode terminals of the smoothing capacitors Co1, Co2.

In short, in the circuit shown in FIG. 1, a π type filter formed from C, L and C elements is provided in the line of the secondary side dc output voltage Eo.

The reason why a filter circuit is provided in the line of the secondary side dc output voltage Eo in this manner is such as follows.

In particular, as described hereinabove, in the basic configuration of FIG. 1, a Schottky diode Dg (Dg1 or Dg2) is connected to the gate of each of the MOS-FETs Q3, Q4. The Schottky diode Dg can compulsorily discard accumulated charge in the gate input capacity of each MOS-FET upon turning off of the MOS-FET to obtain a good turnoff characteristic of the MOS-FET.

However, where the Schottky diode Dg is provided in this manner, while a good turnoff characteristic of each MOS-FET can be obtained, switching noise is likely to be generated in the secondary side rectification current path. This makes it easy for high frequency noise to be superposed also on the secondary side dc output voltage Eo.

Therefore, in the circuit of FIG. 1, such a π type filter as described above is provided so as to achieve suppression of noise appearing on the secondary side dc output voltage Eo in such a manner as described above.

It is to be noted that, for the smoothing capacitors Co1, Co2 of the filter circuit in this instance, for example, an amidine type aluminum electrolytic capacitor is selectively used wherein the capacitance C is, for example, C=6,800 μF and the voltage withstanding property is 6.3 V while the ESR (equivalent series resistance value) is equal to or less than 15 mΩ.

Meanwhile, the choke coil Ln is set such that the DCR (dc resistance value) is DCR=approximately 1 mΩ and the inductance L is L=approximately 0.7 μH.

As a result, the peak level of high frequency noise appearing on the secondary side dc output voltage Eo is suppressed to equal to or less than 100 mV.

The power supply circuit shown in FIG. 1 has such a configuration as described above and is ready for load conditions of low voltage and high current. The conditions of low voltage and high current here may be such that the secondary side dc output voltage Eo is Eo=5 V and the primary side series resonance current Io which is switching current of the primary side switching converter is Io=20 A.

While such conditions as described above are presupposed, various components of the power supply circuit shown in FIG. 1 are configured and selected in such a manner as described below.

Figure 2:
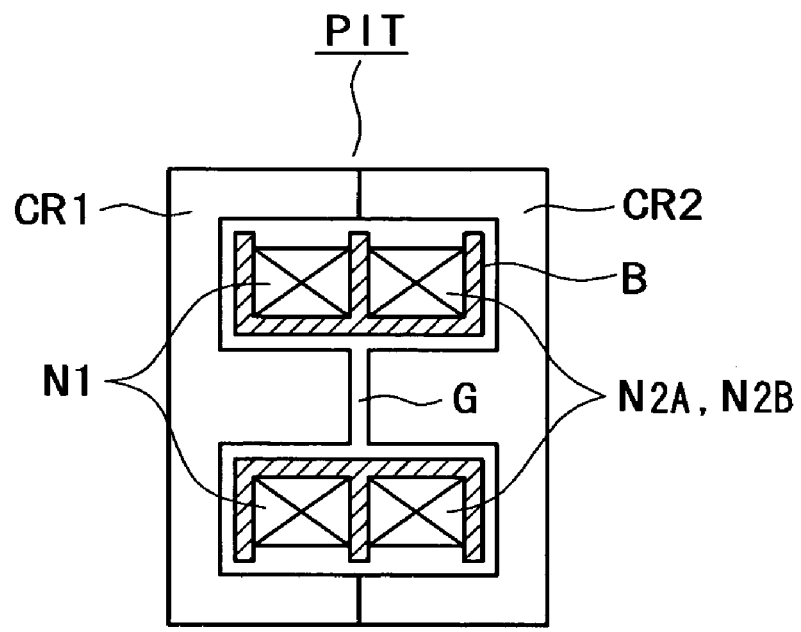
FIG. 2 is a schematic view showing an example of a structure of an insulating converter transformer in the power supply circuit of FIG. 1.

First, the insulating converter transformer PIT has such a structure as shown in FIG. 2.

Referring to FIG. 2, the insulating converter transformer PIT includes an EE type core which in turn includes a pair of E type cores CR1, CR2 made of a ferrite material and combined in such a manner that magnetic legs thereof are opposed to each other.

The insulating converter transformer PIT further includes a bobbin B made of, for example, a resin material and formed divisionally such that a primary side winding portion and a secondary side winding portion are independent of each other. The primary winding N1 is wound on one of the winding portions while the secondary winding (N2A, N2B) is wound on the other winding portion. As the bobbin B on which the primary side winding and the secondary side winding are wound in this manner is attached to the EE type core (CR1, CR2), the primary side winding and the secondary side winding are wound in different winding regions from each other on the central magnetic leg of the EE type core. The structure of the entire insulating converter transformer PIT is obtained in this manner. The EE type core in this instance is made of, for example, EER-40.

A gap G having a gap length of, for example, approximately 1.5 mm is formed in the central magnetic leg of the EE type core in such a manner as seen in FIG. 2. By the gap G, the coupling coefficient k is set so that a loose coupling state of, for example, k=0.8 or less is obtained. In short, the insulating converter transformer PIT in the power supply circuit of FIG. 1 has a looser coupling state than the insulating converter transformer PIT of the power supply circuit shown as a conventional power supply circuit in FIG. 23. It is to be noted that the gap G can be formed by forming the central magnetic leg of each of the E type cores CR1, CR2 shorter than the other two outer magnetic legs.

Further, the numbers of turns of the primary winding N1 and the secondary windings N2A, N2B are set so that the induced voltage level per 1 T (turn) of the secondary side winding may be lower than that of the power supply circuit described hereinabove with reference to FIG. 23. For example, the primary winding N1 and the secondary windings N2A, N2B are set to N1=80 T and N2A=N2B=3 T so that the induced voltage level per 1 T (turn) of the secondary winding may be 2 V/T or less.

Where the numbers of turns of the primary winding N1 and the secondary winding (N2A, N2B) of the insulating converter transformer PIT are set in such a manner as described above, the magnetic flux density of the core of the insulating converter transformer PIT decreases and the leakage inductance of the insulating converter transformer PIT increases when compared with that in the power supply circuit described hereinabove with reference to FIG. 23.

Further, in this instance, the secondary winding (N2A, N2B) of the insulating converter transformer PIT is configured, for example, in such a manner as described below with reference to FIGS. 3 to 6.

Figure 3:
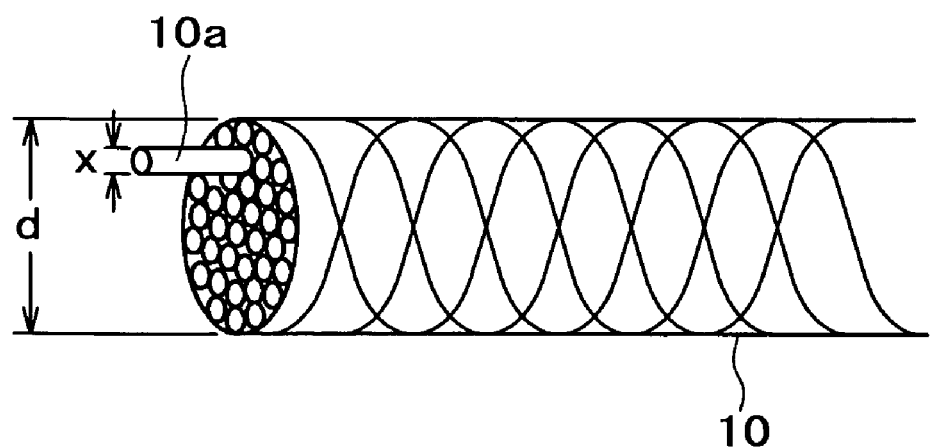
FIG. 3 is a schematic view showing an example of a structure of a Litz wire used as a wire material for a secondary winding of the insulating converter transformer of FIG. 2.

First, FIG. 3 shows a structure of a wire material for use with the secondary winding of the insulating converter transformer PIT.

As the wire material for the secondary winding in this instance, a Litz wire 10 is used wherein a plurality of strands 10a each in the form of a copper wire or the like on which an insulating coating such as, for example, a polyurethane coating film is provided are bundled and stranded. As well known in the art, where a Litz wire is selectively used as a wire material for a secondary winding, there is a merit that a skin effect which occurs, for example, when high frequency rectification current flows in the secondary winding can be reduced.

It is to be toed that the Litz wire 10 used here is formed by doubling and twisting 200 strands 10a, for example, of a wire diameter X=1.0 mφ.

Figure 4:
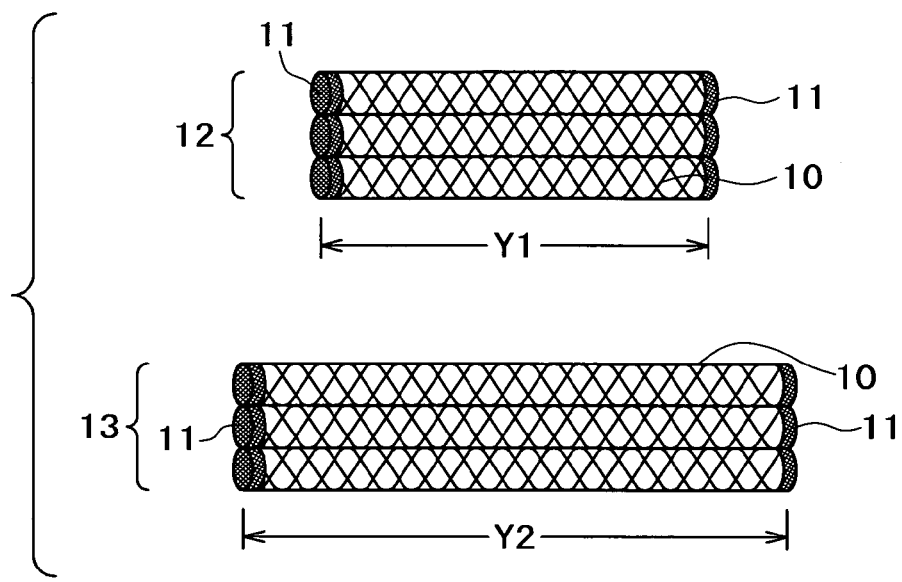
FIGS. 4 and 5 are schematic views showing an example of a configuration of the secondary winding of the insulating converter transformer shown in FIG. 1.

Two sets of three such Litz wires 10 are prepared as seen in FIG. 4, and the three Litz wires 10 of one of the two sets are worked so as to have an equal length Y1 as seen in FIG. 4 while the three Litz wires 10 of the other set are worked so as to have another equal length Y2 greater than the length Y1. Such lengths Y1, Y2 may be set suitably in accordance with the size of the bobbin B described hereinabove, the number of turns of the secondary winding and so forth.

Further, the three Litz wires 10 of the length Y1 are juxtaposed in parallel to each other and in alignment with each other as seen in FIG. 4, and preliminary solder 11 is applied to the opposite ends of the Litz wires 10. Consequently, a first Litz wire band 12 wherein the three Litz wires 10 of the length Y1 are aligned is formed.

Also, the three Litz wires 10 of the length Y2 of the other set are juxtaposed in parallel to each other and in alignment with each other similarly, and preliminary solder 11 is applied to the opposite ends of the Litz wires 10. Consequently, a second Litz wire band 13 wherein the three Litz wires 10 of the length Y2 are aligned is formed.

The first Litz wire band 12 of the length Y1 formed in this manner is used as a wire material for the secondary winding N2A which includes the winding starting end of the secondary winding of the insulating converter transformer PIT.

Meanwhile, the second Litz wire band 13 of the length Y2 greater than the length Y1 is used as a wire material for the secondary winding N2B which includes the winding ending end of the secondary winding of the insulating converter transformer PIT.

It is to be noted that the preliminary solder 11 may be applied, for example, by dipping each end of each Litz wire band in a solder dip layer for a required period of time.

Figure 5:
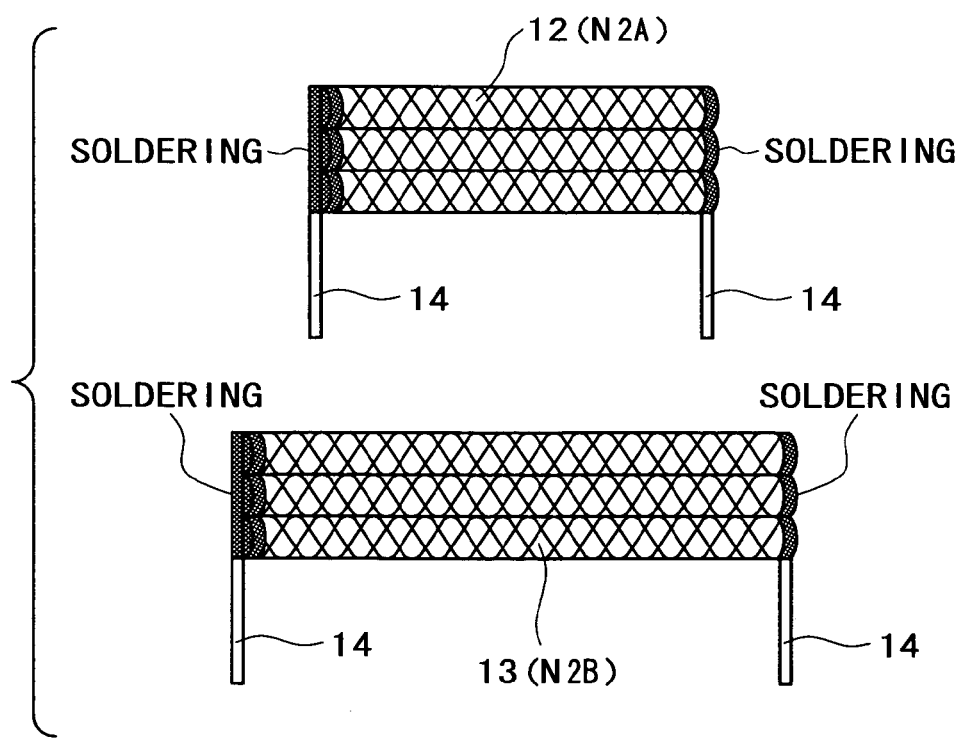

After the first Litz wire band 12 and the second Litz wire band 13 as the secondary winding N2A and the secondary winding N2B, respectively, are formed, lead wires 14 are soldered to the opposite ends, to which the preliminary solder 11 is applied, of each of the first Litz wire band 12 and the second Litz wire band 13 as seen in FIG. 5.

Then, from between the first Litz wire band 12 and the second Litz wire band 13 having the lead wires 14 soldered to the opposite ends thereof in this manner, the first Litz wire band 12 is first wound by a predetermined number of turns on the secondary side winding portion of the bobbin B of the insulating converter transformer PIT. Then, the second Litz wire band 13 is wound by a predetermined number of turns on the outer side of the first Litz wire band 12 wound in such a manner as described above.

A sectional view of FIG. 6 shows a wounded state of the windings on the insulating converter transformer PIT.

In this instance, the first Litz wire band 12 is wound on the winding portion of the bobbin B in such a state that the alignment of the three Litz wires 10 is maintained as seen in FIG. 6. Similarly, the second Litz wire band 13 is wound on the winding portion of the bobbin B in such a state that the alignment of the three Litz wires 10 is maintained as seen in FIG. 6.

Further, in this instance, the first Litz wire band 12 (secondary winding N2A) is wound by three turns as seen in FIG. 6. Similarly, also the second Litz wire band 13 (secondary winding N2B) is wound by three turns.

It is to be noted that, though not shown, the first Litz wire band 12 wound on the bobbin B is soldered while the lead wires 14 soldered to the opposite ends thereof as seen in FIG. 5 are wound on predetermined pin terminals of the insulating converter transformer PIT. Also the second Litz wire band 13 is soldered while the lead wires 14 soldered to the opposite ends thereof are wound on predetermined pin terminals of the insulating converter transformer PIT.

Consequently, the secondary winding of the insulating converter transformer PIT is formed such that the secondary winding N2A as the first Litz wire band 12 is wound on the winding starting side while the secondary winding N2B as the second Litz wire band 13 is wound on the winding ending side.

Figure 8:
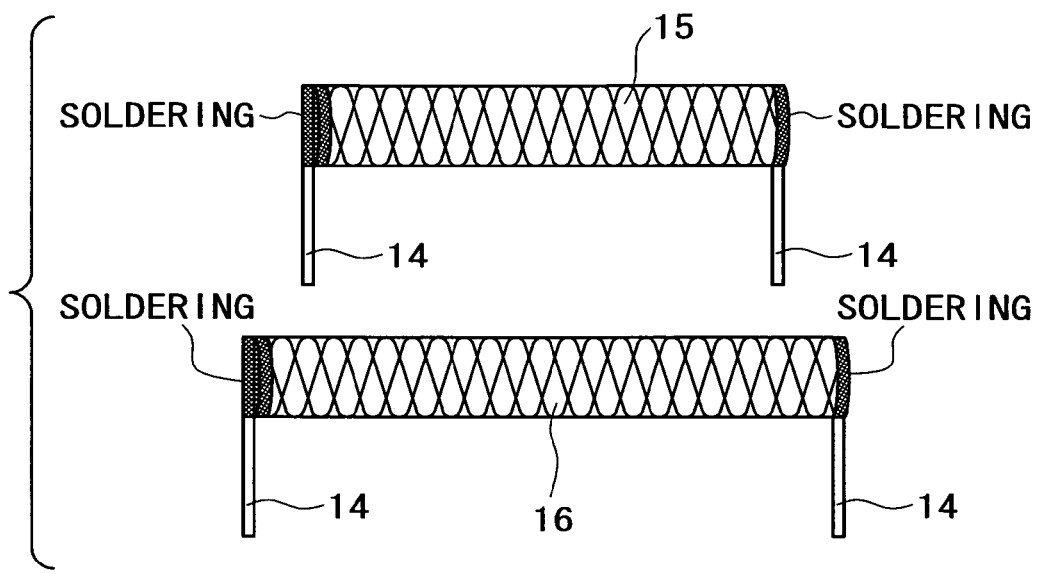
Figure 9:
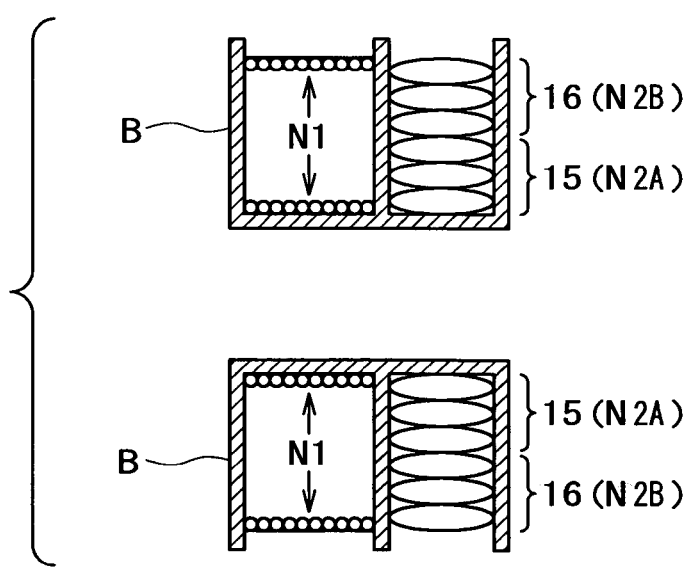
FIG. 9 is a schematic view illustrating a wound state of the secondary winding of the insulating converter transformer shown in FIGS. 7 and 8.

Or, the secondary winding of the insulating converter transformer PIT may be formed in such a manner as seen in FIGS. 7 to 9.

First, also in this instance, such a Litz wire 10 as shown in FIG. 6 is used as a wire material for use with the secondary winding.

Then, a flat braided wire formed by braiding three such Litz wires 10 with each other in such a manner as seen in FIG. 7 is prepared. Two such flat braided wires are prepared such that they have different lengths from each other. The flat braided wire having a length Y1 is referred to as first flat braided wire 15 while the other flat braided wire having another length Y2 greater than the length Y1 is referred to as second flat braided wire 16. Further, preliminary solder 11 is applied also to the opposite ends of the first flat braided wire 15 and the second flat braided wire 16 prepared in this manner.

Also in this instance, the first flat braided wire 15 having a smaller length is used for the secondary winding N2A while the second flat braided wire 16 having a greater length is used for the secondary winding N2B.

Further, also in this instance, lead wires 14 for connection to pin elements are soldered to the opposite ends, to which the preliminary solder 11 is applied, of the first flat braided wire 15 and the second flat braided wire 16 in such a manner as seen in FIG. 8.

Then, from between the first flat braided wire 15 and the second flat braided wire 16 having the lead wires 14 soldered to the opposite ends thereof, the first flat braided wire 15 is wound by a predetermined number of turns on the secondary side winding portion of the bobbin B of the insulating converter transformer PIT. Further, the second flat braided wire 16 is wound by a predetermined number of turns on the outer side of the first flat braided wire 15 wound in this manner.

A wounded state of the windings on the insulating converter transformer PIT is shown in a sectional view of FIG. 9. The first flat braided wire 15 is wound by three turns on the winding portion of the bobbin B in such a manner as seen in FIG. 9. Then, the second flat braided wire 16 is wound by three turns on the outer side of the first flat braided wire 15 continuously to the first flat braided wire 15 wound in this manner.

According to such a configuration as described above, the secondary winding of the insulating converter transformer PIT has a state equivalent to that wherein three sets of a winding of three turns formed from a single Litz wire 10 are connected in parallel. In particular, where a single Litz wire 10 is used, three sets of a secondary winding formed from totaling six turns including three turns from the winding starting end to the center tap and three turns from the center tap to the winding ending end are provided in parallel.

Besides, in this instance, where a plurality of Litz wires 10 are wound in a juxtaposed relationship from each other, there is a merit that the composite resistance value of the secondary winding can be reduced, for example, when compared with the alternative arrangement wherein three sets of secondary windings of six turns of a single Litz wire 10 are connected in parallel as described above.

Here, a winding portion from a winding beginning end to the center tap of that one of the three secondary wiring lines formed from the single Litz wire 10 as described hereinabove which is positioned nearest to the winding beginning end side is represented by N2A1 while the other winding portion from the center tap to the winding ending end is represented by N2B1. Similarly, also the portions of the other two secondary windings on the winding starting side are denoted by N2A2 and N2A3 while the portions on the wiring ending side are denoted by N2B2 and N2B3, respectively. The winding portions are wound in order of N2A1→N2B1→N2A2→N2B2→N2A3→N2B3 on the bobbin B.

In this instance, since a winding portion wound on the outer side requires a greater length, where the winding portions are wound in such an order as specified above, they have different lengths from one another.

Where the winding portions have different lengths from one another in this manner, the composite resistance value of the winding portions of the winding portion N2A side including the winding starting end side portions of the secondary windings and the composite resistance value of the winding portions of the winding portion N2B side including the winding ending end side portions of the secondary windings are set higher than those of the secondary windings N2A, N2B of the circuit of FIG. 1 wherein the lengths Y1, Y2 of the winding portions are set equal to each other.

This is apparent from results of calculation of a calculation expression for a composite resistance value of a parallel connection circuit of resistor elements where the winding portions have different dc resistance values and where the winding portions have an equal dc resistance value as given below:

$$1/Ro=1/RA1+1/RA2+1/RA3$$

where RA1, RA2 and RA3 represent the dc resistance values of the winding portions N2A1, N2A2 and N2A3, respectively. It is to be noted that the expression above is for calculation of a composite resistance value Ro of the set on the secondary winding N2A side including the winding starting end side portions of the secondary windings.

Thus, in the circuit of FIG. 1 wherein a winding formed from a plurality of Litz wires 10 is wound as the secondary winding N2A and the secondary winding N2B, the composite resistance value of the secondary windings can be reduced thereby to reduce the power loss in the secondary windings when compared with the alternative case wherein a single Litz wire 10 is used to form a secondary winding to obtain equivalent operation.

Further, the capacitance of the primary side series resonance capacitor C1 in FIG. 1 is selectively set to 0.015 μF. Further, a MOS-FET of a 20 A/10 V type is used for the MOS-FETs Q3, Q4 which form the secondary side synchronous rectification circuit, and the on resistance thereof is 5.0 mΩ or less.

Figure 11:
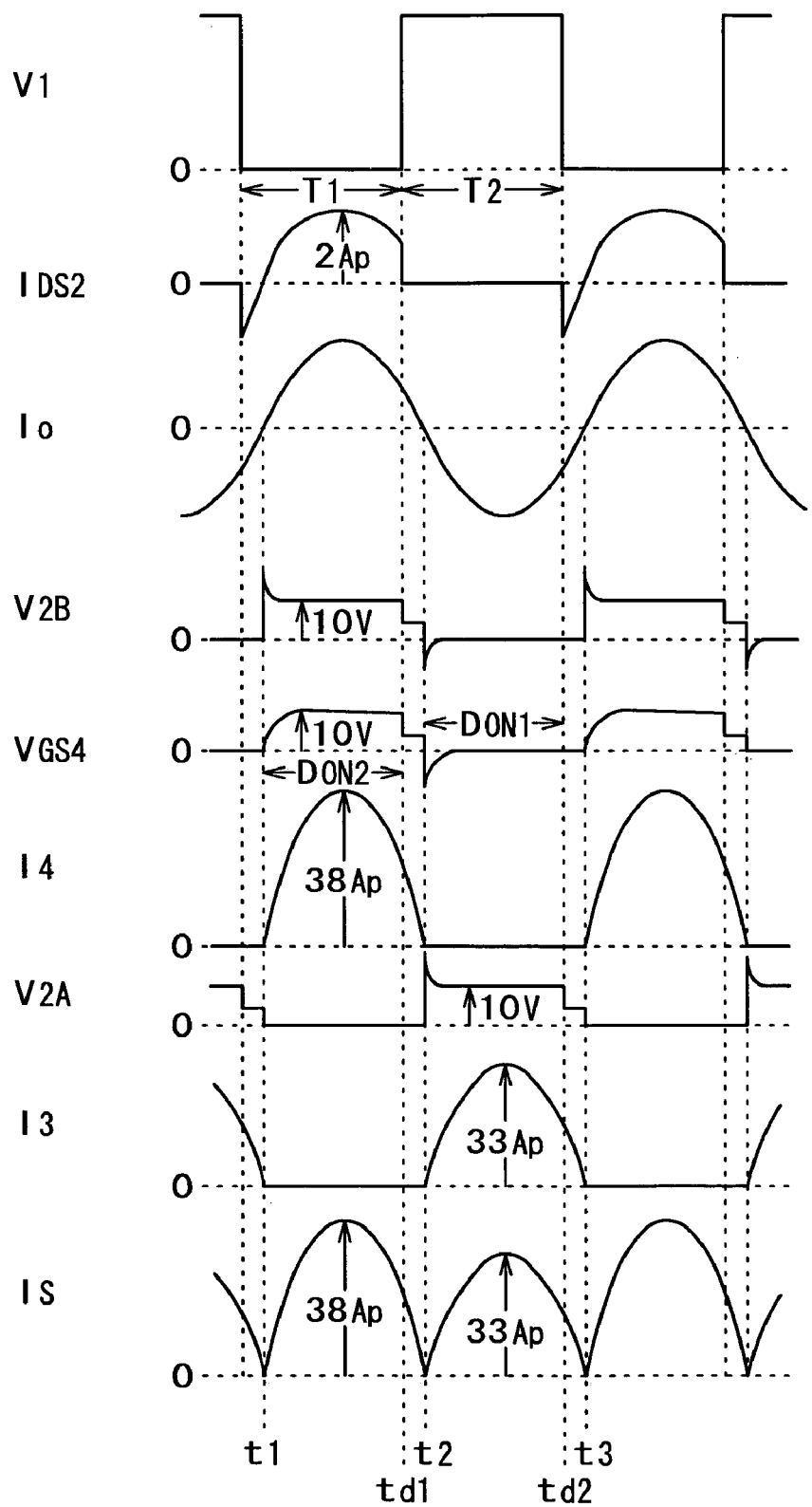
FIG. 11 is a waveform diagram illustrating operation of the power supply circuit of FIG. 1 in a heavy load condition.
Figure 12:
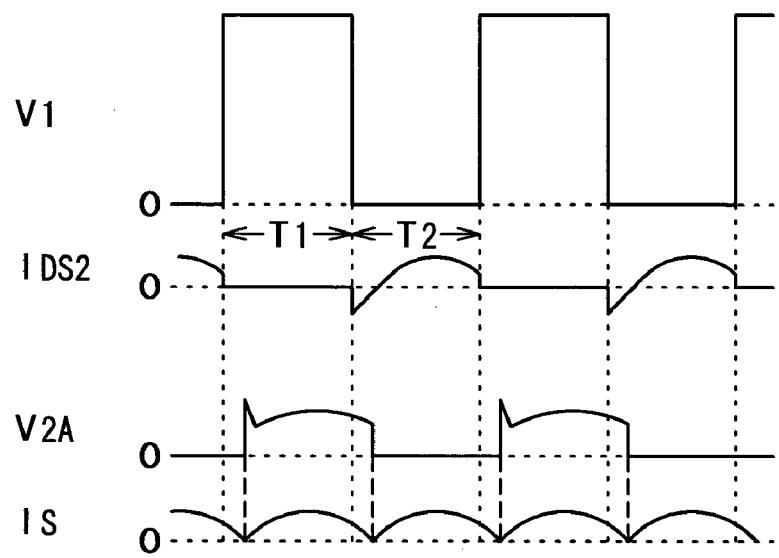
FIG. 12 is a waveform diagram illustrating operation of the power supply circuit of FIG. 1 in a light load condition.

Operation waveforms of the power supply circuit having the configuration described above with reference to FIG. 1 are illustrated in FIGS. 11 and 12. FIG. 11 illustrates operation where the ac input voltage VAC is VAC=100 V and the load power Po is Po=100 W while FIG. 12 illustrates operation where the ac input voltage VAC is VAC=100 V and the load power Po is Po=25 W. In the range of the load power for which the power supply circuit shown in FIG. 1 is ready, the load power Po=100 W is a heavy load condition, and the load power Po=25 W is a light load condition.

In the waveform diagram shown in FIG. 11, the voltage V1 across the switching element Q2 corresponds to on/off states of the switching element Q2. In particular, the waveform shown in FIG. 11 exhibits a rectangular wave wherein the voltage V1 has the zero level within a period T2 within which the switching element Q2 is on but is clamped to a predetermined level within another period T1 within which the switching element Q2 is off. Then, the switching current IDS2 flowing through the switching element Q2//damper diode DD2 exhibits a waveform wherein it exhibits the negative polarity as it flows through the damper diode DD2 upon turning on of the switching element Q2 as seen within the period T2, and this is reversed so as to have the positive polarity, with which it flows from the drain to the source of the switching element Q2, whereafter, within the period T1, the switching element Q2 is turned off and the switching current IDS2 has the zero level.

Meanwhile, the switching element Q1 performs switching on/off alternately with respect to the switching element Q2. Therefore, though not shown, the switching current flowing through the switching element Q1//damper diode DD1 has a waveform having a phase shifted by 180° with respect to the switching current IDS2. Also the voltage across the switching element Q1 has a waveform having a phase shifted by 180° with respect to the voltage V1 across the switching element Q2.

Thus, the primary side series resonance current Io which flows through the primary side series resonance circuit (C1-L1) connected between the switching output point of the switching elements Q1, Q2 and the primary side ground has a composite waveform of the switching current IDS1 and the switching current IDS2. Consequently, the primary side series resonance current Io has a sine waveform as seen in FIG. 11. It can be recognized from comparison of the waveform with the waveform (refer to FIG. 24) of the primary side series resonance current Io of the conventional power supply circuit described hereinabove with reference to FIG. 23 that the primary side series resonance current Io in the circuit of FIG. 1 little includes a sawtooth waveform component generated by the excitation inductance of the primary winding N1. This arises from the fact that, since the coupling coefficient of the insulating converter transformer PIT is set to a looser coupling state level, the excitation inductance of the primary winding N1 decreases relatively by an amount by which the leakage inductance L1 of the primary winding N1 increases.

As such a waveform of primary side series resonance current Io as described above is obtained, the voltage V2B obtained from the secondary winding N2B has a waveform conforming to the period of the primary side series resonance current Io and clamped at an absolute value level corresponding to the secondary side dc output voltage Eo.

Further, the voltage V2A obtained from the secondary winding N2A has a level equal to that of the voltage V2B ad has a waveform having a phase shifted by 180° from that of the voltage V2B.

Figure 22:
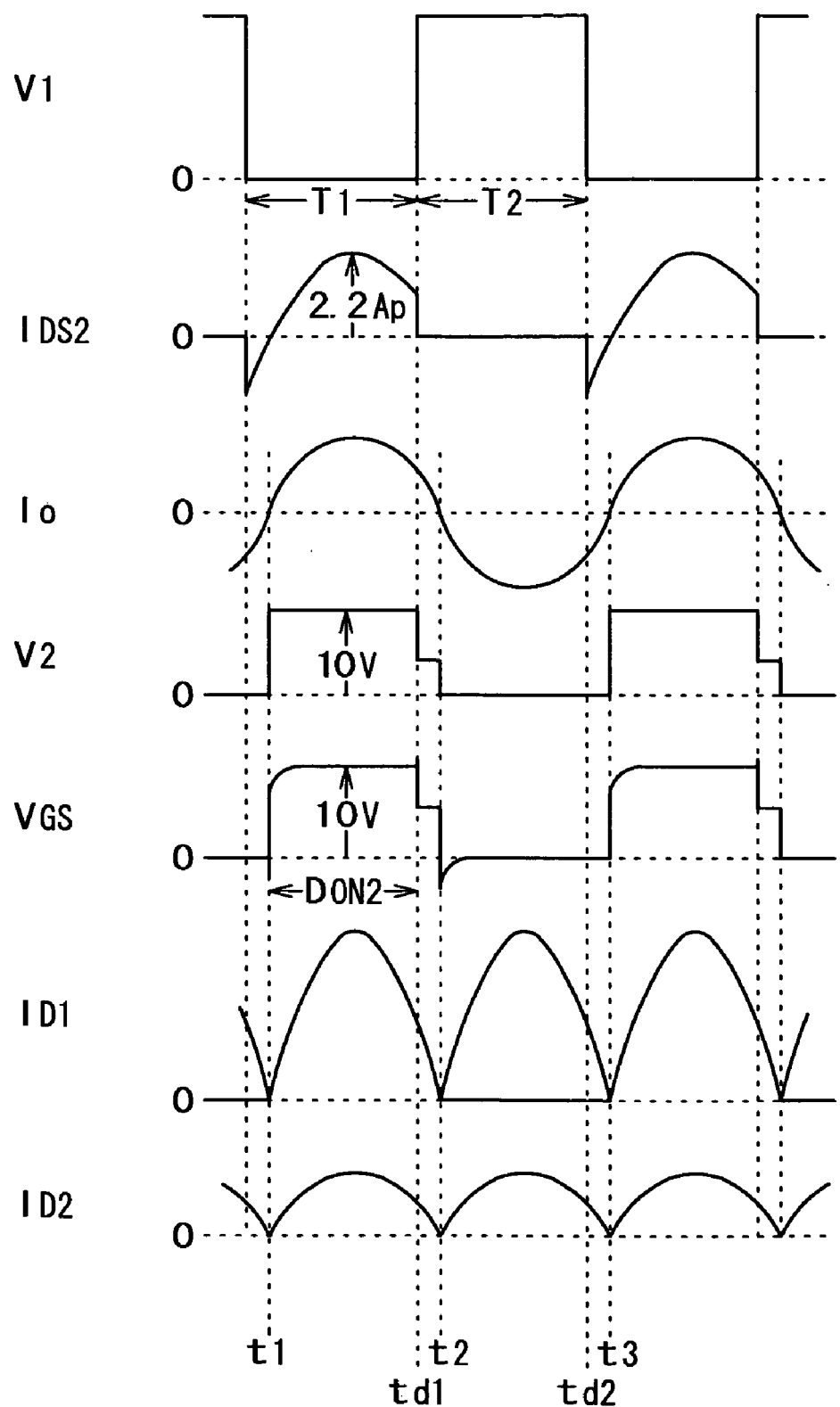
FIG. 22 is a waveform diagram illustrating operation of the switching power supply circuit of FIG. 21 in a heavy load condition.

As can be recognized from comparison with the voltage V2 illustrated in FIG. 22, the voltages V2A, V2B illustrated in FIG. 11 have a waveform which exhibits the zero level at a timing at which the primary side series resonance current Io exhibits the zero level. In short, the voltages V2A, V2B have a zero cross timing overlapping with the zero cross timing of the primary side series resonance current Io (refer to t1, t2, t3 in FIG. 11).

In the secondary side synchronous rectification circuit by the voltage detection system, the drive circuit formed from the gate resistor Rg2 detects the voltage V2B and outputs an on level gate voltage to the MOS-FET Q4.

In this instance, the voltage V2B has a waveform which exhibits a peak level of the positive polarity at timing t1 and whose level thereafter drops until the level decreases to zero at timing t2 as seen in FIG. 11. The gate-source voltage VGS4 which appears between the gate and the source of the MOS-FET Q4 provides an on voltage within a period (period between timings t1 and td1 in FIG. 11) within which the voltage V2B keeps a level higher than a level corresponding to a predetermined level determined as a gate-source potential for the MOS-FET Q4. In short, the period from timing t1 to timing td1 becomes the on period DON2 of the MOS-FET Q4.

Then, the period from timing td1 at which the on period DON2 ends to timing t2 is dead time of the MOS-FET Q4, and within the period between timings td1 to t2 of the dead time, rectification current flows through the body diode DD4 for the MOS-FET Q4. This is indicated also by the potential of the gate-source voltage VGS4 within the period td1-t2 illustrated in FIG. 11.

Consequently, the rectification current I4 flowing through the MOS-FET Q4 flows within the period from timing t1 to timing t2 as seen in FIG. 11. In short, the rectification current I4 exhibits the zero level at timings t1 and t2 at which also the primary side series resonance current Io exhibits the zero level, and therefore, the rectification current I4 exhibits continuity to the primary side series resonance current.

Similarly, the drive circuit formed from the gate resistor Rg1 detects the voltage V2A and outputs an on level gate voltage to the MOS-FET Q3.

In this instance, the gate-source voltage VGS3 (not shown) which appears between the gate and the source of the MOS-FET Q3 provides an on voltage within a period (period between timings t2 and td2 in FIG. 11) within which the voltage V2 generated in the secondary winding N2A keeps a level higher than a level corresponding to a predetermined level determined as a gate-source potential. Consequently, the period from timing t2 to timing td2 becomes the on period DON1 of the MOS-FET Q3.

Then, the period from timing td2 at which the on period DON1 ends to timing t3 is dead time of the MOS-FET Q3, and within the period between timings td2 to t3 of the dead time, rectification current flows through the body diode DD3 for the MOS-FET Q3.

Consequently, the rectification current I3 flowing through the MOS-FET Q3 flows within the period from timing t2, which is the zero cross timing of the primary side series resonance current Io, to timing t3 as seen in FIG. 11. Therefore, the rectification current I3 flows continuously to the primary side series resonance current Io.

The charging current Is to the smoothing capacitors Co1, Co2 flows in such a waveform as seen in FIG. 11 as a result of combination of the rectification currents I3, I4 described above. In other words, it can be recognized that the rectification operation is such that operation of charging the smoothing capacitors Co (Co1, Co2) is performed within periods within each of which the voltage generated in the secondary windings N2A, N2B has any of the positive and negative polarities.

Further, since the rectification current I3 and the rectification current I4 continue the primary side series resonance current Io as described hereinabove, also the charging current Is to the smoothing capacitors Co flows continuously to the primary side series resonance current Io.

In short, in the circuit of FIG. 1, a continuous mode of the secondary side rectification current is obtained also when the circuit is controlled so that the switching frequency may be lowered as a result of determination that the load is heavy or the like.

In other words, also where the circuit is controlled so that the switching frequency becomes lower than a predetermined level as the level of the secondary side dc output voltage Eo drops lower than a predetermined value, for example, as a result of determination of a heavy load condition, the continuous mode of the secondary side rectification current is maintained.

The reason why the continuous mode is obtained even in a heavy load condition in this manner is such as follows. In particular, as can be recognized from the foregoing description, the coupling coefficient of the insulating converter transformer PIT is decreased to approximately 0.8 by setting of the gap length to establish a loose coupling state. Further, the number of turns of the primary winding N1 and the secondary windings N2A, N2B is set such that, for example, the voltage level induced per one turn of the secondary winding is decreased to approximately 2 V/T. As a result, the magnetic flux density generated in the core of the insulating converter transformer PIT is dropped to a level lower than a required level.

It can be seen from comparison with the rectification currents I1, I2 of the conventional power supply circuit illustrated in FIG. 24 that the rectification currents I3, I4 illustrated in FIG. 11 do not exhibit flowing in the reverse direction.

In particular, although the rectification currents I1, I2 in the conventional power supply circuit exhibit reverse directional current of approximately 8 Ap and give rise to power loss, such reverse directional current does not flow as the rectification current in the circuit of FIG. 1.

In this instance, the reason why such reverse directional current appears in the rectification currents I3, I4 is that the inductors Ld1, Ld2 are interposed in the rectification current paths as seen in FIG. 1.

Where an inductor is inserted in each of the rectification current paths in this manner, when rectification current flows, counter electromotive force is generated in the inductor. As the counter electromotive force is generated in this manner, reverse directional current which is otherwise generated in the MOS-FETs Q3, Q4 upon turning off is suppressed.

As described hereinabove, in the circuit shown in FIG. 1, the inductors Ld1, Ld2 are set to approximately 0.6 μH so that generation of reverse directional current in the rectification currents I3, I4 can be prevented.

As also described hereinabove in connection with the conventional power supply circuit, since the synchronous rectification circuit uses a MOS-FET having low on resistance and a low voltage withstanding property as a rectification element, it can reduce the continuity loss when compared with an alternative case wherein a diode element is used as a rectification element.

However, where secondary side rectification current flows in a discontinuous mode and a synchronous rectification circuit of the winding voltage detection system is adopted, even when the charging current to the smoothing capacitors Co decreases to the zero level, reverse directional current flows, and this gives rise to production of reactive power.

If it is intended to eliminate the reactive power, then it is obliged to adopt a synchronous rectification circuit of the rectification current detection system. However, the rectification current detection system requires a drive circuit system including a current transformer and a comparator and hence is complicated in circuit configuration and increased in scale.

In contrast, with the circuit of FIG. 1, since the secondary side rectification current remains in a continuous mode also upon heavy load operation, even where a synchronous rectification circuit of the voltage detection system is used, such reactive power in current discontinuous periods as described above can be reduced. Further, in this instance, the inductors Ld1, Ld2 are inserted in the secondary side rectification current paths as described above so that no reverse directional current may be generated in the rectification current thereby to achieve further reduction of the reactive power.

From this, since the basic configuration of FIG. 1 uses a synchronous rectification circuit having a configuration according to the voltage detection system, the power supply circuit is simplified in circuit configuration and suppresses increase of the circuit scale and besides prevents increase of the cost. Furthermore, the problem of drop of the power conversion efficiency caused by reactive power within current discontinuous periods is eliminated.

It is to be noted that, in FIG. 11, a negative potential of −9 V appears on the gate-source voltage VGS4 at a timing at which the MOS-FET Q4 is turned off. Further, though not shown in FIG. 11, also the gate-source voltage VGS3 in this instance exhibits appearance of a negative voltage of −9 V at a timing at which the MOS-FET Q3 is turned off.

This arises from the fact that the Schottky diodes Dg1, Dg2 are inserted in parallel to the resistors Rg1, Rg2 between the gates of the MOS-FETs Q3, Q4 and the secondary winding as described hereinabove.

Where the Schottky diodes Dg1, Dg2 are inserted in this manner, upon turning off of the MOS-FETs Q3, Q4, accumulated charge in the gate input capacitors (Ciss) of the MOS-FETs Q3, Q4 can be flowed in such a manner as to be discarded through the Schottky diodes Dg1, Dg2, respectively.

In particular, in this instance, charge in each of the gate input capacitors is discharged along the path of the Schottky diode Dg (Dg1, Dg2)→secondary winding→smoothing capacitors Co. Then, as the charge in the input capacitors is discharged, the time required for voltage drop upon turning off of the MOS-FETs Q3, Q4 can be reduced.

Where the voltage drop time of the MOS-FETs Q3, Q4 upon turning off can be reduced in this manner, the MOS-FETs Q3, Q4 can be turned off with certainty thereby to obtain a good switching characteristic.

FIG. 12 illustrates operation of the circuit shown in FIG. 1 when the load is light (Po=25 Wh).

Also in the operation illustrated in FIG. 12, the voltage V1 across the switching element Q2 indicates on/off timings of the switching element Q2. In particular, a period T1 within which the voltage V1 is clamped at a predetermined level indicates a period within which the switching element Q2 is off, and another period T2 within which the voltage V1 exhibits the zero level indicates a period within which the switching element Q2 is on.

As can be recognized from the foregoing description, in the power supply circuit shown in FIG. 1, constant voltage control through switching frequency control is performed for the stabilization of the secondary side dc output voltage Eo. The constant voltage control operates such that, if a light load condition is entered (or the ac input voltage VAC rises) and the secondary side dc output voltage rises, then the switching frequency is raised to lower the secondary side dc output voltage thereby to stabilize the secondary side dc output voltage Eo.

In such a light load condition as mentioned above, a zero cross timing of the switching current IDS2 (that is, a zero cross timing of the primary side series resonance current Io) and a zero cross timing of the voltage V2A (and also the voltage V2B) of the secondary winding substantially coincide with each other as seen in FIG. 12. In conformity therewith, the zero cross timings of the secondary side charging current Is (rectification currents I3, I4) and the primary side series resonance current Io coincide with each other. Further, the charging current Is in this instance flows without any rest period as seen in FIG. 11.

From this, it can be understood that, with the power supply circuit shown in FIG. 1, a continuous mode is established also upon light load operation (Po=25 Wh).

The basic circuit configuration on which the switching power supply circuit according to the first embodiment described is based is described above. In the power supply circuit of the basic configuration described, since the insulating converter transformer PIT is set so as to have a magnetic flux density lower than a required level, a continuous mode can be maintained even in a heavy load condition (condition wherein the switching frequency is lowered to a level lower than a predetermined level). Since expansion of the continuous mode is achieved in this manner, reverse directional current of rectification current is suppressed. Consequently, reduction of the reactive power can be achieved and a good ac to dc power conversion efficiency can be achieved.

Further, in the circuit of FIG. 1, an inductor Ld (Ld1, Ld2) is inserted in each of the rectification current paths as described above so that the reverse directional current of rectification current is further suppressed, and further reduction of the reactive power can be achieved thereby.

An experiment was conducted. According to the experiment, a result that the ac to dc power conversion efficiency ($\eta AC \rightarrow DC$) of the circuit shown in FIG. 1 was approximately $\eta AC \rightarrow DC=86.5\%$ under the conditions of the ac input voltage VAC=100 V and the load power Po=100 W. This result indicates improvement by approximately 4.5% with respect to the ac to dc power conversion efficiency ($\eta AC \rightarrow DC$) of 82.0% of the conventional circuit described hereinabove with reference to FIG. 23 under the same conditions.

Figure 23:
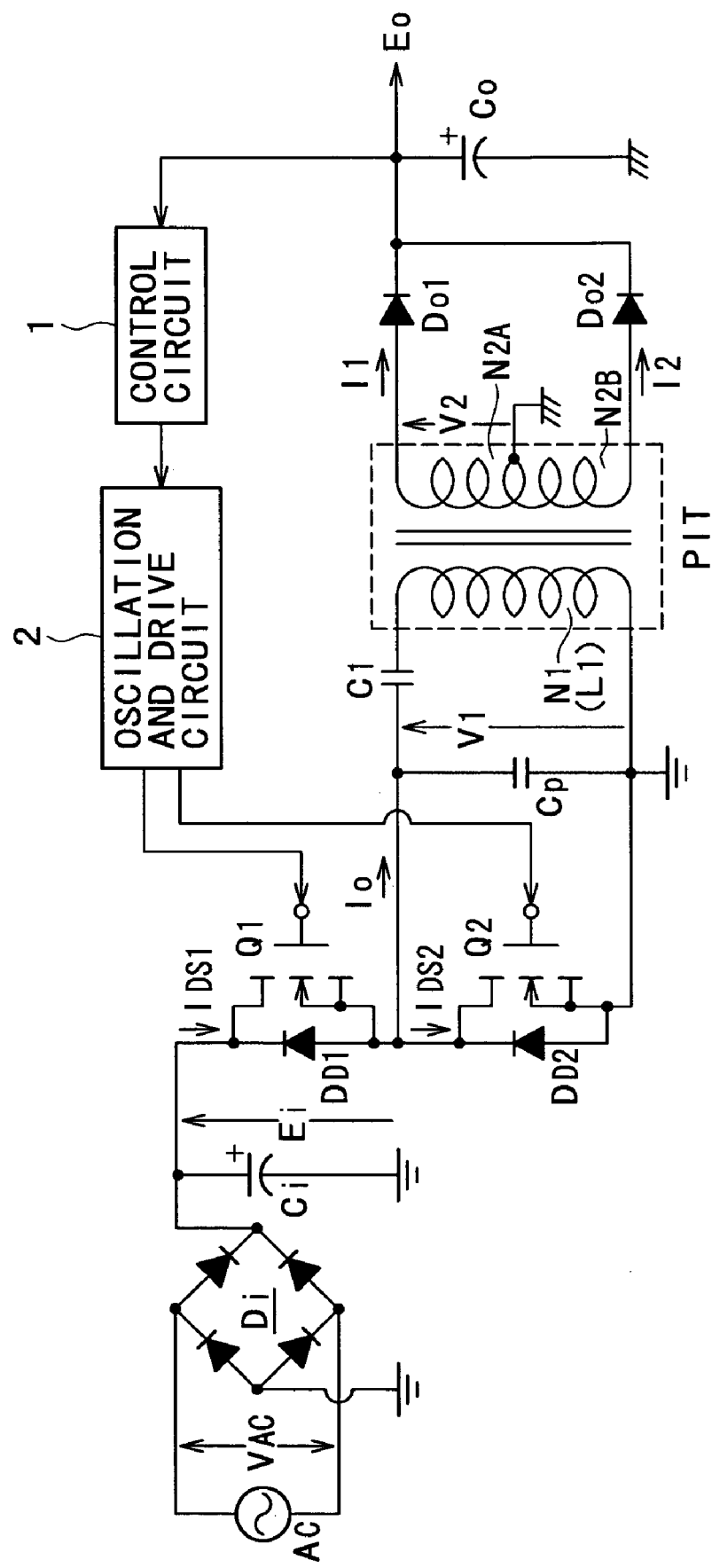
FIG. 23 is a circuit diagram showing a configuration of a conventional power supply circuit.
Figure 25:
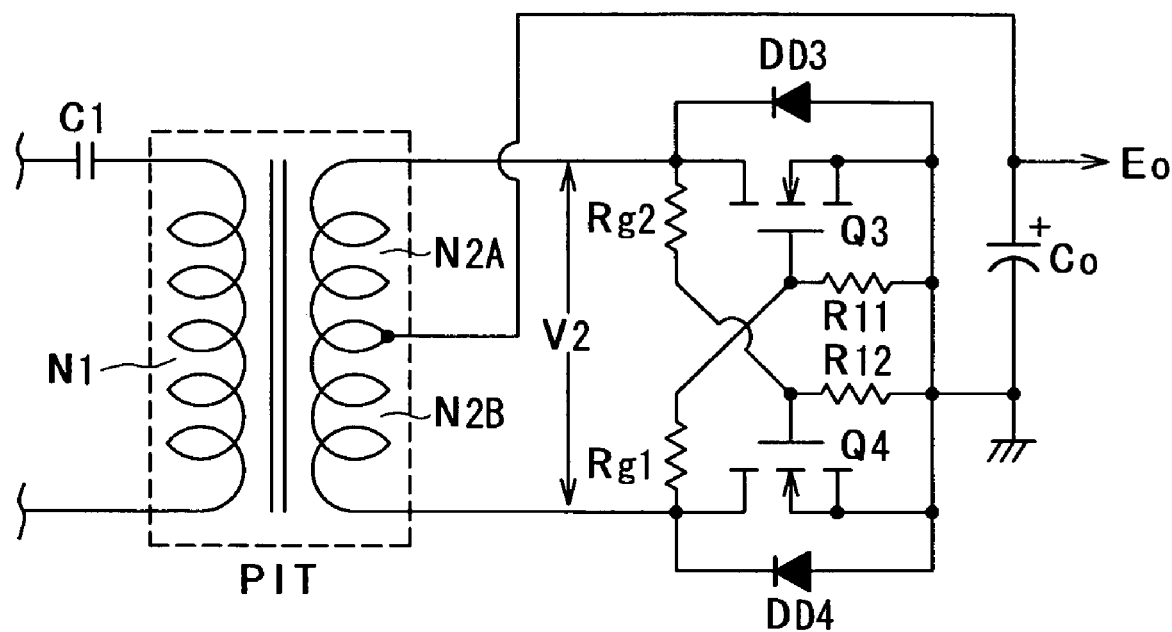
FIG. 25 is a circuit diagram showing a configuration of the secondary side of the power supply circuit of FIG. 23 where it includes a synchronous rectification circuit of the winding voltage detection system.
Figure 26:
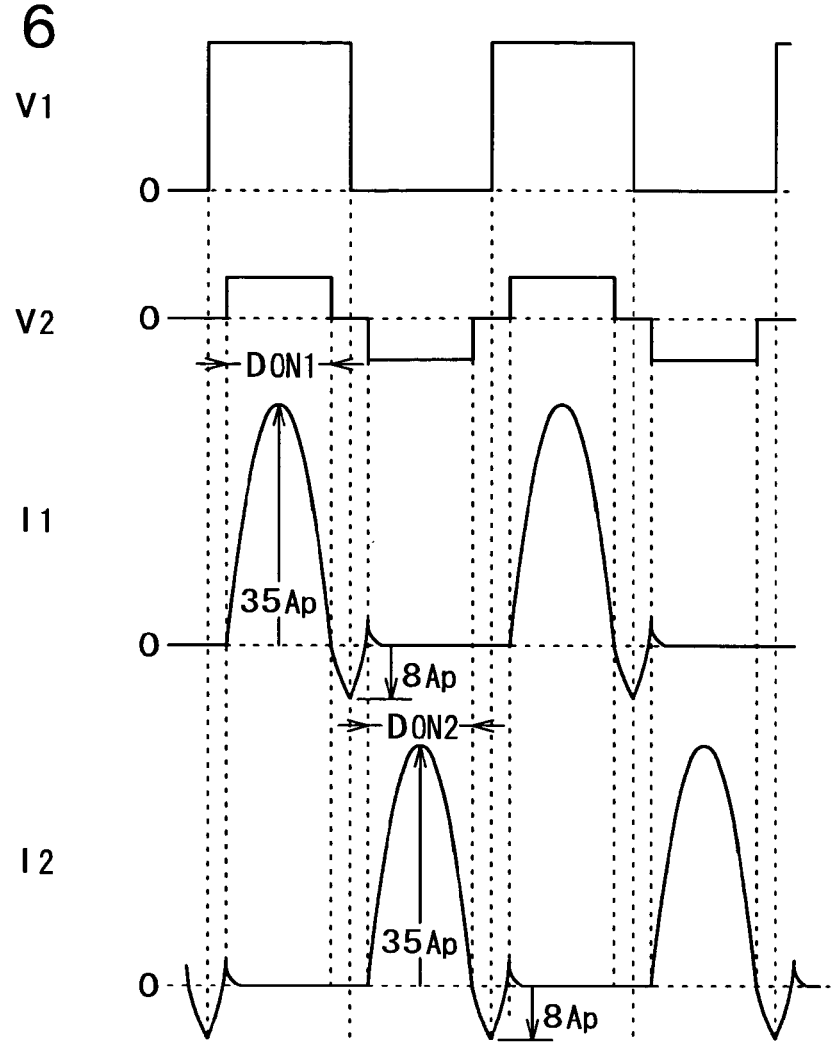
FIG. 26 is a waveform diagram illustrating operation of the power supply circuit of the configuration shown in FIG. 25 in a heavy load condition.
Figure 27:
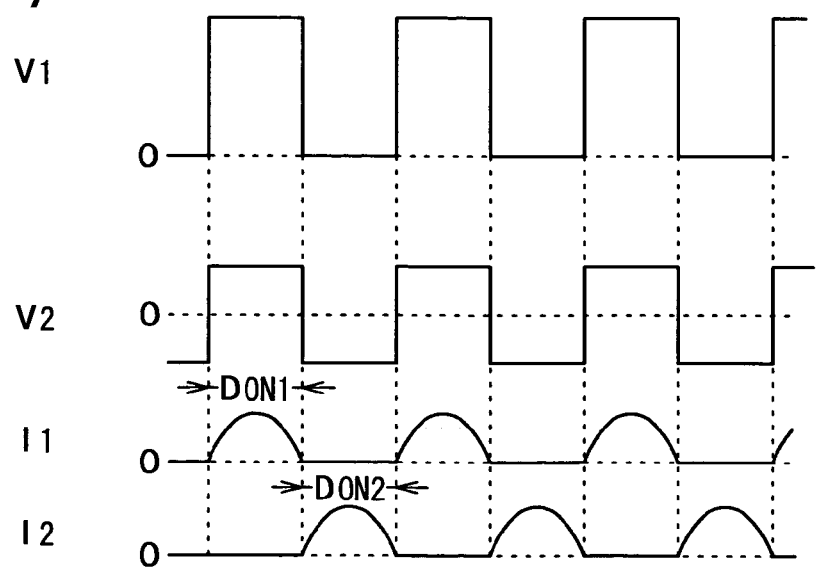
FIG. 27 is a waveform diagram illustrating operation of the power supply circuit of the configuration shown in FIG. 25 in a light load condition.
Figure 28:
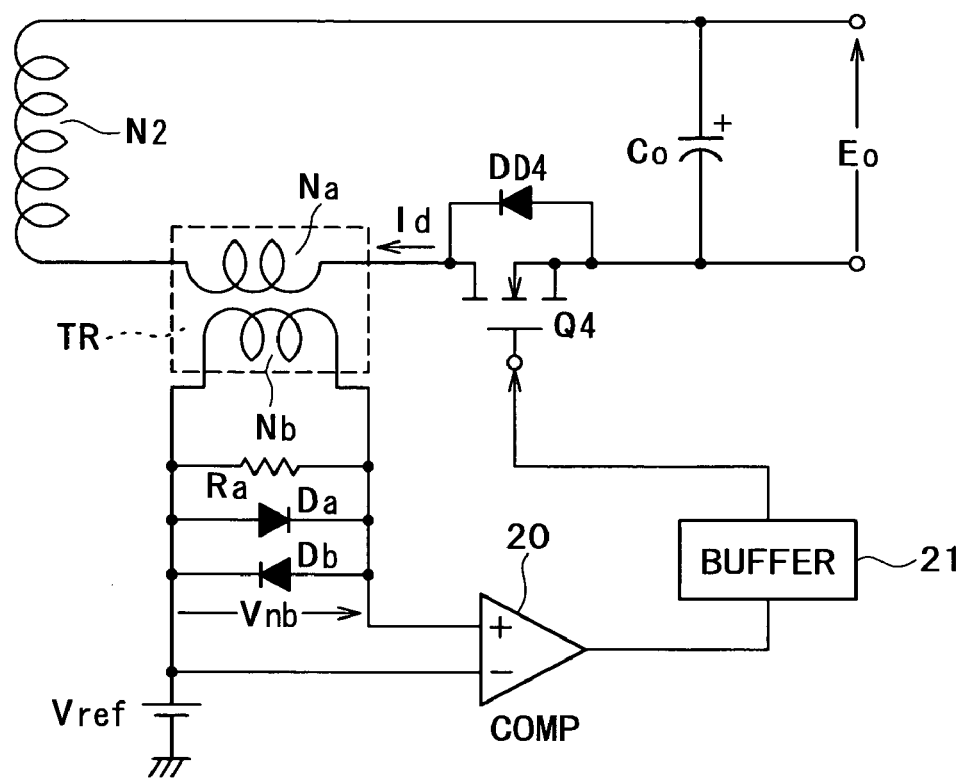
FIG. 28 is a circuit diagram showing an example of a basic configuration of a synchronous rectification circuit according to the rectification current detection system.
Figure 29:
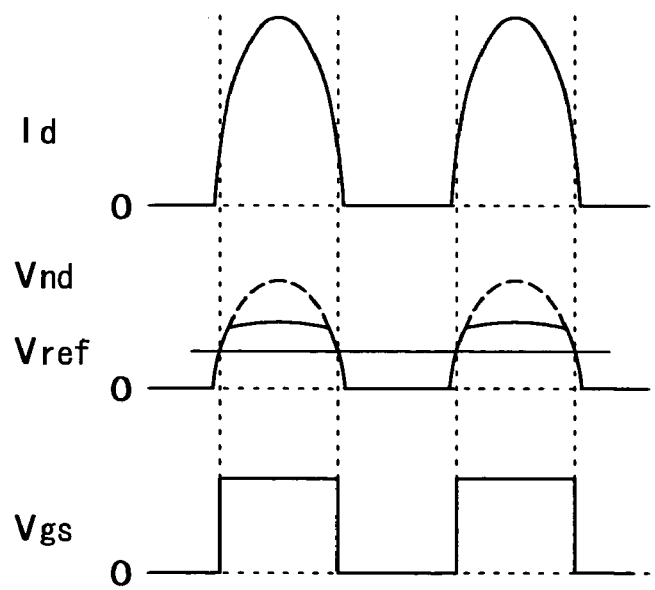
FIG. 29 is a waveform diagram illustrating operation of the synchronous rectification circuit of FIG. 28.

It is to be noted that this result exhibits a rather lower value than that obtained where a synchronous rectification circuit of the rectification current detection system is adopted for the secondary side together with the configuration of the primary side shown in FIG. 23 (refer to FIG. 28). However, since the power supply circuit of FIG. 1 adopts the winding voltage detection system as a configuration of the synchronous rectification circuit as described hereinabove, the circuit configuration is simplified.

Incidentally, the basic configuration of the power supply circuit of FIG. 1 described above uses a bead core for the inductors Ld inserted in the secondary side rectification current paths described hereinabove.

However, since such a bead core as described above has no gap therein, the inductance value thereof has a tendency from its dc superposition characteristic that it increases suddenly as the light load condition proceeds until the load current level becomes lower than a predetermined level.

For example, the dc superposition characteristic of the inductance of the inductors Ld1, Ld2 in the circuit of FIG. 1 is such that it rises suddenly from approximately 0.3 μH to approximately 0.6 μH as the light load condition advances to a very light load condition of the load power Po=12.5 W or less.

It became apparent from the experiment that, upon such a very light load operation, the rectification current of the secondary side enters a discontinuous mode due to the dc superposition characteristic of the inductors Ld. Then, as the discontinuous mode is entered in this manner, under such a very light load condition, an abnormal oscillation operation occurs and a ripple voltage of approximately several Hz is generated on the secondary side dc output voltage Eo.

Further, in the circuit of the configuration shown in FIG. 1, a good turnoff characteristic of the MOS-FETs Q3, Q4 is obtained by the Schottky diodes Dg1, Dg2 provided in parallel to the resistors Rg1, Rg2, respectively.

However, as described hereinabove, where such Schottky diodes Dg are provided, switching noise of high frequencies is likely to be generated on the secondary side dc output voltage Eo. Therefore, in the circuit of FIG. 1, a n type filter formed from the smoothing capacitors Co1, Co2 and the choke coil Ln is inserted in the line of the secondary side dc output voltage Eo so as to suppress such high frequency noise.

However, the n type filter provided in the line of the secondary side dc output voltage Eo gives rise to production of power loss of approximately 1.5 W because of copper loss of the winding and iron loss of the core of the choke coil Ln and the ESR of the smoothing capacitor Co2.

It is to be noted that, according to the experiment, a result was obtained that the power conversion efficiency ηAC→DC of the circuit of FIG. 1 where such a n type filter as described above is removed is approximately ηAC→DC=88%. Since the power conversion efficiency ηAC→DC of the circuit of FIG. 1 where a n type filter is included is ηAC→DC=approximately 86.5% as described hereinabove, it can be recognized that the power conversion efficiency of the circuit of FIG. 1 where a n type filter is included exhibits a loss of approximately 1.5%.

Figure 10:
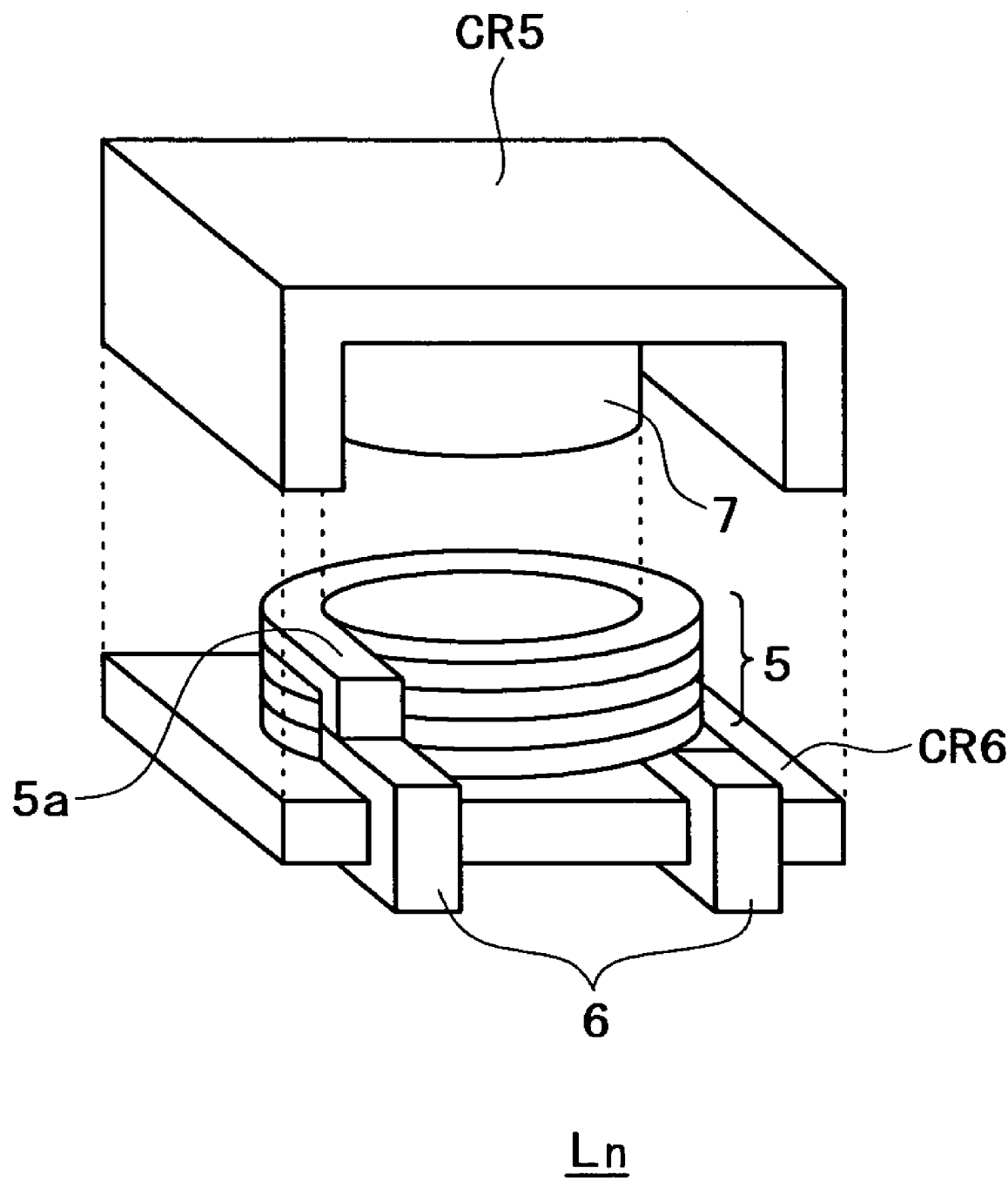
FIG. 10 is an exploded perspective view showing a structure of a choke coil provided on the secondary side of the circuit shown in FIG. 1.

Incidentally, for the choke coil Ln for forming such a n type filter, the circuit of FIG. 1 uses a choke coil having, for example, such a configuration as shown in FIG. 10.

Referring to FIG. 10, the choke coil Ln includes a flat wire coil 5 formed by winding a flat wire 5a by a predetermined number of turns. The flat wire coil 5 used is a coil of the edgewise winding type (longitudinal winding) wherein the flat wire 5a having a square or rectangular cross section is wound in its widthwise direction.

The flat wire coil 5 is connected at the opposite ends thereof by soldering to external terminals 6 provided on a plate type core CR6 on which the flat wire coil 5 is placed as seen in FIG. 10.

Further, a pot type core CR5 having such a shape as seen in FIG. 10 is fitted with the plate type core CR6 on which the flat wire coil 5 is placed in this manner to form the choke coil Ln. In particular, a circular magnetic leg 7 formed on the pot type core CR5 side as seen in FIG. 10 is fitted into a circular cavity region formed on the inner side of the flat wire coil 5 to fit the pot type core CR5 with the plate type core CR6.

The pot type core CR5 is made of metal type dust while the plate type core CR6 is made of a ferrite material of the Ni—Zn type.

According to such a configuration of the choke coil Ln as described above with reference to FIG. 10, although a choke coil of a comparatively small size can be implemented, the core thereof exhibits comparatively high iron loss. The DCR (dc resistance) of the choke coil Ln in this instance is, for example, approximately 1 mΩ, and also this makes a factor of the loss where a n type filter is provided.

Further, in the basic configuration shown in FIG. 1, the secondary side synchronous rectification circuit is formed as a full-wave rectification circuit from the MOS-FETs Q3, Q4 while a center tap is provided for the secondary winding of the insulating converter transformer PIT.

However, where the center tap is provided in this manner, the secondary winding N2A on the winding starting side and the secondary winding N2B on the winding ending side have lengths different from each other as apparent from the foregoing description given with reference to FIGS. 3 to 9.

From this structure, the secondary winding N2B exhibits a higher DCR than the secondary winding N2A, and consequently, a difference appears between the levels of the rectification currents I3, I4 flowing through the secondary windings N2A, N2B, respectively.

This is apparent also from the fact that, in the waveform diagram of FIG. 11, the peak level of the rectification current I3 is 33 Ap while that of the rectification current I4 is 38 Ap.

As a result, the level of the charging current Is to the smoothing capacitors Co in the circuit of the FIG. 1 is made imbalanced.

Further, in this instance, the secondary winding of the insulating converter transformer PIT is formed from a Litz wire band or a flat braided wire formed from a plurality of Litz wires 10.

Since such a Litz wire band or flat braided wire as just mentioned requires a comparatively great number of working steps as described hereinabove with reference to FIGS. 3 to 9, as the number of windings to be wound increases, time required for the production process of the insulating converter transformer PIT increases as much. Accordingly, where a Litz wire or flat braided wire is used as the secondary winding in this manner, the number of windings to be wound should preferably be minimized.

While the basic configuration shown in FIG. 1 has such problems as described above, a different configuration is available as a basic configuration for the power supply circuit according to the first embodiment hereinafter described. According to the different configuration mentioned, the switching power supply circuit is configured, for example, in such a manner as seen in FIG. 13.

It is to be noted that the configuration of the primary side in the basic configuration for the embodiment is similar to that of the circuit described hereinabove with reference to FIG. 1, and therefore, the configuration of the primary side is omitted in FIG. 13 for simplified illustration.

Figure 13:
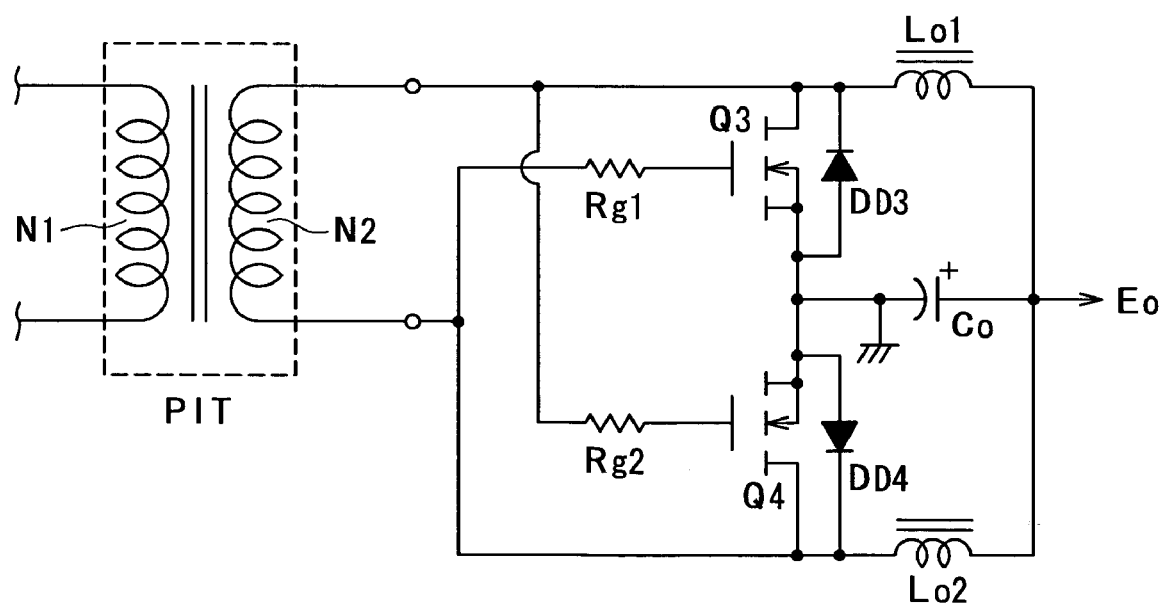
FIG. 13 is a circuit diagram showing another basic circuit configuration of the switching power supply circuit to which the present invention can be applied.

Referring to FIG. 13, according to the different basic configuration for the embodiment shown, the secondary winding of the insulating converter transformer PIT is formed only from one secondary winding N2 without a center tap provided thereon.

Also the secondary winding N2 in this instance is formed from such a Litz wire band or flat braided wire formed from a plurality of Litz wires 10 as described hereinabove with reference to FIGS. 3 to 9.

Further, in the circuit of FIG. 13, the inductors Ld1, Ld2 provided in the rectification current paths in the circuit of FIG. 1 are omitted.

Further, in this instance, the Schottky diodes Dg1, Dg2 connected in parallel to the gate resistors Rg1, Rg2, respectively, in the circuit of FIG. 1 are omitted. Also the snubber circuit connected in parallel to the secondary winding N2 is omitted.

Furthermore, also the n type filter (smoothing capacitor Co2 and choke coil Ln) provided in the line of the secondary side dc output voltage Eo is omitted.

In the circuit shown in FIG. 13, a first end of the secondary winding N2 is connected to the drain of the MOS-FET Q3. The drain of the MOS-FET Q3 is connected to a positive electrode terminal of the smoothing capacitor Co through the choke coil Lo1.

The other second end of the secondary winding N2 is connected to the drain of the MOS-FET Q4, and the drain of the Q4 is connected to the positive electrode terminal of the smoothing capacitor Co through the choke coil Lo2.

Further, in this instance, the gate resistor Rg1 which forms a drive circuit for the MOS-FET Q3 is connected to the second end of the secondary winding N2. Meanwhile, the gate resistor Rg2 which forms a drive circuit for the MOS-FET Q4 is connected to the first end of the secondary winding N2.

According to the connection form described, when the MOS-FET Q3 exhibits an on state within one of two half periods of an alternating voltage excited in the secondary winding, the rectification current flows along a path of the [secondary winding N2→choke coil Lo2→smoothing capacitor Co→MOS-FET Q3→secondary winding N2]. Further, in this instance, the rectification current is branched and flows also along a loop path of the [MOS-FET Q3→choke coil Lo1→smoothing capacitor Co].

On the other hand, within the other half period within which the MOS-FET Q3 exhibits an off state and the MOS-FET Q4 exhibits an on state, the rectification current flows along a path of the [secondary winding N2→choke coil Lo1→smoothing capacitor Co MOS-FET Q4→secondary winding N2]. Further, also in this instance, the rectification current is branched and flows also along a loop path of the [MOS-FET Q4→choke coil Lo2→smoothing capacitor Co].

In this manner, in the rectification circuit on the secondary side of the circuit shown in FIG. 13, within a period within which the alternating voltage of the secondary winding N2 has one polarity, the MOS-FET Q3 is turned on and driven to perform rectification and current obtained at the secondary winding N2 is charged into the smoothing capacitor Co. On the other hand, within another period within which the alternating voltage of the secondary winding N2 has the other polarity, the MOS-FET Q4 is turned on and driven to perform rectification and current obtained at the secondary winding N2 is charged into the smoothing capacitor Co. In short, it can be recognized that, since the synchronous rectification circuit in this instance charges current obtained in the entire secondary winding N2 within each half period, a full-wave rectification operation is obtained as the rectification operation.

Further, as can be recognized from the rectification current paths described above, secondary side rectification current branches and flows into the loop path including the choke coil Lo1 and the loop path including the choke coil Lo2 and further branches, in one of the paths, and flows into the secondary winding N2 within each of periods within which the alternating voltage excited in the secondary winding N2 exhibits the positive and negative polarities. Accordingly, the amount of rectification current (secondary winding current) flowing through the secondary winding N2 is reduced to a predetermined ratio with respect to the amount of rectification current flowing as charging current to the smoothing capacitor Co. In other words, operation as a current doubler rectification circuit is obtained by the configuration of the secondary side shown in FIG. 13.

Such a configuration of the current doubler rectification circuit as just described allows employment of only one secondary winding N2 for the insulating converter transformer PIT as seen in FIG. 13.

Further, in the circuit shown in FIG. 13, the choke coils Lo1, Lo2 are inserted in the secondary side rectification current paths as described hereinabove.

Since such choke coils Lo1, Lo2 as described above are provided, an effect of suppressing reverse directional current of rectification current can be obtained by an action of the choke coils Lo1, Lo2 similar to that of the inductors Ld inserted in the circuit shown in FIG. 1.

It is to be noted that, in the circuit shown in FIG. 13, the inductance value of the choke coils Lo1, Lo2 is set to, for example, 3.3 µH. This can prevent occurrence of reverse directional current which is otherwise generated on rectification current.

Further, in this instance, since the choke coils Lo1, Lo2 are connected to the positive electrode terminal of the smoothing capacitor Co, high frequency components which are otherwise generated on the secondary side dc output voltage Eo by impedance components of the choke coils Lo1, Lo2 can be suppressed.

Further, in this instance, since the Schottky diodes Dg1, Dg2 which are regarded as elements by which high frequency are generated on the secondary side dc output voltage Eo are removed, further suppression of such high frequency components can be anticipated.

From the reasons described, the n type filter used in the circuit of FIG. 1 can be omitted from the circuit shown in FIG. 13.

Also in the basic configuration for the embodiment shown in FIG. 13, the insulating converter transformer PIT is formed in a loose coupling form to lower the voltage level induced per one turn of the secondary winding to lower the magnetic flux density to a level lower than a required level thereby to make it possible to use a continuous mode also in a heavy load operation.

From this, also with the configuration shown in FIG. 13, reverse directional current which is generated while a discontinuous mode continues as in the conventional power supply circuit can be reduced to achieve reduction of reactive power. Further, since the choke coils Lo1, Lo2 are inserted in the rectification current paths as described above, also in this instance, reverse directional current of rectification current can be prevented and further reduction of reactive power can be anticipated.

Further, in the circuit shown in FIG. 13, in order to achieve operation similar to that of the circuit of FIG. 1, only one secondary winding can be used in the insulating converter transformer PIT by adopting the configuration of the current doubler rectification circuit described hereinabove. In particular, while the circuit of FIG. 1 requires two secondary windings N2A, N2B each formed from a Litz wire band or flat braided wire, the circuit of FIG. 13 requires only one secondary winding N2 formed from a Litz wire band or flat braided wire.

Consequently, the circuit of FIG. 13 can achieve simplification of the production process of the insulating converter transformer PIT when compared with that of the circuit of FIG. 1.

Further, since only one secondary winding is required in this manner, such a situation that a difference appears between the levels of rectification current flowing through different secondary windings can be eliminated.

Further, with the circuit of FIG. 13, since the secondary side synchronous rectification circuit is formed as a current doubler rectification circuit, the level of winding current of the secondary winding can be reduced when compared with that in the circuit of FIG. 1. Where the level of the secondary winding current is reduced in this manner, also the voltage level obtained as a secondary winding voltage is reduced, and consequently, also the drain-source voltage of each MOS-FET can be lowered.

As a result, the circuit of FIG. 13 can eliminate the snubber circuit which is provided in the circuit of FIG. 1 in order to lower the voltage withstanding property between the source and the drain of the MOS-FETs.

However, in order to implement such operation of the circuit of FIG. 13 as described above, it is necessary to set the inductance values of the choke coils Lo1, Lo2 inserted in the secondary side rectification current paths to values equal to or higher than 3.3 μH. This arises from the fact that, since the circuit of FIG. 13 employs a current doubler rectification circuit, the rectification current level which flows on the secondary side is reduced as much.

Where the inductance values of the choke coils Lo are set in this manner, such a composite core as the choke coil Ln which is used in the circuit of FIG. 1 cannot be adopted. This is because, with such a composite core as described hereinabove with reference to FIG. 10, an inductance value only of approximately 1 μH can be obtained from a problem relating to the size or the structure.

From this, in the circuit of FIG. 13, for example, an EE type core similar to that of the insulating converter transformer PIT shown in FIG. 2 is selectively used as a core member for the choke coils Lo1, Lo2.

In particular, a gap G of a predetermined length is formed in the central magnetic leg of such an EE type core as shown in FIG. 2. Then, such a Litz wire band or a flat braided wire described hereinabove with reference to FIGS. 3 to 9 is wound by a predetermined number of turns on the central magnetic leg of the EE type core.

Where such an EE type core member as just described is used, the choke coils Lo1, Lo2 can have an inductance value of, for example, 3.3 μH or more as mentioned hereinabove.

Furthermore, where the choke coils Lo1, Lo2 having such a configuration as described above are employed, the circuit of the FIG. 13 can prevent abnormal oscillation upon very light load operation which is a problem with the circuit of FIG. 1.

In particular, according to the structure of the choke coils Lo1, Lo2 described above, a good inductance variation characteristic with respect to a variation of the load current level can be obtained by suitably setting the length of the gap formed in the central magnetic leg of the EE type core or by like means. More particularly, by setting the inductance variation characteristic such that the inductance value is substantially fixed approximately at 3.3 μH with respect to a variation of the load current from 30 A to 0 A, the characteristic that the inductance value increases suddenly upon very light load operation like the inductors Ld described hereinabove is improved.

Further, since such sudden increase of the inductance value is suppressed, abnormal oscillation which otherwise occurs upon very light load operation can be prevented.

However, in the choke coils Lo1, Lo2 in this instance, such an EE type core as described above occupies a considerably great volume when compared with such a composite core as described hereinabove with reference to FIG. 10. This gives rise to a problem that an increased area is required for a substrate in order to mount the choke coils Lo1, Lo2.

Further, since the choke coils Lo1, Lo2 in this instance use a Litz wire band or flat braided wire as their windings, there is another problem that the process of production of the choke coils Lo1, Lo2 is complicated.

<First Embodiment>

Figure 14:
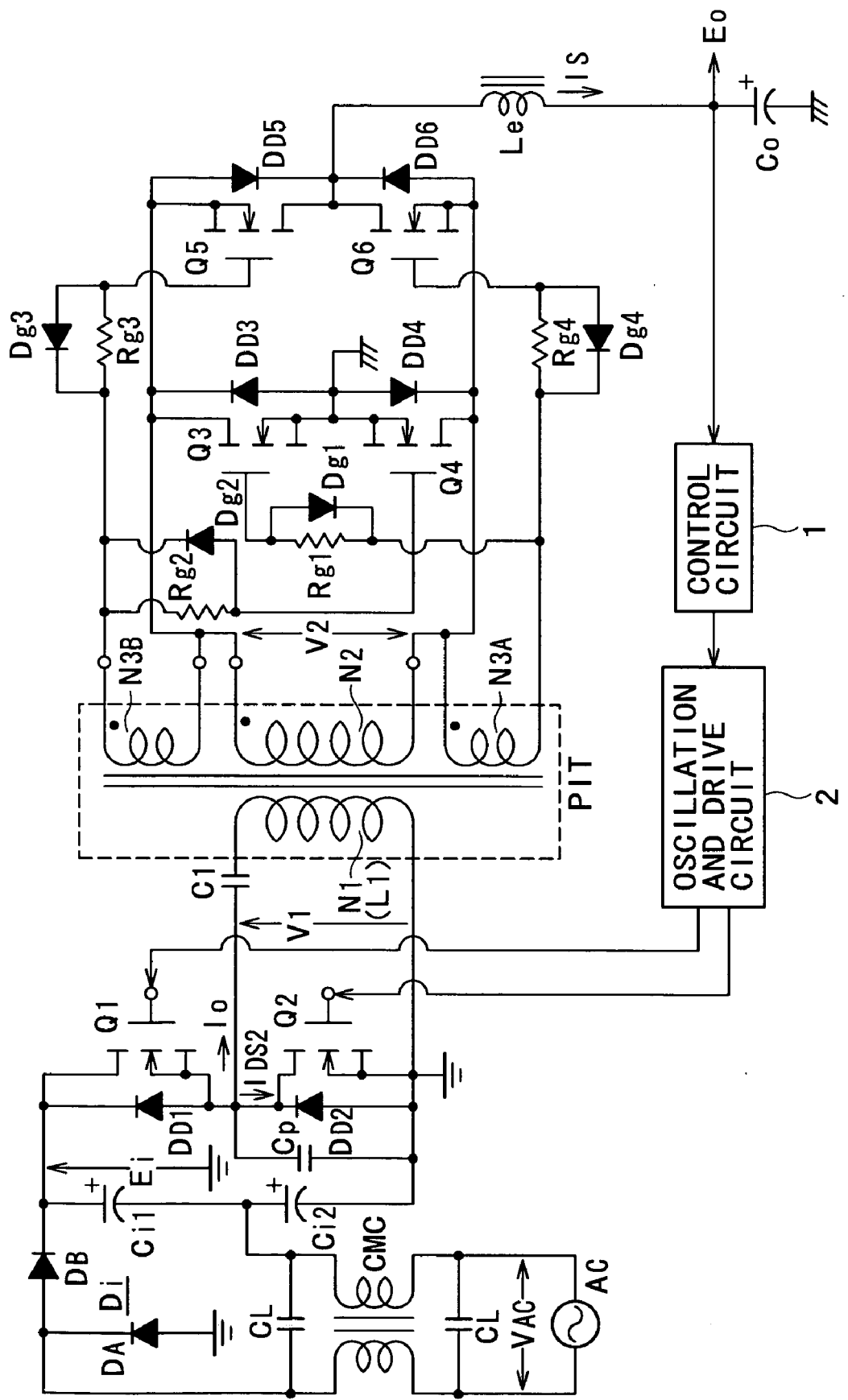
FIG. 14 is a circuit diagram showing a configuration of a switching power supply circuit according to a first embodiment of the present invention.

Thus, according to the first embodiment of the present invention, taking the problems of the circuits described hereinabove with reference to FIGS. 1 and 13 into consideration, a switching power supply circuit is configured in such a manner as shown in FIG. 14.

Referring to FIG. 14, the switching power supply circuit of the present embodiment includes four MOS-FETs, that is, MOS-FETs Q3, Q4, Q5 and Q6 as rectification elements which form a secondary side synchronous rectification circuit.

The MOS-FETs Q3, Q4, Q5, Q6 are connected in such a scheme as seen in FIG. 14 to form a bridge full-wave rectification circuit. Thus, by forming a bridge full-wave rectification circuit as the secondary side synchronous rectification circuit in this manner, the necessity for the center tap output of the secondary winding of the insulating converter transformer PIT is eliminated.

In this instance, on the secondary side of the insulating converter transformer PIT, a secondary winding N2, a driving winding N3A and another driving winding N3B shown are wounded. The driving winding N3A is formed by winding an extension of a winding starting end portion side of the secondary winding N2 while the driving winding N3B is formed by winding an extension of a winding ending end portion side of the secondary winding N2.

For the secondary winding N2, a Litz wire band or a flat braided wire formed from a plurality of Litz wires 10 is used similarly as in the circuit of FIG. 1.

For the driving windings N3A, N3B, for example, a solid wire in the form of a copper wire coated with an urethane resin layer is used.

It is to be noted that the number of turns of the secondary winding N2 in this instance is, for example, 3 T. Meanwhile, the numbers of the turns of the driving windings N3A, N3B are, for example, N3A=N3B=4 T.

In this instance, a MOS-FET Q3 is interposed in a rectification current path of the secondary side between the winding ending end of the secondary winding N2 and the secondary side ground. Meanwhile, another MOS-FET Q4 is interposed in another rectification current path of the secondary side between the winding starting end of the secondary winding N2 and the secondary side ground.

It is to be noted that, also in this instance, the MOS-FET Q3 is connected at the drain thereof to the winding ending end of the secondary winding N2. Similarly, the MOS-FET Q4 is connected at the drain thereof to the winding starting end of the secondary winding N2.

In addition, in the circuit of FIG. 14, a series connection circuit of a MOS-FET Q5 and another MOS-FET Q6 is connected in parallel to the series connection circuit of the MOS-FETs Q3, Q4 connected in parallel to the secondary winding N2 according to the connection scheme described above.

In this instance, the MOS-FET Q5 is connected at the source thereof to the winding ending end side of the secondary winding N2. Also the MOS-FET Q6 is connected at the source thereof to the winding starting end side of the secondary winding N2.

A node between the MOS-FETs Q5, Q6 (node between the drains of the MOS-FETs Q5, Q6) is grounded to the secondary side ground through an inductor Le and a smoothing capacitor Co.

Also for the MOS-FETs Q5, Q6, a MOS-FET of a trench structure having low on resistance is used similarly for the MOS-FETs Q3, Q4.

Further, in this instance, the MOS-FETs Q3 to Q6 are driven making use of alternating voltages obtained by the driving windings N3A, N3B each formed by winding an extension of the secondary winding N2 as described hereinabove.

To the gate of the MOS-FET Q3, the winding starting end of the driving winding N3A is connected through a parallel connection circuit of a gate register Rg1 and a Schottky diode Dg1. Meanwhile, to the gate of the MOS-FET Q4, the winding ending end of the driving winding N3B is connected through a parallel connection circuit of a gate register Rg2 and a Schottky diode Dg2.

Similarly, to the gate of the MOS-FET Q5, the winding ending end of the driving winding N3B is connected through a parallel connection circuit of a gate register Rg3 and a Schottky diode Dg3. Meanwhile, to the gate of the MOS-FET Q6, the winding starting end of the driving winding N3A is connected through a parallel connection circuit of a gate register Rg4 and a Schottky diode Dg4.

It is to be noted that, also in this instance, as can be recognized from the description above, a Schottky diode Dg (Dg1 to Dg4) is connected to the gate of each of the MOS-FETs. Thus, a good switching characteristic (turnoff characteristic) can be obtained from each MOS-FET as described hereinabove with reference to FIG. 1.

In the secondary side synchronous rectification circuit having the connection scheme described above, rectification current flows along the following paths.

First, within one of two half periods of an alternating voltage obtained in the secondary winding N2 of the insulating converter transformer PIT, rectification current flows along a path of the [secondary winding N2→MOS-FET Q5 (source→drain)→inductor Le→smoothing capacitor Co→MOS-FET Q4 (source→drain)→secondary winding N2].

Within the other half period of the alternating voltage excited in the secondary winding N2, rectification current flows along another path of the [secondary winding N2→MOS-FET Q6 (source→drain)→inductor Le→smoothing capacitor Co→MOS-FET Q3 (source→drain)→secondary winding N2].

In this manner, according to the circuit of FIG. 14, within one of two half periods of the secondary winding voltage, the MOS-FETs Q3 to Q6 are conducting to obtain operation of charging rectification current into the smoothing capacitor Co.

Further, within the other half period of the secondary winding voltage, the MOS-FETs Q4, Q5 are conducting to obtain operation of charging rectification current into the smoothing capacitor Co.

From such operations, it can be recognized that, in the circuit of FIG. 14, operation as a bridge rectification circuit wherein each two of the four rectification elements performs a rectification operation within one half period to charge the smoothing capacitor is obtained. From this, a full-wave rectification operation is obtained as a rectification operation.

As seen in FIG. 14, in the power supply circuit shown, the inductor Le is interposed in series between the output point (node between the MOS-FETs Q5, Q6) of rectification current by the bridge rectification circuit formed from the MOS-FETs Q3 to Q6 and the positive electrode terminal of the smoothing capacitor Co. In short, the inductor Le is inserted in the rectification current path for supplying charging current to the smoothing capacitor Co.

Further, in the circuit of FIG. 14, reverse directional current of rectification current is prevented by counter electromotive force generated in the inductor Le inserted in the rectification current path in this manner.

It is to be noted that, also in this instance, if the variation characteristic of the inductance value of the inductor Le with respect to a variation of the load current level is not taken into consideration, then there is the possibility that the inductance value may rise suddenly upon very light load operation (12.5 W or less) to cause abnormal oscillation operation similarly to the inductors Ld in the circuit of FIG. 1 described hereinabove.

Figure 15:
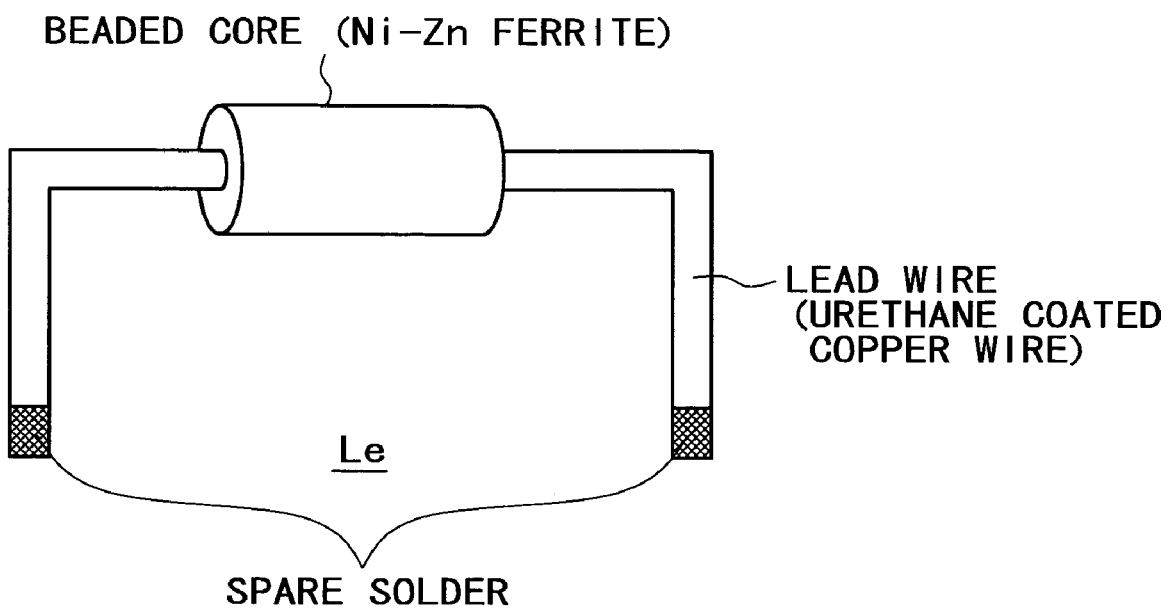
FIG. 15 is a schematic view of an appearance showing a structure of an inductor element provided on the secondary side of the switching power supply circuit of FIG. 14.

In order to prevent this, the inductor Le in the present embodiment is configured in such a manner as seen in FIG. 15.

FIG. 15 shows a structure of the inductor Le used in the power supply circuit of the present embodiment.

Referring to FIG. 15, a bead core having a tubular shape is used as the inductor Le similarly to the inductors Ld provided in the circuit of FIG. 1.

However, the bead core in this instance is made of, for example, a ferrite material of the Ni—Zn type. Further, the bead core has a size (diameter×length) set so as to be greater than the inductors Ld.

It is to be noted that, for the inductor Le in this instance, a copper wire coated with an urethane resin film is used as a lead wire to be inserted in a cavity region formed in the inside of the bead core. The copper wire coated with an urethane resin film is selected so as to have a cross sectional area greater than that of the lead wire used in the inductors Ld.

Figure 16:
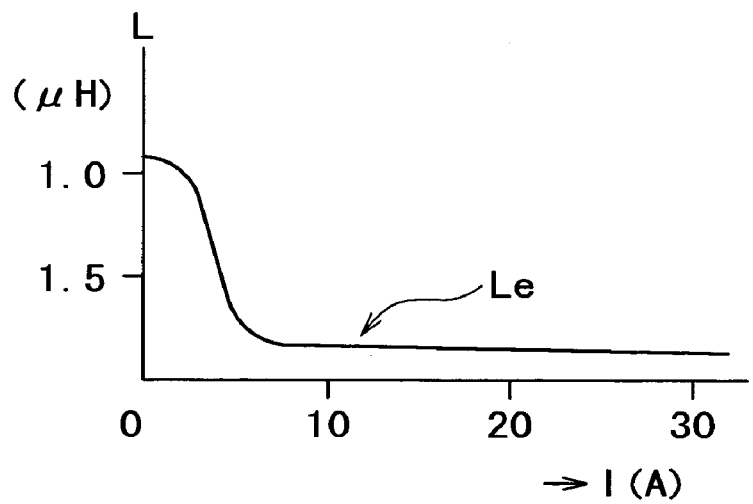
FIG. 16 is a diagram illustrating a dc superposition characteristic of the inductor element of FIG. 15.

In this manner, by selecting, for example, a ferrite material of the Ni—Zn type as the bead core of the inductor Le and providing the bead core with a size greater than the inductors Ld, for example, such a characteristic as illustrated in FIG. 16 can be obtained as a variation characteristic of the inductance of the inductor Le.

It is to be noted that FIG. 16 illustrates a variation characteristic of the inductance of the inductor Le with respect to the variation of the level of current flowing through the inductor Le (the level of the Is to the smoothing capacitor Co: load current level).

As seen from FIG. 16, the inductance value of the inductor Le in this instance exhibits a moderate decrease from approximately 1.1 μH with respect to an increase of the current level from a no-load state (load current=0 A) to 2 to 3 A or so. Then, when the current level increases from 2 to 3 A or so to 5 A or so, the inductor Le exhibits saturation and the inductance value thereof decreases approximately to 0.2 μH.

Furthermore, when the current level increases from 5 A or so, the inductance value exhibits a substantially fixed value approximately around 0.2 μH .

Where such a dc superposition characteristic as illustrated in FIG. 16 is obtained for the inductor Le, even if the load current level drops, for example, to 2 to 3 A or so, such a situation that the inductance value increases suddenly as in the case of the inductors Ld can be prevented.

Consequently, such a situation that the secondary side rectification operation is placed into a discontinuous mode in response to the load current of 2 to 3 A or so as in the case of the circuit of FIG. 1 can be prevented. In other words, in the conditions of low voltage and high current described hereinabove, the continuous mode can be maintained in operation from very light load operation wherein the load power Po is Po=12.5 W or less to no load operation.

Since the continuous mode is maintained in this manner, abnormal oscillation operation which occurs in very light load operation can be prevented.

Consequently, the circuit of FIG. 14 can achieve stabilized operation from maximum load operation to no-load operation.

It is to be noted that, while a ferrite material of the Ni—Zn type is selectively used for the core of the inductor Le, some other amorphous magnetic substance may be used instead. However, where a ferrite material of the Ni—Zn type is used, the dispersion in inductance can be suppressed rather than where an amorphous magnetic substance is used.

Further, such setting of the dc superposition characteristic of the inductor Le by a bead core can be performed by setting of the core size.

In particular, in the present embodiment, in order to obtain a characteristic that, even where the load current drops to the zero level (that is, to the range down to the no-load current level), the inductance of the inductor Le does not increase suddenly until a discontinuous mode is entered, it is only necessary to set the core size in accordance with the quality of material of the core to be used as the bead core.

Figure 17:
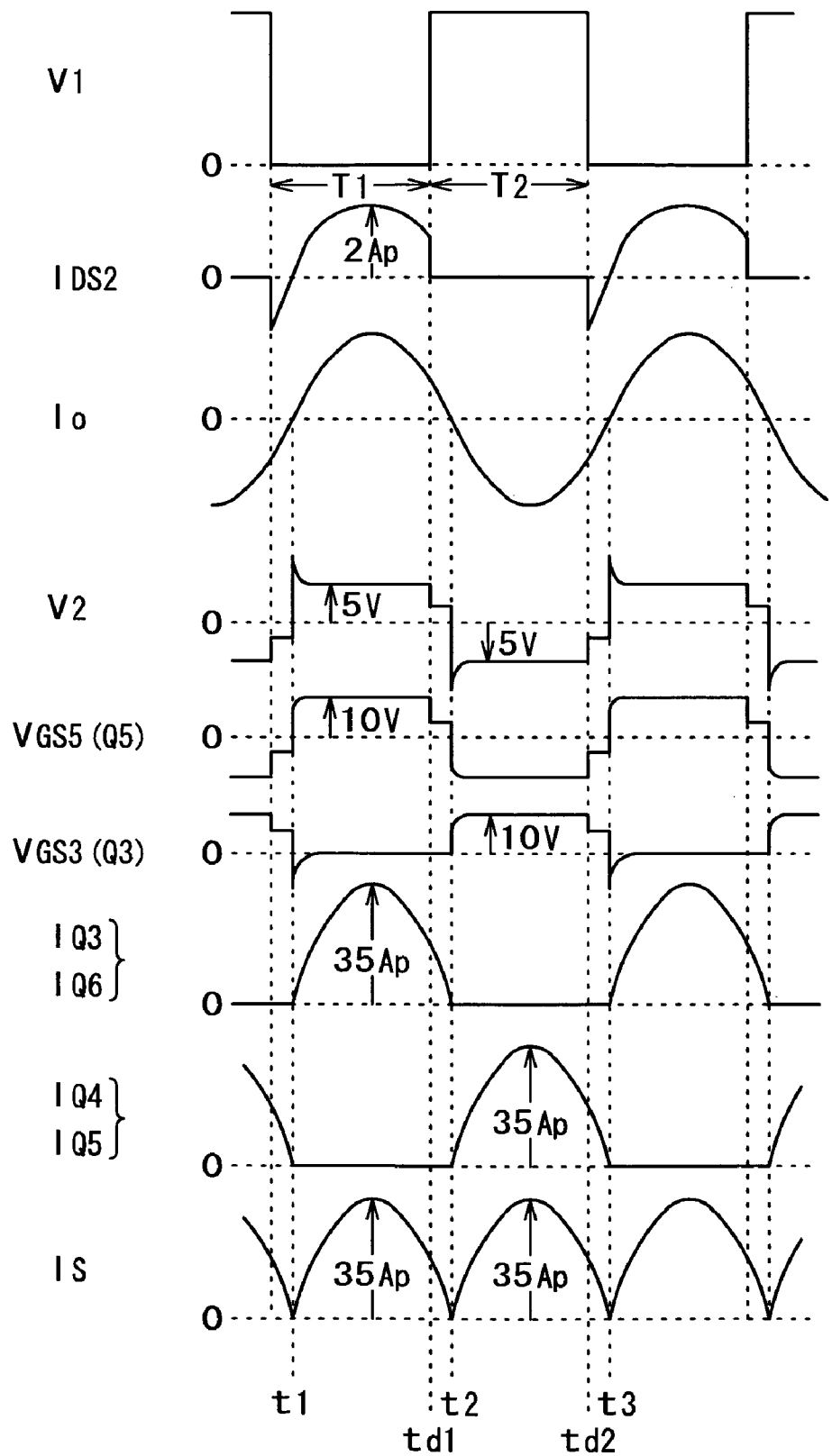
FIG. 17 is a waveform diagram illustrating operation of the switching power supply circuit of FIG. 15 in a heavy load condition.

FIG. 17 illustrates operation waveforms of several elements of the circuit of FIG. 14 having such a configuration as described above.

FIG. 17 particularly illustrates a result of measurement under the conditions of the ac input voltage VAC=100 V and the load power Po=100 W.

Further, in order to obtain the result of experiment illustrated in FIG. 17, the following conditions were used:

Primary side series resonance capacitor C1=0.015 μF

Insulating converter transformer PIT: primary winding N1=80 T, secondary winding N2=3 T (Litz wire band or flat braided wire), driving winding N3A=N3B=4 T (copper solid line coated with urethane), gap G=1.5 mm, coupling coefficient k=approximately 0.80

Inductor Le=1.1 μH

Smoothing capacitor Co: capacitance C=6,800 μF, withstanding voltage 6.3 V, ESR=16 mΩ

MOS-FETs Q3, Q4, Q5, Q6: withstanding voltage 30 A/10 V, on resistance RON=2.5 mΩ

It is to be noted that, also in this instance, the gap G=1.5 mm was set as the gap length of the insulating converter transformer PIT similarly as in the case of the basic configuration of FIG. 1, and the coupling coefficient k was set to k=approximately 0.80 to establish a loose coupling state.

Together with this, in this instance, the primary and secondary windings N1 and N2 were set to N1=80 T and N2=3 T to achieve expansion of the continuous mode in a heavy load condition similarly as in the case of FIG. 1.

Referring to FIG. 17, the voltage V1 across the switching element Q2 and the switching current IDS2 flowing through the switching element Q2//damper diode DD2 are illustrated.

As can be seen from comparison with FIG. 11, the voltage V1 and the switching current IDS2 have similar waveforms to those of the circuit of FIG. 1.

Also a waveform of the primary side series resonance current Io is illustrated in FIG. 17. Also the primary side series resonance current Io in this instance has a waveform of a substantially sine wave which zero-crosses at time points t1, t2 and t3. In other words, also the primary side series resonance current Io in this instance has a waveform similar to that of FIG. 4.

From those, it can be recognized that, in heavy load operation, the primary side of the circuit of FIG. 14 operates similarly to that of the circuit of FIG. 1.

Also the voltage V2 appearing across the secondary winding N2 in this instance has zero-cross timings coincident with those of the primary side series resonance current Io as seen in FIG. 14 (refer to time points t1, t2 and t3). The peak level of the voltage V2 is 5 V as seen in FIG. 17.

Also the gate-source voltage VGS3 which appears between the gate and the source of the MOS-FET Q3 has zero-cross timings coincident with those of the primary side series resonance current Io as seen in FIG. 14. Also it can be seen that the gate-source voltage VGS5 of the MOS-FET Q5 is continuous to the primary side series resonance current Io. In short, the gate-source voltages of the MOS-FETs provided on the secondary side have zero-cross timings coincident with those of the primary side series resonance current Io.

Since the zero-cross timings of the gate-source voltages of the MOS-FETs provided on the secondary side and the voltage V2 appearing across the secondary winding N2 coincide with those of the primary side series resonance current Io in this manner, also the waveforms of the rectification currents IQ3, IQ4, IQ5, IQ6 flowing through the MOS-FETs Q3, Q4, Q5, Q6, respectively, exhibit zero-cross timings which overlap with zero-cross timings of the primary side series resonance current Io. In other words, the rectification currents IQ3, IQ4, IQ5, IQ6 in this instance flow continuously to the primary side series resonance current Io.

Since the rectification currents IQ3 to IQ6 flow continuously to the primary side series resonance current Io in this manner, also the charging current Is to the smoothing capacitor Co similarly flows continuously to the primary side series resonance current Io.

From those, it can be recognized-that, also in the circuit of the embodiment shown in FIG. 14, a continuous mode of secondary side rectification operation is obtained also when the switching frequency is controlled to a low level, for example, as a result of determination of a heavy load condition.

Further, it can be seen in FIG. 17 that, also in this instance, no reverse directional current flows as the rectification currents IQ3 to IQ6. The reason why no reverse directional current flows in the rectification currents in this instance is that the inductor Le is inserted in the rectification current path.

It is to be noted that, in the present embodiment, the inductor Le is set so as to have a comparatively low inductance of approximately 1.1 μH as described hereinabove so that appearance of reverse directional current in the rectification current can be prevented.

It is described here for the confirmation that, also in this instance, in regard to operation in a light load condition (Po=25 Wh), the switching current IDS2 (primary side series resonance current Io) has zero-cross timings substantially coincident with those of the charging current Is similarly as in the case described hereinabove with reference to FIG. 12. Consequently, a continuous mode is obtained.

As described above, according to the first embodiment, the numbers of windings and the gap length of the insulating converter transformer PIT are set so that the magnetic flux density in the insulating converter transformer PIT may be lower than a predetermined level to achieve expansion of the continuous mode in heavy load operation similarly as in the circuits described hereinabove with reference to FIGS. 1 and 13. Consequently, reduction of reactive power generated when a discontinuous mode is entered in a heavy load condition can be anticipated.

Further, in the present embodiment, appearance of reverse directional current which is generated in rectification current is prevented by the inductor Le inserted in the rectification current path thereby to achieve further reduction of the reactive power.

Thus, improvement of the power conversion efficiency is achieved by such reduction of the reactive power.

It is to be noted that, according to an experiment, a result was obtained that the power conversion efficiency ηAC→DC of the switching power supply circuit of the present embodiment shown in FIG. 14 is similar (ηDC→AC=86.5%) to that of the circuit of FIG. 1.

Further, in the present embodiment, the core of the inductor Le provided in the secondary side rectification current path is made of a ferrite material, for example, of the Ni—Zn type, and a bead core of a greater size than that of the inductors Ld shown in FIG. 1 is selectively used. Consequently, such a variation characteristic of the inductance value as illustrated in FIG. 16 can be obtained.

As a result, even when the load power Po decreases below a predetermined level (for example, lower than 12.5 W), the inductance value of the inductor Le does not increase suddenly to its peak level as described above. Consequently, an abnormal oscillation operation in such a very light load condition can be prevented to assure stabilized operation within the range of the load power Po=100 W to 0 W.

Further, in the present embodiment, since a full-wave rectification circuit including four MOS-FETs is formed as the secondary side synchronous rectification circuit, the necessity for the center tap of the secondary winding of the insulating converter transformer PIT can be eliminated.

Where the center tap is rendered unnecessary in this manner, only one winding can be wound as the secondary winding through which rectification current is to flow. Consequently, such a situation that the level of the rectification current flowing through the secondary winding is rendered imbalanced as in the circuit of FIG. 1 can be prevented.

This is indicated also from that, in the waveform diagram of FIG. 17, the peak level of the charging current Is to the smoothing capacitor Co is fixed at 35 Ap among different half periods.

Further, where only one winding can be wound as the secondary winding as described above, only it is necessary to wound only one Litz wire band or flat braided wire formed from a plurality of Litz wires 10. As a result, the process of production of the insulating converter transformer PIT in this instance can be simplified when compared with that of the circuit of FIG. 1.

Further, in the switching power supply circuit of the present embodiment, high frequency noise upon turning off of each MOS-FET which appears on the secondary side dc output voltage Eo can be suppressed by the inductor Le provided in the rectification current path in such a manner as described above.

In particular, since the inductor Le is inserted in such a manner as to be connected in series to the positive electrode terminal of the smoothing capacitor Co as seen in FIG. 14, an impedance component of the inductor Le can suppress noise to be generated on the secondary side dc output voltage Eo as a voltage across the smoothing capacitor Co.

Particularly in this instance, since the inductor Le has such a characteristic as described hereinabove with reference to FIG. 16, a better suppression action of such high frequency components as described above can be anticipated.

In this instance, the inductor Le has a characteristic with respect to the variation of the current level (charging current Is) that the inductance value thereof increases in the proximity of the zero level of the current level as described hereinabove.

In contrast, as described hereinabove, noise components which appear on the secondary side dc output voltage Eo are generated upon turning off of the MOS-FETs. In particular, such noise components are generated within a period within which the charging current Is approaches the zero level at a timing at which each MOS-FET turns off. Accordingly, the inductance value of the inductor Le in the present embodiment increases at a timing at which noise to the secondary side dc output voltage Eo is generated.

From this, the inductor Le in the present embodiment can achieve a higher noise suppression effect at a timing at which noise components are generated on the secondary side dc output voltage Eo. Consequently, a better suppression effect of noise components appearing on the secondary side dc output voltage Eo can be obtained.

Since high frequency noise which may otherwise appear on the secondary side dc output voltage Eo can be suppressed well by the inductor Le, the circuit of FIG. 14 can eliminate the π type filter provided in the circuit of FIG. 1.

Further, as the secondary winding of the insulating converter transformer PIT in the circuit of the present embodiment, the secondary winding N2 is wound, and in order to obtain a gate-source voltage for driving the MOS-FETs, separate driving windings (N3A, N3B) are wound.

Where the windings for driving the MOS-FETs are wound separately in this manner, it is not necessary to obtain a high voltage for driving the MOS-FETs using the secondary winding N2 which is used for supplying rectification current. Consequently, the level of the voltage V2 to be generated in the secondary winding N2 can be lowered.

Where the level of the voltage V2 can be lowered in this manner, the drain-source voltage of each MOS-FET can be lowered as much. Consequently, in the present embodiment, the snubber circuit provided for lowering the withstanding voltage between the drain and the source of each MOS-FET in the circuit of FIG. 1 can be omitted.

It is to be noted that, in this instance, where the withstanding voltage of each MOS-FET is 10 V, the peak level of the voltage appearing between the drain and the source of each MOS-FET can be suppressed equal to or lower than 10 Vp at the highest as seen from the waveform of the voltage V2 shown in FIG. 17.

From the foregoing, with the configuration of the power supply circuit of the present embodiment, simplification in configuration by reduction of the number of secondary windings through which rectification current flows, elimination of the π type circuit on the secondary side and elimination of the snubber circuit can be achieved when compared with the circuit of FIG. 1. Besides, a power conversion efficiency similar to that by the circuit of FIG. 1 can be achieved.

Further, where the configuration of the power supply circuit of the present embodiment is compared with the basic configuration described hereinabove with reference to FIG. 13, while the circuit of FIG. 13 includes two choke coils Lo which include an EE type core, the power supply circuit of the present embodiment requires only one inductor Le of a simple configuration which includes such a bead core as described hereinabove with reference to FIG. 15.

Further, in this instance, since the inductor Le in the present embodiment has an element size reduced significantly when compared with the choke coils Lo of the circuit of FIG. 13, there is a merit that the mounting area of the board can be reduced significantly.

Furthermore, since the inductor Le is an inductor element having a bead core, it does not require a winding wound thereon and can be produced by a simpler process of production than the choke coils Lo.

<Second Embodiment>

Figure 18:
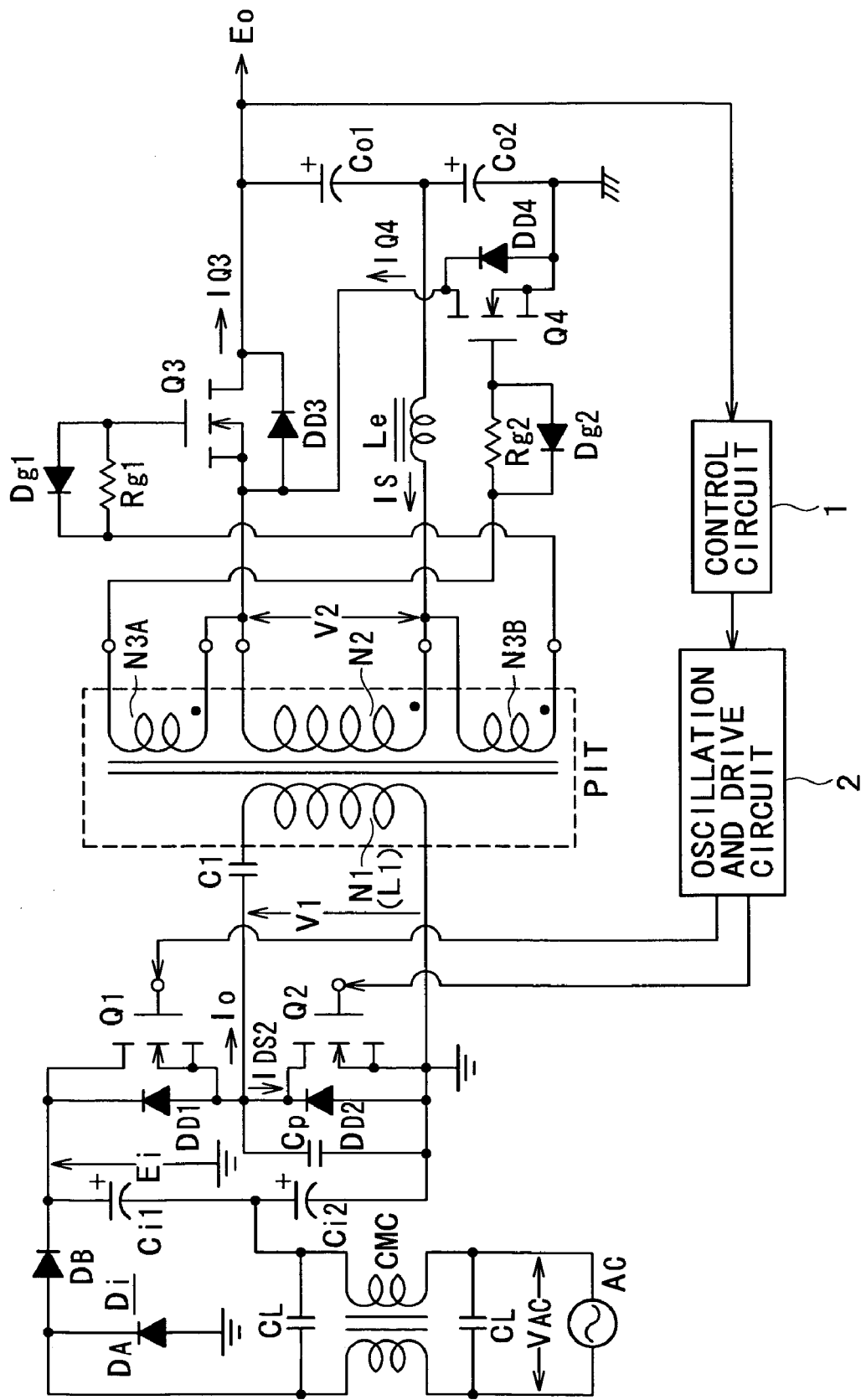
FIG. 18 is a circuit diagram showing a configuration of a switching power supply circuit according to a second embodiment of the present invention.

FIG. 18 shows a configuration of a switching power supply circuit according to a second embodiment of the present invention.

The switching power supply circuit of the second embodiment includes a full-wave rectification circuit formed from MOS-FETs Q3, Q4 as a synchronous rectification circuit on the secondary side. The switching power supply circuit further includes a pair of smoothing capacitors Co1, Co2 each for being charged with a rectification output of a corresponding one of the MOS-FETs Q3, Q4 within each one half period thereby to form a voltage doubler full-wave rectification circuit.

In short, in the present second embodiment, the center tap output of the secondary winding of the insulating converter transformer PIT is eliminated by such a configuration of the voltage doubler rectification circuit as just described.

Also in this instance, on the secondary side of the insulating converter transformer PIT, a secondary winding N2, a driving winding N3A and another driving winding N3B shown are wounded. The driving winding N3A is formed by winding an extension of a winding starting end portion side of the secondary winding N2 while the driving winding N3B is formed by winding an extension of a winding ending end portion side of the secondary winding N2.

For the secondary winding N2, a Litz wire band or a flat braided wire formed from a plurality of Litz wires 10 is used similarly. For the driving windings N3A, N3B, for example, a solid wire in the form of a copper wire coated with an urethane resin layer is used.

It is to be noted that, also in this instance, the number of turns of the secondary winding N2 is, for example, 1 T. Meanwhile, the numbers of the turns of the driving windings N3A, N3B are, for example, N3A=N3B=4 T.

In this instance, in the synchronous rectification circuit on the secondary side, the source of the MOS-FET Q3 is connected to the winding starting end of the secondary winding N2 as seen in FIG. 18. Further, the positive electrode terminal of the smoothing capacitor Co1 is connected to the drain of the MOS-FET Q3, and the negative electrode terminal of the smoothing capacitor Co1 is connected to the winding ending end of the secondary winding N2 through an inductor Le.

Further, in this instance, also the drain of the MOS-FET Q4 is connected together with the source of the MOS-FET Q3 to the winding starting end of the secondary winding N2. The source of the MOS-FET Q4 is connected to a node between the negative electrode terminal of the smoothing capacitor Co2 and the secondary wide ground.

Further, the positive electrode terminal of the smoothing capacitor Co2 is connected to the negative electrode terminal of the smoothing capacitor Co1. In short, the positive electrode of the smoothing capacitor Co2 is connected to the winding ending end of the secondary winding N2 through the inductor Le.

According to the connection scheme described above, the MOS-FETs Q3, Q4 are connected in a parallel relationship as viewed from the winding starting end of the secondary winding N2. A series connection circuit of the smoothing capacitors Co1, Co2 is inserted between the opposite ends of the parallel connection circuit of the MOS-FETs Q3, Q4.

Also in this instance, the MOS-FETs Q3, Q4 are driven making use of alternating voltages obtained at the driving windings N3A, N3B formed by winding the extensions of the secondary winding N2 as described above.

As seen in FIG. 18, the winding ending end of the driving winding N3B is connected to the gate of the MOS-FET Q3 through a parallel connection circuit of a gate resistor Rg1 and a Schottky diode Dg1. Meanwhile, the winding starting end of the driving winding N3A is connected to the gate of the MOS-FET Q4 through a parallel connection circuit of a gate resistor Rg2 and a Schottky diode Dg2.

In the synchronous rectification circuit on the secondary side having such a connection scheme as described above, rectification current flows along the following paths.

First, within one of two half periods of the alternating voltage obtained in the secondary winding N2 of the insulating converter transformer PIT, rectification current flows along a path of the [secondary winding N2→MOS-FET Q3 (source→drain)→smoothing capacitor Co1→inductor Le→secondary winding N2].

Within the other half period of the alternating voltage excited in the secondary winding N2, rectification current flows along another path of the [secondary winding N2→inductor Le→smoothing capacitor Co2→MOS-FET Q4 (source→drain)→secondary winding N2].

In this manner, in the circuit of FIG. 18, within one of two half periods of the secondary winding voltage, the MOS-FET Q3 is conducting to obtain operation of charging rectification current into the smoothing capacitor Co1.

Further, within the other half period of the secondary winding voltage, the MOS-FET Q4 is conducting to obtain operation of charging rectification current into the other smoothing capacitor Co2.

Consequently, a voltage obtained across the series connection circuit of the smoothing capacitor Co1 and the smoothing capacitor Co2 has a level corresponding to twice the level of the alternating voltage obtained at the secondary winding N2. In other words, a secondary side dc output voltage Eo in this instance has a level corresponding to twice the secondary winding voltage level. From this, it can be recognized that operation as a voltage doubler rectification circuit is obtained with the circuit of FIG. 18.

Further, since the rectification elements charge the current obtained by the overall secondary winding N2 within each one half period alternately into the smoothing capacitors, it can be recognized that the rectification operation described above is a full-wave rectification operation.

Also in the power supply circuit of FIG. 18, the inductor Le is interposed in series between the winding ending end of the secondary winding N2 and the node between the smoothing capacitors Co1, Co2. In particular, also in this instance, reverse directional current of rectification current is prevented by counter electromotive force generated in the inductor Le interposed in the rectification current path in this manner.

Also in this instance, where the inductor Le has such a characteristic as described hereinabove with reference to FIG. 14, abnormal oscillation can be prevented under very light load condition.

Figure 19:
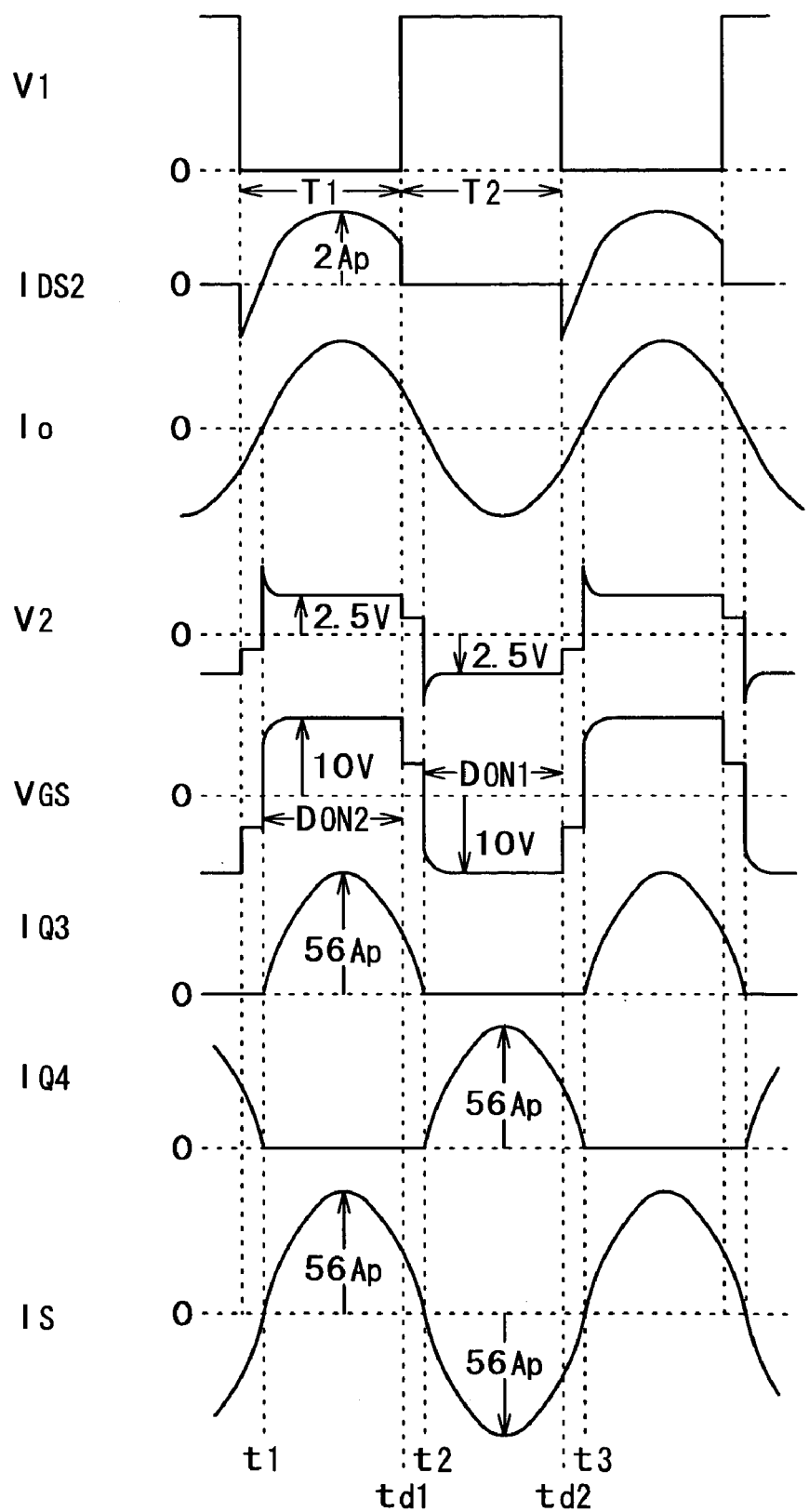
FIG. 19 is a waveform diagram illustrating operation of the switching power supply circuit of FIG. 18 in a heavy load condition.

FIG. 19 illustrates operation waveforms of several elements of the circuit of FIG. 18 having such a configuration as described above.

Also FIG. 19 particularly illustrates a result of measurement under the conditions of the ac input voltage VAC=100 V and the load power Po=100 W.

Further, to obtain the result of experiment illustrated in FIG. 19, the following conditions were used:

Primary side series resonance capacitor C1=0.015 μF

Insulating converter transformer PIT: primary winding N1=80 T, secondary winding N2=1 T (Litz wire band or flat braided wire), driving winding N3A=N3B=4 T (copper solid line coated with urethane), gap G=1.5 mm, coupling coefficient k=approximately 0.80

Inductor Le=1.1 μH

Smoothing capacitors Co1, Co2: capacitance C=6,800 μF, withstanding voltage 6.3 V, ESR=16 mΩ

MOS-FETs Q3, Q4: withstanding voltage 30 A/10 V, on resistance RON=2.5 mΩ

Here, as can be recognized from such selected conditions as above, also in this instance, the gap length of the insulating converter transformer PIT was set to G=1.5 mm similarly as in the case of the switching power supply circuit of FIG. 14, and the coupling coefficient k was set to k=approximately 0.80 to establish a loose coupling state.

Further, in this instance, the primary and secondary windings N1, N2 were set to N1=80 T and N2=1 T, respectively, to achieve expansion of the continuous mode in heavy load operation similarly as in the switching power supply circuit of FIG. 14.

It is to be noted that, in this instance, the reason why the number of windings of the secondary winding N2 is set smaller than that of the circuit of the configuration of FIG. 14 described hereinabove is that, since the secondary side circuit is formed as a doubler voltage rectification circuit as described above, a secondary winding voltage of a lower level is obtained.

Also in FIG. 19, the voltage V1 across the switching element Q2, the switching current IDS2 and the primary side series resonance current Io are illustrated.

Since also the primary side configuration of the circuit of FIG. 18 is similar to that of the circuit of FIG. 14, these waveforms are similar those of the circuit of FIG. 14.

The voltage V2 generated in the secondary winding N2 in this instance has a level of approximately 2.5 V as seen in FIG. 19. In short, since the level of the voltage V2 in the circuit shown in FIG. 14 is approximately 5 V, it can be recognized that the level of the voltage V2 in the circuit of FIG. 19 is reduced to one half. Also from this, it can be understood that the configuration of the second embodiment wherein the synchronous rectification circuit is formed as a voltage doubler rectification circuit can lower the voltage V2 with respect to that obtained wherein ordinary full-wave rectification operation is performed.

Further, in this instance, although the gate-source voltage VGS appearing between the gate and the source of the MOS-FETs Q3, Q4 is illustrated, the peak level also of the gate-source voltage VGS is approximately 10 V similarly to the voltages VGS3, VGS5 in the circuit of FIG. 14.

Meanwhile, the rectification currents IQ3, IQ4 flowing through the MOS-FETs Q3, Q4, respectively, in the circuit of FIG. 18 have a peak level of 56 Ap.

Further, the charging current Is to the smoothing capacitors Co (Co1, Co2) which is composite current of the rectification currents IQ3, IQ4 has a waveform having positive and negative peak levels of 56 Ap in the two half periods as seen in FIG. 19.

As can be seen from the waveforms mentioned, also in this instance, the voltage V2, gate-source voltage VGS, rectification currents IQ3, IQ4 and charging current Is have zero-cross points coincident with those of the primary side series resonance current Io (refer to time points t1, t2, t3). In other words, it can be recognized from this that, also in the circuit of FIG. 18, a continuous mode of secondary side rectification current is obtained also when the switching frequency is controlled to a low level, for example, as a result of determination of a heavy load condition.

It is to be noted that, also in the circuit of the embodiment shown in FIG. 19, no reverse directional current flows as the rectification currents IQ3, IQ4, and this arises from the fact that the inductor Le is inserted in the rectification current path similarly as in the circuit of FIG. 14. Further, if the inductance of the inductor Le is set to approximately 1.1 μH as set forth hereinabove, appearance of reverse directional current can be prevented.

It is described here for the confirmation that, also in this instance, in regard to operation in a light load condition (Po=25 Wh), a continuous mode is obtained similarly as in the circuit of FIG. 14.

In this manner, also with the switching power supply circuit of the second embodiment, the numbers of windings and the gap length of the insulating converter transformer PIT are set so that the magnetic flux density in the insulating converter transformer PIT may be lower than a predetermined level thereby to achieve expansion of the continuous mode in heavy load operation similarly as in the circuit described hereinabove with reference to FIG. 14. Consequently, reduction of reactive power generated when a discontinuous mode is entered in a heavy load condition can be anticipated.

Further, also in the second embodiment, appearance of reverse directional current which is generated in rectification current is prevented by the inductor Le inserted in the rectification current path thereby to achieve further reduction of the reactive power.

Thus, improvement of the power conversion efficiency is achieved by such reduction of the reactive power.

It is to be noted that, according to an experiment, a result was obtained that the power conversion efficiency ηDC→AC of the switching power supply circuit shown in FIG. 18 is similar to that of the circuit of FIG. 1.

Further, also in the second embodiment, since the switching power supply circuit includes the inductor Le, the inductance value of the inductor Le does not increase suddenly to its peak level also in such a very light load condition wherein the load power Po decreases below a predetermined level (for example, equal to or lower than 12.5 W). Consequently, abnormal oscillation operation can be prevented thereby to assure stabilized operation within the range of the load power Po=100 W to 0 W.

Further, as a result of insertion of the inductor Le, high frequency noise which is generated in the secondary side dc output voltage Eo can be suppressed also in the second embodiment.

In particular, since the inductor Le in the second embodiment is inserted such that it is connected in series to the node between the smoothing capacitor Co1 and the smoothing capacitor Co2 as described hereinabove with reference to FIG. 18, noise appearing on the secondary side dc output voltage Eo obtained across the series connection circuit of the smoothing capacitor can be suppressed by the impedance component of the inductor Le.

Also in this instance, where the inductor Le has such a characteristic as described hereinabove with reference to FIG. 16, a better suppression action of such high frequency components as described above can be achieved similarly as in the first embodiment described hereinabove.

Since high frequency noise which may otherwise appear on the secondary side dc output voltage Eo can be suppressed well by the inductor Le, also the circuit of FIG. 18 can eliminate the n type filter provided in the circuit of FIG. 1.

Further, in the second embodiment, since a voltage doubler full-wave rectification circuit is formed as the synchronous rectification circuit on the secondary side, the center tap of the secondary winding of the insulating converter transformer PIT can be eliminated.

Where the center tape is eliminated in this manner, also in this instance, the level of the rectification current flowing through the secondary winding can be prevented from being imbalanced. Thus, the charging current Is for the smoothing capacitors Co has a fixed level at 56 Ap as seen in the waveform diagram of FIG. 19.

Further, where only one winding can be wound as the second wining as described above, only it is necessary to wound only one Litz wire band or flat braided wire formed from a plurality of Litz wires 10. Also in this instance, the process for production of the insulating converter transformer PIT can be simplified when compared with that for production of the circuit of FIG. 1.

Further, since the separate driving windings (N3A, N3B) are wound also in the second embodiment, the necessity to obtain a high voltage level for driving the MOS-FETs from the secondary winding N2 is eliminated. Consequently, the level of the voltage V2 to be generated in the secondary winding N2 can be lowered. Particularly in this instance, since a voltage doubler rectification circuit is formed as described hereinabove, the voltage V2 to be obtained at the secondary winding N2 can be set to a lower level.

Where the level of the voltage V2 can be lowered in this manner, the drain-source voltage of each MOS-FET can be lowered as much. Consequently, the snubber circuit provided to lower the withstanding voltage between the drain and the source of each MOS-FET can be eliminated also in the present second embodiment.

Now, a modification to the second embodiment is described with reference to FIG. 20.

Figure 20:
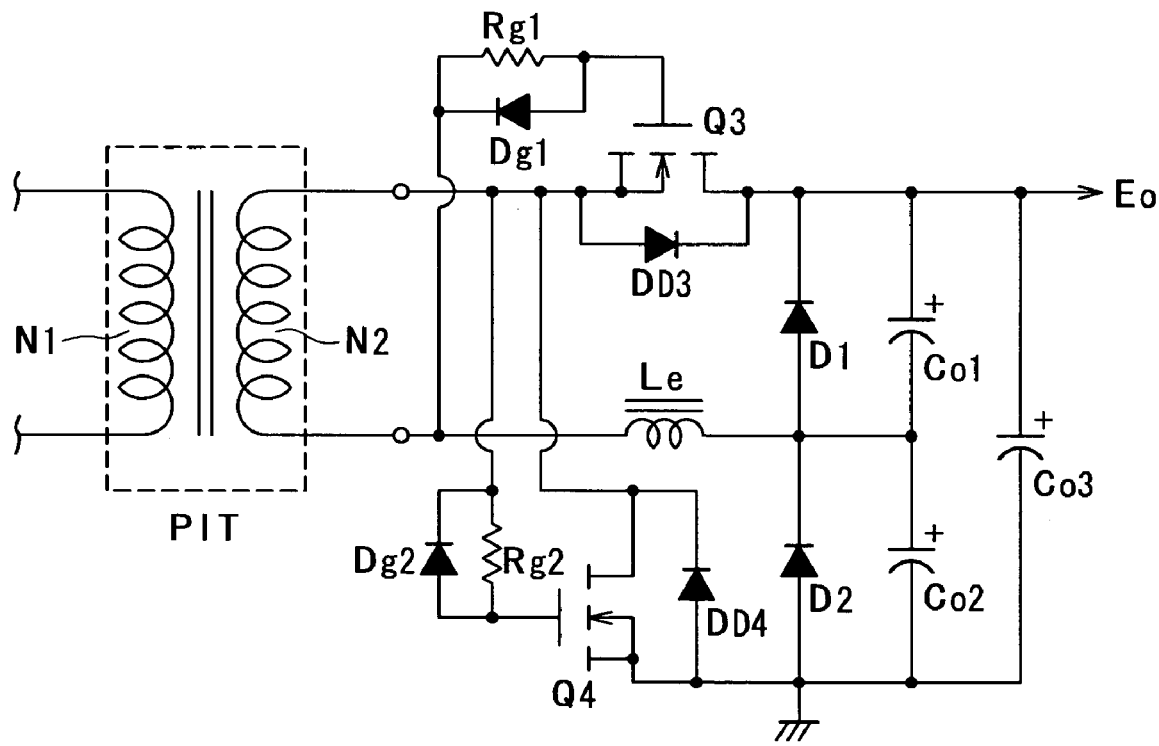
FIG. 20 is a circuit diagram showing a modification to the switching power supply circuit of FIG. 18.

It is to be noted that the configuration of the primary side is similar to that of FIG. 18 and consequently is omitted also in FIG. 20.

The modified power supply circuit is different from the power supply circuit of the second embodiment in that it does not include the driving windings N3A, N3B wound on the secondary side of the insulating converter transformer PIT as seen in FIG. 20.

The gate of the MOS-FET Q3 is connected an end of the secondary winding N2 through the gate resistor Rg1. The gate of the MOS-FET Q4 is connected to the other end of the secondary winding N2 through the gate resistor Rg2.

Thus, in this instance, each of the MOS-FETs Q3, Q4 is driven in accordance with a result of detection by a corresponding gate electrode Rg (Rg1, Rg2) of an alternating voltage generated in the secondary winding N2.

Further, in the present modification, a Schottky diode D1 is connected in parallel to the smoothing capacitor Co1. In particular, the cathode of the Schottky diode D1 is connected to a node between the positive electrode terminal of the smoothing capacitor Co1 and the drain of the MOS-FET Q3, and the anode of the Schottky diode D1 is connected to the negative electrode terminal of the smoothing capacitor Co1.

Similarly, another Schottky diode D2 is connected in parallel to the smoothing capacitor Co2. In particular, the cathode of the Schottky diode D2 is connected to a node between the positive electrode terminal of the smoothing capacitor Co2 and the source of the MOS-FET Q4, and the anode of the Schottky diode D2 is connected to the negative electrode side of the smoothing capacitor Co2.

Further, a smoothing capacitor Co3 is connected in parallel to the series connection circuit of the smoothing capacitors Co1, Co2. In particular, the positive electrode terminal of the smoothing capacitor Co3 is connected to the positive electrode terminal of the smoothing capacitor Co1, and the negative electrode terminal of the smoothing capacitor Co3 is connected to the negative electrode terminal of the smoothing capacitor Co2.

According to the connection scheme described above, within one of two half periods of the alternating voltage obtained in the secondary winding N2, secondary side rectification current flows along a path of the [secondary winding N2→MOS-FET Q3→smoothing capacitor Co1→inductor Le→secondary winding N2]. Further, in this instance, the rectification current branches and flows also along another path of the [MOS-FET Q3→smoothing capacitor Co3→Schottky diode D2→inductor Le].

Within the other half period of the alternating voltage within which the MOS-FET Q3 is off and the MOS-FET Q4 is driven on, rectification current flows along a path of the [secondary winding N2→inductor Le→smoothing capacitor Co2→MOS-FET Q4→secondary winding N2]. Further, also within this half period, the rectification current branches and flows also along another path of the [inductor Le→Schottky diode D1→smoothing capacitor Co3→MOS-FET Q4].

In this manner, in the modified circuit of FIG. 20, within one of two half periods of the alternating voltage of the secondary winding N2, rectification operation is performed by the set of the MOS-FET Q3 and the Schottky diode D2. On the other hand, within the other half period, rectification operation is performed by the set of the MOS-FET Q4 and the Schottky diode D1.

Further, also in this instance, within one of two half periods of the alternating voltage generated in the secondary winding N2, the rectification current is charged into the smoothing capacitor Co1. On the other hand, within the other half period, the rectification current is charged into the smoothing capacitor Co2. Consequently, also in this instance, a dc voltage of a level corresponding to twice the secondary winding voltage level is obtained across the series connection circuit of the smoothing capacitor Co1 and the smoothing capacitor Co2.

Further, in the circuit of FIG. 20, since the smoothing capacitor Co3 is connected in parallel to the series connection circuit of the smoothing capacitors Co1, Co2, a voltage of a level corresponding to twice the secondary winding voltage level is generated by the smoothing capacitor Co3.

As a result, a level corresponding to twice the secondary winding voltage is obtained as the secondary side dc output voltage Eo which is a voltage across the smoothing capacitor Co3. In other words, also in this instance, voltage doubler operation is obtained with the synchronous rectification circuit.

Also with the configuration of the modification, similar effects to those of the circuit of FIG. 18 can be achieved.

Here, it is described for the confirmation that the reason why the snubber circuit can be eliminated also in the modification is that, since the secondary circuit is formed as a voltage doubler rectification circuit, the secondary wining voltage (drain-source voltage of the MOS-FETs) can be lowered as much.

<Third Embodiment>

Figure 21:
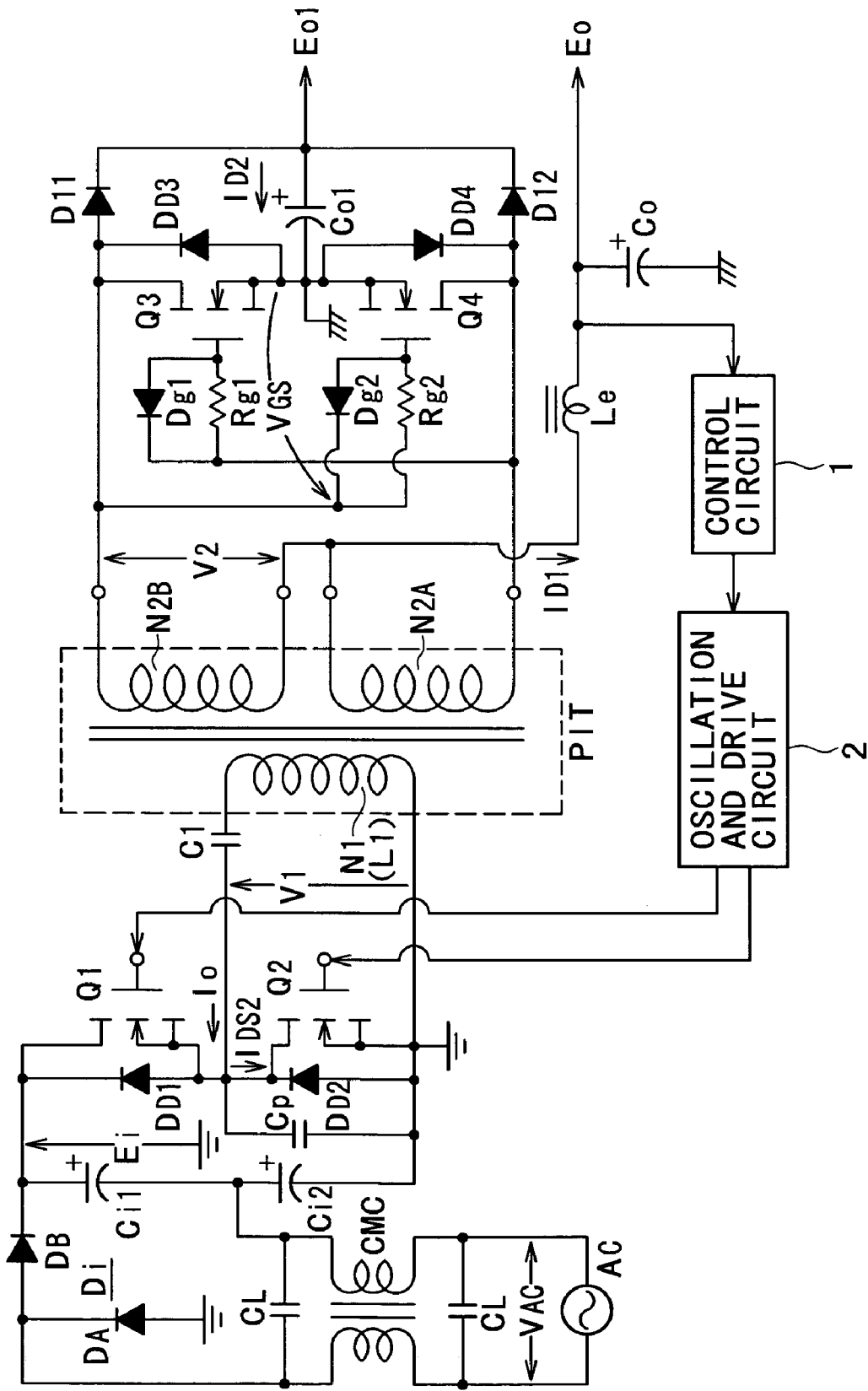
FIG. 21 is a circuit diagram showing a configuration of a switching power supply circuit according to a third embodiment of the present invention.

FIG. 21 shows a configuration of a switching power supply circuit according to a third embodiment of the present invention.

It is described here for the confirmation that, also in the power supply circuit shown in FIG. 21, the gap length of the insulating converter transformer PIT is set to G=1.5 mm similarly, for example, as in the case of the switching power supply circuit of FIG. 14, and the coupling coefficient k is set to k=approximately 0.80 to establish a loose coupling state. Further, in this instance, the primary and secondary windings N1, N2 are set to N1=80 T and N2=3 T, respectively, to achieve expansion of the continuous mode of the secondary side rectification operation similarly.

Referring to FIG. 21, the secondary side of the switching power supply circuit of the third embodiment shown includes secondary windings N2A, N2B and MOS-FETs Q3, Q4. The secondary windings N2A, N2B are connected to each other with a center tap provided therebetween similarly as in the circuit of FIG. 1. Further, the switching power supply circuit includes a parallel connection circuit of a gate resistor Rg1 and a Schottky diode Dg1 and another parallel connection circuit of a gate resistor Rg2 and a Schottky diode Dg2 as driving circuits for driving the MOS-FETs Q3, Q4 on/off.

The connection scheme of the secondary windings N2A, N2B, MOS-FETs Q3, Q4 and drive circuits (Rg1//Dg1, Rg2//Dg2) is similar to that shown in FIG. 1. The center tap between the secondary windings N2A, N2B is connected to the positive electrode terminal of a smoothing capacitor Co through a series connection of an inductor Le. The negative electrode terminal of the smoothing capacitor Co is connected to the primary side ground.

It is to be noted that the circuit portion composed only of the secondary windings N2A, N2B, MOS-FETs Q3, Q4, drive circuit (Rg1//Dg1, Rg2//Dg2) and smoothing capacitor Co forms a synchronous rectification circuit which performs full-wave rectification operation as can be recognized from the description of rectification operation of the secondary side given hereinbelow.

Further, the secondary side includes rectification diodes D11, D12 and a smoothing capacitor Co1 provided in a form added to the configuration of the synchronous rectification circuit which performs full-wave rectification operation as described above. It is to be noted that a Schottky diode may be selectively used for the rectification diodes D11, D12.

The anode of the rectification diode D11 is connected to an end of the secondary winding N2A remote from the center tapped end. The cathode of the rectification diode D11 is connected to the positive electrode terminal of the smoothing capacitor Co1.

Meanwhile, the anode of the rectification diode D12 is connected to an end of the secondary winding N2B remote from the center tapped end. The cathode of the rectification diode D12 is connected to the positive electrode terminal of the smoothing capacitor Co1.

Since the rectification diodes D11, D12 and the smoothing capacitor Co1 are connected in such a connection scheme as described above, a voltage doubler rectification circuit is combined with the synchronous rectification circuit of the full-wave rectification type described above.

It is to be noted that a Litz wire band or a flat braided wire formed from a plurality of Litz wires 10 is used for the secondary windings N2A, N2B in this instance similarly as in the circuit of FIG. 1.

Also in this instance, Schottky diodes Dg1, Dg2 are connected to the gates of the MOS-FETs Q3, Q4, respectively, so that a good switching characteristic (turnoff characteristic) is obtained as described hereinabove with reference to FIG. 1.

As described hereinabove, the secondary side rectification circuit according to the connection scheme shown in FIG. 21 is a combination of a synchronous rectification circuit of the full-wave rectification type and a voltage doubler rectification circuit. Operation of the secondary side rectification circuit is described. Here, in order to facilitate understanding, rectification operation of the secondary side rectification circuit is described divisionally as rectification operation of the synchronous rectification circuit of the full-wave rectification type and rectification operation of the voltage doubler rectification circuit.

First, rectification operation of the synchronous rectification circuit of the full-wave rectification type is described.

First, within one of two half periods of a switching period within which the MOS-FET Q3 is on, rectification current flows along a path of the [secondary winding N2B→inductor Le→smoothing capacitor Co→(secondary side ground)→MOS-FET Q3 (source→drain)→secondary winding N2].

On the other hand, within the other half period of the alternating voltage within which the MOS-FET Q4 is on, rectification current flows along another path of the [secondary winding N2→inductor Le→smoothing capacitor Co→(secondary side ground)→MOS-FET Q4 (source→drain)→secondary winding N2].

In this manner, the synchronous rectification circuit operates such that, within one of half periods of one switching period, the MOS-FET Q3 is conducting to charge rectification current into the smoothing capacitor Co, but within the other half period, the MOS-FET Q4 is conducting to charge rectification current into the smoothing capacitor Co. In short, full-wave rectification operation is obtained. Since the full-wave rectification operation of the synchronous rectification circuit is operation of charging the smoothing capacitor Co1 in accordance with an alternating voltage level excited in the secondary winding N2A or N2B for each half period, a dc voltage of an effective value corresponding to a voltage of each of the secondary windings N2A, N2B is obtained as the voltage across the smoothing capacitor Co. Consequently, the dc voltage in this instance is supplied as a secondary side dc output voltage Eo to the load.

Meanwhile, operation of the voltage doubler rectification circuit is such as follows.

First, within one of two half periods within which the smoothing capacitor Co1 is charged by a voltage excited in the secondary winding N2B by the synchronous rectification circuit (period within which the MOS-FET Q3 is on), the voltage doubler rectification circuit flows rectification current along a path of the [secondary winding N2A→rectification diode D12→smoothing capacitor Co1→(secondary side ground)→smoothing capacitor Co (negative electrode→positive electrode)→inductor Le→secondary winding N2A].

On the other hand, within the other half period within which the smoothing capacitor Co1 is charged by a voltage excited in the secondary winding N2A by the synchronous rectification circuit (period within which the MOS-FET Q4 is on), rectification current flows along another path of the [secondary winding N2B→rectification diode D11→smoothing capacitor Co1→(secondary side ground)→ smoothing capacitor Co (negative electrode→positive electrode)→inductor Le→secondary winding N2B].

Here, a voltage (secondary side dc output voltage Eo) corresponding to a voltage equal to that of the secondary winding N2A or N2B is generated across the smoothing capacitor Co by the full-wave rectification operation of the synchronous rectification circuit.

If the rectification current paths of the voltage doubler rectification circuit described above are viewed taking this into consideration, then charging into the smoothing capacitor Co1 is performed within one of two half periods of one switching period in such a state that the voltage across the smoothing capacitor Co is superposed on an alternating voltage level excided in the secondary winding N2A. Similarly, within the other half period, charging into the smoothing capacitor Co1 is performed in such a state that the voltage across the smoothing capacitor Co is superposed on an alternating voltage level excited in the secondary winding N2B. In other words, charging into the smoothing capacitor Co1 is performed with a potential corresponding substantially twice that of the secondary winding N2A or N2B for each one half period of a switching period.

As a result, a dc voltage corresponding to substantially twice that of the secondary winding N2A or N2B is obtained as the voltage across the smoothing capacitor Co1. In other words, voltage doubler rectification operation is performed. Then, also the voltage across the smoothing capacitor Co1 is supplied as a secondary side dc output voltage Eo1 to the load.

It is to be noted that, as can be recognized from the foregoing description, the voltage doubler rectification circuit shown in FIG. 21 is formed such that the rectification diodes D11, D12 and the smoothing capacitor Co1 connected in the connection scheme shown in FIG. 21 are provided for the configuration of the synchronous rectification circuit of the full-wave rectification type and the smoothing capacitor Co of the synchronous rectification circuit is included in the rectification current path.

Since the secondary side of the power supply circuit shown in FIG. 21 has such a configuration as described above, the power supply circuit generates a secondary side dc output voltage Eo which is a voltage across the smoothing capacitor Co and has a level corresponding to the voltage across each of the secondary windings N2A, N2B and another secondary side dc output voltage Eo1 which is a voltage across the smoothing capacitor Co1 and has a level corresponding to twice the voltage across the secondary windings N2A, N2B, and supplies the secondary side dc output voltage Eo and the secondary side dc output voltage Eo1 to different loads. Further, the secondary side dc output voltage Eo and the secondary side dc output voltage Eo1 are generated based on the alternating voltage excited in the common set of secondary windings (N2A, N2B). In other words, the secondary side rectification circuit distributes power based on the alternating voltages of the common secondary windings N2A, N2B to supply the power to a plurality of loads.

As described hereinabove with reference to FIG. 1, a spike voltage is generated upon turning off between the drain and the source of each of the MOS-FETs Q3, Q4 by electrostatic capacity (coss) between the drain and the source. The spike voltage is measured as spike noise to the voltage across the secondary winding N2A, N2B.

In the third embodiment, since it has a configuration wherein a plurality of (two) different load supply powers (Eo, Eo1) are extracted from a common one secondary winding in such a manner as described above, spike noise which appears in the secondary windings N2A, N2B is reduced and suppressed when compared with an alternative configuration wherein only one load supply power (Eo) is extracted from one set of secondary windings as shown, for example, in FIG. 1.

Consequently, the circuit shown in FIG. 21 can eliminate the snubber circuit (Rs, Cs) provided in the circuit of FIG. 1.

Usually, where it is tried to obtain a plurality of low supply powers (secondary side dc output voltages), for example, if the power supply circuit shown in FIG. 1 is taken as an example, a different secondary winding is additionally wound separately from the secondary windings N2A, N2B in the insulating converter transformer PIT. Further, a rectification smoothing circuit is connected to the additional secondary winding. In short, in order to generate a plurality of secondary side dc output voltages, it is necessary to wind a corresponding number of secondary windings.

In contrast, in the third embodiment, at least two secondary side dc output voltages (Eo, Eo1) are obtained based on an alternating voltage excited in a single common secondary side winding. In short, since a plurality of secondary side rectification circuits commonly use the same secondary winding, the parts as secondary windings are reduced as much.

In other words, the configuration of the secondary side of the third embodiment that a voltage doubler rectification circuit is combined with a synchronous rectification circuit achieves two effects that power is supplied to a plurality of loads from a number of secondary winding as small as possible and that spike noise is reduced.

Further, in the power supply circuit shown in FIG. 21, the inductor Le is interposed in series between the center tap between the secondary windings N2A, N2B and the positive electrode terminal of the smoothing capacitor Co. The interposed position is a line along which all secondary side rectification current flows. In other words, the interposed position is a path along which rectification current for each half period obtained by the rectification operation of the synchronous rectification circuit flows and also rectification current for each half period obtained by the rectification operation of the voltage doubler rectification circuit flows.

The inductor Le interposed in the rectification current path in this manner prevents reverse directional current of rectification current also in this instance.

FIG. 22 illustrates operation waveforms of several components of the circuit of FIG. 21 having the configuration described above.

It is to be noted that also FIG. 22 illustrates a result of measurement under the conditions of the ac input voltage VAC=100 V and the load power Po=100 W.

Also in FIG. 22, the voltage V1 of the switching element Q2, the switching current IDS2 of the switching element Q2 and the primary side series resonance current Io are illustrated. Also in this instance, since the configuration of the primary side is similar to that of the circuit shown in FIG. 1, operation waveforms of the primary side are similar to those of the circuit of FIG.

It can be seen in FIG. 22 that the voltage V2 of the secondary winding N2B in the circuit shown in FIG. 21 exhibits generation of no spike-like noise component (spike voltage) at a rising edge as in the case of the circuit of FIG. 1 described hereinabove with reference to FIG. 11. This arises from the fact that, since the secondary side rectification circuit is configured such that a voltage doubler rectification circuit is added to a synchronous rectification circuit of the full-wave rectification type as described hereinabove, a spike voltage which is generated between the drain and the source of each of the MOS-FETs Q3, Q4 upon turning off is suppressed, and consequently a spike voltage of the voltage V2 is suppressed as well.

Besides, driving of the MOS-FET Q4 with the gate-source voltage VGS generated based on the voltage V2 across the secondary winding N2B is similar to driving of the MOS-FET Q4 with the gate-source voltage VGS4 described hereinabove with reference to FIG. 11. Consequently, within the period between timings t1 and t2, the rectification current ID1 having a sine waveform as seen in FIG. 22 flows through the smoothing capacitor Co via the inductor Le.

Further, though not shown, the driving timing of the MOS-FET Q3 with the gate-source voltage generated based on the voltage across the secondary winding N2A is shifted by 180° in phase with respect to the operation waveform. Consequently, the rectification current ID1 having a sine waveform flows within the period from time t2 to time t3.

In this manner, it can be seen that the rectification current ID1 flowing into the smoothing capacitor Co flows in accordance with the switching period without exhibiting a period within which the zero level continues. In other words, it is illustrated in FIG. 22 that a continuous mode of the rectification current ID1 is obtained even when the synchronous rectification circuit of the full-wave rectification type is controlled so that the switching frequency may be lowered as a result of detection of a heavy load condition.

FIG. 22 further illustrates current flowing into the smoothing capacitor Co1, that is, the rectification current ID2 flowing to the voltage doubler rectification circuit side of the secondary side rectification circuit. The rectification current ID2 flows at a timing synchronized with the rectification current ID1. In particular, the rectification current ID2 flows through the rectification diode D11 within the period from time t1 to time t2 and then flows through the rectification diode D12 within the period from time t2 to time t3. Further, from the waveform of the rectification current ID2, it can be seen that also the rectification current ID2 flows through the rectification diodes D11, D12 in a continuous mode.

Also it can be seen from FIG. 22 that the rectification currents ID1, ID2 do not suffer from reverse directional current of the reverser polarity. The reason why reverse directional current is not generated on the rectification currents in this manner is that the inductor Le is interposed in the rectification current path common to the rectification-currents ID1, ID2.

It is to be noted that the inductance of the inductor Le also in the third embodiment is set to approximately 1.1 µH as described hereinabove so that generation of reverse directional current on rectification current can be prevented.

It is described for the confirmation that, also in this instance, operation in a light load condition (Po=25 Wh) exhibits a continuous mode similarly as in the case of the circuit of FIG. 1.

In this manner, also in the third embodiment, the magnetic flux density of the insulating converter transformer PIT is set to a level lower than a predetermined level through setting of the numbers of windings and the gap length of the insulating converter transformer PIT to achieve expansion of the continuous mode in a heavy load condition similarly as in the circuit of FIG. 1. Consequently, reduction of reactive power caused by a discontinuous mode in a heavy load condition can be anticipated.

Further, also in the third embodiment, generation of reverse directional current which is generated in rectification circuit is prevented by the inductor Le interposed in the rectification current path to achieve further reduction of the reactive power. The reduction of the reactive power supply improves the power supply efficiency.

Further, also in the third embodiment, since the inductor Le is provided, such a situation that the inductance value rises suddenly to a peak level is eliminated also in very light load operation wherein the load power Po is lower than a predetermined level (for example, 12.5 W or less). Consequently, abnormal oscillation operation is prevented and stabilized operation can be assured within the range of the load power Po from 100 W to 0 W.

Further, as a result of insertion of the inductor Le, high frequency noise which is generated in the secondary side dc output voltage Eo can be suppressed also in the third embodiment.

In particular, since the inductor Le in the third embodiment is inserted in series between the positive electrode terminal of the smoothing capacitor Co and the center tap of the secondary winding N2 as seen in FIG. 21, noise appearing on the secondary side dc output voltage Eo can be suppressed.

Also in this instance, where the inductor Le has such a characteristic as described hereinabove with reference to FIG. 16, a good suppression action of such high frequency components as described above can be achieved similarly as in the first embodiment. Since high frequency noise generated on the secondary side dc output voltage Eo can be suppressed well by the inductor Le in this manner, the n type circuit can be omitted also in the circuit of FIG. 21.

Further, in the third embodiment, a voltage doubler rectification circuit is combined with a synchronous rectification circuit of the full-wave rectification type in the secondary side rectification circuit so that a spike voltage (noise) which is generated between the drain and the source of each of the MOS-FETs Q3, Q4 which is a rectification element of the synchronous rectification circuit is canceled. Consequently, the snubber circuit (Rs, Cs) provided in the power supply circuit shown in FIG. 1 can be eliminated.

In the case of the third embodiment, rectification diodes and a smoothing capacitor for forming the voltage doubler rectification circuit are additionally provided in order to suppress a spike voltage. However, in this instance, the synchronous rectification circuit can generate a secondary side dc voltage of an equal level to that of an alternating voltage excited in the secondary winding and supply the secondary side dc voltage to a load. Further, the voltage doubler rectification circuit can generate another secondary side dc voltage of a level twice that of the alternating voltage excited in the secondary winding and supply the secondary side dc voltage to another load. Further, the synchronous rectification circuit and the voltage doubler rectification circuit can use the secondary winding commonly.

In short, in the third embodiment, where it is necessary for the power supply circuit including a synchronous rectification circuit to supply power to a plurality of different loads, since a voltage doubler rectification circuit is combined with the synchronous rectification circuit, addition of rectification diodes and a smoothing capacitor for forming the voltage doubler rectification circuit does not become a disadvantage. Rather, a secondary side rectification circuit for supplying power to a plurality of different loads can be provided in such a configuration that the number of secondary windings can be minimized and the necessity for a snubber circuit is eliminated.

It is to be noted that the present invention is not limited to the configurations of the power supply circuit described hereinabove.

For example, the detailed configuration of the synchronous rectification circuit of the wiring voltage detection system based on the present invention may be modified suitably. Further, for example, as a switching element for a primary side switching converter, any element different from a MOS-FET may be adopted only if it can be used in a separately excited form such as an IGBT (Insulated Gate Bipolar Transistor). Further, the constants and so forth of the parts described hereinabove may be varied in accordance with actual conditions and so forth.

Further, according to the present invention, the switching power supply circuit can be configured such that it includes a current resonance converter of the self excited type. In this instance, for example, a bipolar transistor can be selectively used as a switching element. Further, the present invention can be applied also to a current resonance converter wherein four switching elements are connected in a full bridge connection.

Further, also a rectification circuit which receives a commercial ac power supply as input power thereto and generates a dc input voltage may have a configuration, for example, other than that of a voltage doubler rectification circuit.

While preferred embodiments of the present invention have been described using specific terms, such description is for illustrative purposes only, and it is to be understood that changes and variations may be made without departing from the spirit or scope of the following claims.

What is claimed is:

1. A switching power supply circuit, comprising:
   a rectification smoothing section for rectifying and smoothing an ac input voltage to produce a dc input voltage;
   a switching section including a plurality of switching elements for switching the dc input voltage to intermittently output the dc input voltage;
   a drive section for driving said switching element for switching operation;
   an insulating converter transformer including a primary winding provided on a primary side and a secondary winding provided on a secondary side for transmitting the switching output of said switching section from the primary side to the secondary side;
   a primary side resonance capacitor connected to a predetermined location of the primary side and having a capacitance for cooperating with a leakage inductance component of said primary winding of said insulating converter transformer to form a primary side resonance circuit for causing said switching section to perform operation of the resonance type;
   a secondary side smoothing capacitor;
   a synchronous rectification circuit of a winding voltage detection system for rectifying an alternating voltage induced in said secondary winding of said insulating converter transformer and charging said secondary side smoothing capacitor with resulting rectification current to obtain a secondary side dc output voltage as a voltage across said secondary side smoothing capacitor; and
   a constant voltage control section for controlling a switching frequency of said switching section so that, when a level of the secondary side dc output voltage is low, the switching frequency is lowered, but when the level of the secondary side dc output voltage is high, the switching frequency is raised to perform constant voltage control of the secondary side dc output voltage;
   said insulating converter transformer having a magnetic flux density set lower than a predetermined level so that the secondary side rectification current flowing through said synchronous rectification circuit is maintained in a continuous mode even when the switching frequency drops lower than a predetermined level as a result of the control of said constant voltage control section;
   said synchronous rectification circuit including an inductor element having a bead core and inserted in the rectification current path for charging said secondary side smoothing capacitor with the rectification current, said inductor element having a dc superposition characteristic set such that the secondary side rectification current is maintained in the continuous mode where a load to which the secondary side dc output voltage is connected is within a range within which the load decreases to no load.

2. A switching power supply circuit according to claim 1, wherein the dc superposition characteristic of said inductor element is set such that the secondary side rectification current is maintained in the continuous mode where the load to which the secondary side dc output voltage is connected is within the range within which the load decreases to no load by setting at least of the size of said bead core.

3. A switching power supply circuit according to claim 1, wherein the length of a gap formed in said insulating converter transformer is set longer than a predetermined length to set a coupling coefficient between the primary and secondary sides lower than a predetermined value in order to make a magnetic flux density of said insulating converter transformer lower than a predetermined value.

4. A switching power supply circuit according to claim 1, wherein the numbers of turns of said primary and secondary windings are set so that an induced voltage level per one turn of said secondary winding is lower than a required level in order to make a magnetic flux density of said insulating converter transformer lower than a predetermined value.

5. A switching power supply circuit according to claim 1, further comprising a primary side partial voltage resonance circuit formed from a capacitance of partial resonance capacitor connected in parallel to a particular one of said switching elements of said switching section and the leakage inductance component of said primary winding of said insulating converter transformer for performing partial voltage resonance operation within a turnoff period of the particular switching element.

6. A switching power supply circuit according to claim 1, wherein said secondary winding is formed from a Litz wire band composed of a plurality of Litz wires aligned in parallel to each other like a band.

7. A switching power supply circuit according to claim 1, wherein said secondary winding is formed from a flat braided wire formed from a plurality of Litz wires braided in a flat form.

8. A switching power supply circuit according to claim 1, wherein said synchronous rectification circuit is formed as a bridge rectification circuit for full-wave rectifying the alternating voltage induced in said secondary winding of said insulating converter transformer and further includes:
   a first field effect transistor connected in series between a first end of said secondary winding and the secondary side ground;

a second field effect transistor connected in series between a second end of said secondary winding and the secondary side ground;

a third field effect transistor connected in series between the first end of said secondary winding and the secondary side ground and connected in parallel to said first field effect transistor with respect to said secondary winding;

a fourth field effect transistor connected in series between the second end of said secondary winding and the secondary side ground and connected in parallel to said second field effect transistor with respect to said secondary winding;

a first driving winding formed by winding an extension of the first end of said secondary winding;

a second driving winding formed by winding an extension of the second end of said secondary winding;

a first drive circuit for detecting a voltage generated in said first driving winding within a period of a half wave within which said first field effect transistor is to flow rectification current by means of a resistor element and outputting a gate voltage for turning on said first field effect transistor;

a second drive circuit for detecting a voltage generated in said second driving winding within a period of a half wave within which said second field effect transistor is to flow rectification current by means of another resistor element and outputting a gate voltage for turning on said second field effect transistor;

a third drive circuit for detecting a voltage generated in said first driving winding within a period of a half wave within which said third field effect transistor is to flow rectification current by means of a further resistor element and outputting a gate voltage for turning on said third field effect transistor; and a fourth drive circuit for detecting a voltage generated in said second driving winding within a period of a half wave within which said fourth field effect transistor is to flow rectification current by means of a still further resistor element and outputting a gate voltage for turning on said fourth field effect transistor;

said inductor element being connected in series to a positive electrode terminal of said secondary side smoothing capacitor.

9. A switching power supply circuit according to claim 1, wherein said synchronous rectification circuit is formed as a voltage doubler rectification circuit for full-wave rectifying the alternating voltage induced in said secondary winding of said insulating converter transformer for obtaining the secondary side dc output voltage of a level corresponding to a predetermined number of times the alternating voltage level and further includes:

a first field effect transistor connected in series to a first end of said secondary winding;

a second field effect transistor connected in series to the first end of said secondary winding and connected in parallel to said first field effect transistor;

a series connection circuit including a first secondary side smoothing capacitor connected at a positive electrode terminal thereof to said first field effect transistor and connected at a negative electrode terminal thereof to a second end of said secondary winding and a second secondary side smoothing capacitor connected at a negative electrode terminal thereof to said second field effect transistor and connected at a positive electrode terminal thereof to the second end of said secondary winding;

a first driving winding formed by winding an extension of the first end of said secondary winding;

a second driving winding formed by winding an extension of the second end of said secondary winding;

a first drive circuit for detecting a voltage generated in said first driving winding within a period of a half wave within which said first field effect transistor is to flow rectification current by means of a resistor element and outputting a gate voltage for turning on said first field effect transistor; and a second drive circuit for detecting a voltage generated in said second driving winding within a period of a half wave within which said second field effect transistor is to flow rectification current by means of another resistor element and outputting a gate voltage for turning on said second field effect transistor;

said inductor element being inserted between a node between said first secondary side smoothing capacitor and said second secondary side smoothing capacitor and the second end of said secondary winding.

10. A switching power supply circuit according to claim 1, wherein said synchronous rectification circuit is formed as a voltage doubler rectification circuit for full-wave rectifying the alternating voltage induced in said secondary winding of said insulating converter transformer for obtaining the secondary side dc output voltage of a level corresponding to a predetermined number of times the alternating voltage level and further includes:

a first field effect transistor connected in series to a first end of said secondary winding;

a second field effect transistor connected in series to the first end of said secondary winding and connected in parallel to said first field effect transistor;

a series connection circuit including a first secondary side smoothing capacitor connected at a positive electrode terminal thereof to said first field effect transistor and connected at a negative electrode terminal thereof to a second end of said secondary winding and a second secondary side smoothing capacitor connected at a negative electrode terminal thereof to said second field effect transistor and connected at a positive electrode terminal thereof to the second end of said secondary winding;

a first drive circuit for detecting a voltage generated in said secondary winding within a period of a half wave within which said first field effect transistor is to flow rectification current by means of a resistor element and outputting a gate voltage for turning on said first field effect transistor; and a second drive circuit for detecting a voltage generated in said secondary winding within a period of a half wave within which said second field effect transistor is to flow rectification current by means of another resistor element and outputting a gate voltage for turning on said second field effect transistor;

said switching power supply circuit further comprising a first diode element connected in parallel to said first secondary side smoothing capacitor, a second diode element connected in parallel to said second secondary side smoothing capacitor, and a third secondary side smoothing capacitor connected in parallel to the series connection circuit of said first secondary side smoothing capacitor and said second secondary side smoothing capacitor.

11. A switching power supply circuit according to claim 1, wherein said secondary side smoothing capacitor of said synchronous rectification circuit includes a first secondary side smoothing capacitor and a second secondary side smoothing capacitor, and a tap output of a center tap of said secondary winding of said insulating converter transformer is connected to a positive electrode terminal of said first secondary side smoothing capacitor, said synchronous rectification circuit including:
- a first field effect transistor connected in series between a first end of said secondary winding remote from the center tap and the secondary side ground;
- a second field effect transistor connected in series between a second end of said secondary winding remote from the center tap and the secondary side ground;
- a first drive circuit for detecting a voltage generated in said secondary winding within a period of a half wave within which said first field effect transistor is to flow rectification current by means of a resistor element and outputting a gate voltage for turning on said first field effect transistor; and
- a second drive circuit for detecting a voltage generated in said secondary winding within a period of a half wave within which said second field effect transistor is to flow rectification current by means of another resistor element and outputting a gate voltage for turning on said second field effect transistor;

said inductor element being inserted between the positive electrode terminal of said first secondary side smoothing capacitor and the center tap of said secondary winding;

said switching power supply circuit further comprising a voltage doubler rectification circuit combined with said synchronous rectification circuit and including a first rectification diode element, a second rectification diode element and said second secondary side smoothing capacitor;

said first rectification diode element being connected between the first end of said secondary winding remote from the center tap and a positive electrode terminal of said second secondary side smoothing capacitor;

said second rectification diode element being connected between the second end of said secondary winding remote from the center tap and the positive electrode terminal of said second secondary side smoothing capacitor;

a negative electrode terminal of said second secondary side smoothing capacitor being connected to the secondary side ground so that the secondary side dc output voltage is obtained as a voltage across said second secondary side smoothing capacitor.

* * * * *